US012466814B2

(12) United States Patent
Smith et al.

(10) Patent No.: US 12,466,814 B2
(45) Date of Patent: Nov. 11, 2025

(54) STERICALLY SHIELDED HEPTAMETHINE CYANINE DYES

(71) Applicant: UNIVERSITY OF NOTRE DAME DU LAC, South Bend, IN (US)

(72) Inventors: Bradley D. Smith, Granger, IN (US); Donghao Li, South Bend, IN (US)

(73) Assignee: UNIVERSITY OF NOTRE DAME DU LAC, South Bend, IN (US)

( * ) Notice: Subject to any disclaimer, the term of this patent is extended or adjusted under 35 U.S.C. 154(b) by 597 days.

(21) Appl. No.: 17/996,420

(22) PCT Filed: Feb. 22, 2021

(86) PCT No.: PCT/US2021/018994
§ 371 (c)(1),
(2) Date: Oct. 17, 2022

(87) PCT Pub. No.: WO2021/216183
PCT Pub. Date: Oct. 28, 2021

(65) Prior Publication Data
US 2023/0219933 A1 Jul. 13, 2023

Related U.S. Application Data

(60) Provisional application No. 63/148,067, filed on Feb. 10, 2021, provisional application No. 63/013,756, filed on Apr. 22, 2020.

(51) Int. Cl.
*C07D 403/14* (2006.01)
*G01N 33/58* (2006.01)

(52) U.S. Cl.
CPC ......... *C07D 403/14* (2013.01); *G01N 33/582* (2013.01)

(58) Field of Classification Search
CPC .............. C09B 23/0008; A61K 49/006; A61K 49/0032; C07D 403/14
See application file for complete search history.

(56) References Cited

U.S. PATENT DOCUMENTS

| 8,481,752 | B2 | 7/2013 | Xu et al. |
| 8,916,137 | B2 | 12/2014 | Hilderbrand et al. |
| 2013/0274452 | A1 | 10/2013 | Xu et al. |

OTHER PUBLICATIONS

Extended Search Report and Written Opinion of the European Patent Office dated Nov. 25, 2024 in EP Application No. 21792052. 9; 12pgs.
Gamage et al., "Comparison of cRGDfK Peptide Probes with Appended Shielded Heptamethine Cyanine Dye (s775z) for Near Infrared Fluorescence Imaging of Cancer," ACS Omega, 6, 30130-30139, Oct. 2021.
Li et al., "Sterically Shielded Heptamethine Cyanine Dyes for Bioconjugation and High Performance Near-Infrared Fluorescence Imaging," Angew. Chem. Int. Ed., 59, 12154-12161, Jul. 2020.
Schreiber et al., "High-Performance Near-Infrared Fluorescent Secondary Antibodies for Immunofluorescence," Anal. Chem., 93, 3643-3651, Feb. 2021.
Ahrens et al. "(Aza)Pentacenes Clipped into a Ring: Stabilization of Large (Aza)Acenes" Angew. Chem. Int. Ed. 2021, Apr. 19, 2021, vol. 60, Issue 17; pp. 9270-9273.
Buston et al., "Rotaxane-encapsulated cyanine dyes: enhanced fluorescence efficiency and photostability", Chem. Commun., 2000, May 9, 2000, 905-906.
Dsouza et al., "Review of Fluorescence Guided Surgery Systems: Identification of Key Performance Capabilities Beyond Indocyanine Green Imaging," J Biomed Opt., 21(8):80901, Aug. 2016.
Gassensmith et al., "Discovery and early development of squaraine rotaxanes", Chem. Commun., Aug. 24, 2009, 6329-6338.
International Search Report and Written Opinion of the ISA/US dated May 7, 2021 in International Application No. PCT/US2021/018994; 9pgs.
Jl et al., "From Dyestuff Chemistry to Cancer Theranostics: The Rise of Rylenecarboximides," Acc. Chem. Res., 52 (8):2266-2277, Aug. 2019.
Lei et al., "Synthesis of Sterically Protected Xanthene Dyes with Bulky Groups at C-3' and C-7", J. Org. Chem. 2015, 80, 11538-11543.
Sato et al., "Photoinduced Ligand Release from a Silicon Phthalocyanine Dye Conjugated with Monoclonal Antibodies: a Mechanism of Cancer Cell Cytotoxicity after Near-Infrared Photoimmunotherapy" ACS Cent. Sci. 2018, 4, 1559-1569.
Schreiber et al., "Paired Agent Fluorescence Imaging of Cancer in a Living Mouse Using Preassembled Squaraine Molecular Probes with Emission Wavelengths of 690 and 830 nm," Bioconjug Chem., 31(2):214-223, Feb. 2020.
Shaw et al., "Non-Covalently Pre-Assembled High-Performance Near-Infrared Fluorescent Molecular Probes for Cancer Imaging," Chem. Eur. J. 2018, 24(52):13821-13829, Sep. 2018.
Stackova et al., "Approach to a Substituted Heptamethine Cyanine Chain by the Ring Opening of Zincke Salts," J Am Chem Soc., 141(17):7155-7162, Apr. 2019.

(Continued)

*Primary Examiner* — James W Rogers
(74) *Attorney, Agent, or Firm* — Haukaas Fortius PLLC; Michael Haukaas

(57) ABSTRACT

The near-infrared window of fluorescent heptamethine cyanine dyes greatly facilitates biological imaging because there is deep penetration of the light and negligible background fluorescence. But dye instability, aggregation, and poor pharmacokinetics are current drawbacks that limit performance and the scope of possible applications. All these limitations are simultaneously overcome with a new molecular design strategy that produces a charge balanced and sterically shielded fluorochrome. The key design feature is a meso-Aryl group that simultaneously projects two shielding arms directly over each face of a linear heptamethine polyene. Cell and mouse imaging experiments compared a shielded heptamethine cyanine dye (and several peptide and antibody bioconjugates) to benchmark heptamethine dyes and found that the shielded systems possess an unsurpassed combination of photophysical, physiochemical and biodistribution properties that greatly enhance bioimaging performance.

20 Claims, 37 Drawing Sheets

(56) References Cited

OTHER PUBLICATIONS

Su et al., "The Development of a Highly Photostable and Chemically Stable Zwitterionic Near-Infrared Dye for Imaging Applications," Chem Commun., 51:3989-3992, Jan. 2015.

Van Der Wal et al., Synthesis and Systematic Evaluation of Symmetric Sulfonated Centrally C-C Bonded Cyanine Near-Infrared Dyes for Protein Labelling, Dyes and Pigments, 132:7-19, Sep. 2016.

Wycisk et al., "Glycerol-Based Contrast Agents: a Novel Series of Dendronized Pentamethine Dyes", Bioconjugate Chem. 2015, 26, 773-781.

Yau et al., "Stabilisation of a heptamethine cyanine dye by rotaxane encapsulation", Chem. Commun. 2008, Apr. 22, 2008, 2897-2899.

C.

**B. Photostability:
Imaging Station Irradiation**

Irradiation Time: 0 min

Irradiation Time: 60 min

| Irradiation Time | 0 min | 60 min |
|---|---|---|
| s775z | 100 ± 3% | 77 ± 2% |
| UL766 | 100 ± 2% | 58 ± 2% |

D. In Vivo TBR

E.
Excised Tumors

A.

B.

A.

s775z-IgG

B.

Nonfluorescent H-aggregate

756z-IgG

B.

STERICALLY SHIELDED HEPTAMETHINE CYANINE DYES

CROSS-REFERENCE TO RELATED APPLICATIONS

This application is a National Stage filing under 35 U.S.C. § 371 of International Application No. PCT/US2021/018994 filed Feb. 22, 2021, which claims the benefit of U.S. Provisional Patent Application No. 63/013,756, filed Apr. 22, 2020 and Provisional Patent Application No. 63/148,067, filed Feb. 10, 2021, which applications are incorporated herein by reference.

GOVERNMENT SUPPORT

This invention was made with government support under Grant No. GM059078 awarded by the National Institutes of Health. The government has certain rights in the invention.

BACKGROUND OF THE INVENTION

Fluorescent heptamethine cyanine dyes (known traditionally and commercially as Cy7) have absorption peaks in the near-infrared (NIR) range of 740-840 nm, a favorable wavelength region for in vivo imaging because there is deep penetration of the light through thick biological samples, along with high image contrast due to decreased light scattering and negligible background signal. Heptamethine cyanine dyes are often attached to synthetic or biological molecules to create targeted fluorescent conjugates for diagnostics, microscopy, or in vivo imaging of living subjects, and these frontier technologies are expanding rapidly. The potential value of heptamethine cyanine dyes has increased tremendously in recent years with the realization that the tail of their emission bands extend into the range of 1000-1700 nm which is often called the NIR II region. This is an important discovery with significant practical implications because in vivo imaging in the NIR II region produces brighter and sharper fluorescence images.

By definition, heptamethine cyanine dyes have extended hydrophobic (and polarizable) surface areas and a small polyene HOMO-LUMO band gap, so dye instability, self-aggregation, and poor pharmacokinetics are common technical drawbacks that severely limit the scope of current applications. Shown in Scheme 1 are leading choices of heptamethine cyanine dyes for fabrication of preclinical and clinical fluorescent NIR molecular probes. The archetype heptamethine dye is Indocyanine Green (ICG), the only NIR dye with absorption/emission >700 nm that is approved for use in humans. Although used extensively, it is known for its modest stability and mediocre fluorescent properties, and also the absence of a single reactive site for easy bioconjugation. A notable advance in heptamethine cyanine chemistry was the development of conjugatable structures with a central cyclohexyl ring. A benchmark example is polyanionic IRDye 800CW® (CW800), a commercially available heptamethine indocyanine dye that has been developed into several fluorescent NIR molecular probes that are currently under clinical evaluation for enhanced intraoperative imaging. While molecular probes based on CW800 have undoubted value in biomedical imaging, there are three constraining performance limitations. One is undesired, non-specific interaction of the polyanionic fluorochrome (or its conjugate) with off-target proteins, cell membranes, or skin, which often produces moderate background signals and non-optimal pharmacokinetic profiles. A second concern is chemical degradation of CW800 due to nucleophilic displacement of the meso-OAryl group by biological amines or thiols during synthesis, storage, or the course of the imaging experiment. A third concern is susceptibility to photobleaching due to high reactivity of the electron rich heptamethine polyene with electrophilic singlet oxygen.

For the last 15 years, international community efforts to solve these three heptamethine cyanine performance problems (non-optimal pharmacokinetics, chemical and photochemical instability) have resulted in two noteworthy structural modifications. In vivo pharmacokinetic profiles have been improved by creating geometrically, charge balanced dye structures (often called zwitterionic) such as ZW800-1 which minimizes binding to serum proteins and membrane surfaces, promotes exclusive renal clearance, and produces an ultralow imaging background and high Tumor-to-Background ratio. The second structural improvement is to replace the dye's labile meso C-OAryl bond with a more stable covalent linkage. A recent advance developed by Schnermann and coworkers employed a more robust meso C-OAlkyl bond, and one example of this fluorochrome is UL766 which exhibits excellent chemical stability and very favorable pharmacokinetics due to its charge balanced structure. However, the heptamethine polyene within UL766 (and its close structural analogues) is quite electron rich which means relatively high fluorochrome reactivity with singlet oxygen, and thus susceptibility to photobleaching. Another way to replace the reactive meso C-OAryl bond in ZW800-1 is to employ a much more stable C—C linkage as exemplified by 756z with its meso-Aryl substituent. However, the rigid hydrophobic core of charge balanced 756z (and its close structural analogues) promotes low water solubility and extensive dye self-aggregation which limits practicality. Self-aggregation of NHS ester versions of 756z is especially problematic during a protein conjugation reaction because it drives attachment of multiple self-aggregated dyes at proximal lysine positions on the protein surface leading to partially quenched (less fluorescent) protein-dye conjugates.

Accordingly, there is a need for a fluorescent heptamethine cyanine dye that has a superior combination of photophysical, physiochemical and biodistribution properties that greatly enhance bioimaging performance.

SUMMARY

This disclosure provides a new and versatile molecular design strategy that simultaneously overcomes all of the heptamethine performance limitations described above. Herein is reported a new class of cyanine dyes that are sterically shielded heptamethine cyanine dyes.

Accordingly, this disclosure provides a compound of Formula I:

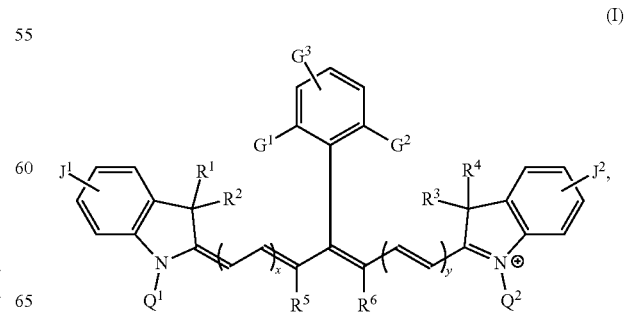

or a salt thereof;
wherein
  $G^1$ and $G^2$ are each independently —($C_1$-$C_4$)alkyl-(Z)—$R^W$;
    each Z is independently 5- or 6-membered heterocycle;
    each $R^W$ is independently —$X^1$($C_1$-$C_4$)alkyl-(O($C_2$-$C_4$)alkyl)$_m$-O($C_1$-$C_4$)alkyl, or H;
    each $X^1$ is independently absent, O, S, or NH;
    each m is independently 0-500;
  $G^3$ is —(C=O)$R^A$ wherein $R^A$ is O$R^B$, N$R^B R^C$, H, or halo;
    $R^B$ and $R^C$ are each independently H, N-succinimidyl, drug, or biologic;
  J1 and J2 are each independently SO$_3$H or CO$_2$H;
  $Q^1$ and $Q^2$ are each independently —($C_2$-$C_6$)alkyl-$X^2$;
    each $X^2$ is independently N$^+$($R^D$)$_3$, N($R^D$)$_2$, CO$_2$H, SO$_3$H, or —O($C_1$-$C_6$)alkyl;
    each $R^D$ is independently —($C_1$-$C_6$)alkyl;
  $R^1$, $R^2$, $R^3$ and $R^4$ are each independently —($C_1$-$C_4$) alkyl or H;
  $R^5$ and $R^6$ are each independently H or —($C_1$-$C_4$)alkyl; or
    $R^5$ and $R^5$ taken together form a 5- or 6-membered carbocycle; and
  x and y are each independently 0-3;
wherein the moieties ($C_2$-$C_4$)alkyl or ($C_2$-$C_6$)alkyl are optionally branched, and charged moieties present in the compound are counterbalanced with counterions.

This disclosure also provides a composition comprising the compound described above and a pharmaceutically acceptable excipient.

This disclosure additionally provides for imaging a targeted biological organism comprising:
  a) conjugating the compound described above to a drug or biologic to form a bioconjugate wherein the bioconjugate has selective affinity for a targeted biological organism or biomolecule;
  b) contacting the bioconjugate and the biological organism or biomolecule;
  c) exciting the bioconjugate a suitable wavelength for inducing a fluorescence signal or photoacoustic signal; and
  d) imaging the excited bioconjugate fluorescence signal or photoacoustic signal emanating from within the biological organism;
  wherein the targeted biological organism is thereby imaged.

Furthermore, this disclosure provides a method for fluorescence or photoacoustic guided cancer surgery comprising:
  a) administering a bioconjugate of the compound described above to a subject in need of cancer surgery, wherein the bioconjugate has selective affinity for a cancer in the subject;
  b) exciting the bioconjugate a suitable wavelength for inducing a fluorescence signal or photoacoustic signal, wherein the excited bioconjugate fluorescence signal or photoacoustic signal is emanating from within the cancer; and
  c) surgically removing the cancer in the subject;
wherein optionally the bioconjugate is a bioconjugate of the compound s775z described herein.

The invention provides novel compounds of Formulas I-V, V(a-f), VI, and VII(a-d), intermediates for the synthesis of compounds of the Formulas, as well as methods of preparing compounds of the Formulas. The invention also provides compounds of Formulas I-V, V(a-f), VI, and VII (a-d) that are useful as intermediates for the synthesis of other useful compounds. The invention provides for the use of compounds of Formulas I-V, V(a-f), VI, and VII(a-d) for the manufacture of imaging agents useful for the diagnosis and treatment of diseases in a mammal, such as a human.

The invention provides for the use of the compositions described herein for use in medical imaging and medical procedures. The medical procedure can be treating cancer, for example, breast cancer, lung cancer, pancreatic cancer, prostate cancer, or colon cancer. The invention also provides for the use of a composition as described herein for the manufacture of a medical imaging agent used for surgery to treat a disease in a mammal, for example, cancer in a human. The imaging agent can include a pharmaceutically acceptable diluent, excipient, or carrier.

BRIEF DESCRIPTION OF THE DRAWINGS

The following drawings form part of the specification and are included to further demonstrate certain embodiments or various aspects of the invention. In some instances, embodiments of the invention can be best understood by referring to the accompanying drawings in combination with the detailed description presented herein. The description and accompanying drawings may highlight a certain specific example, or a certain aspect of the invention. However, one skilled in the art will understand that portions of the example or aspect may be used in combination with other examples or aspects of the invention.

Note: for FIGS. 6-9 and 11: the fluorescence emission intensities at the highest dye concentrations are decreased and red-shifted due to the strong inner filter (reabsorption) effect.

Figure 6:
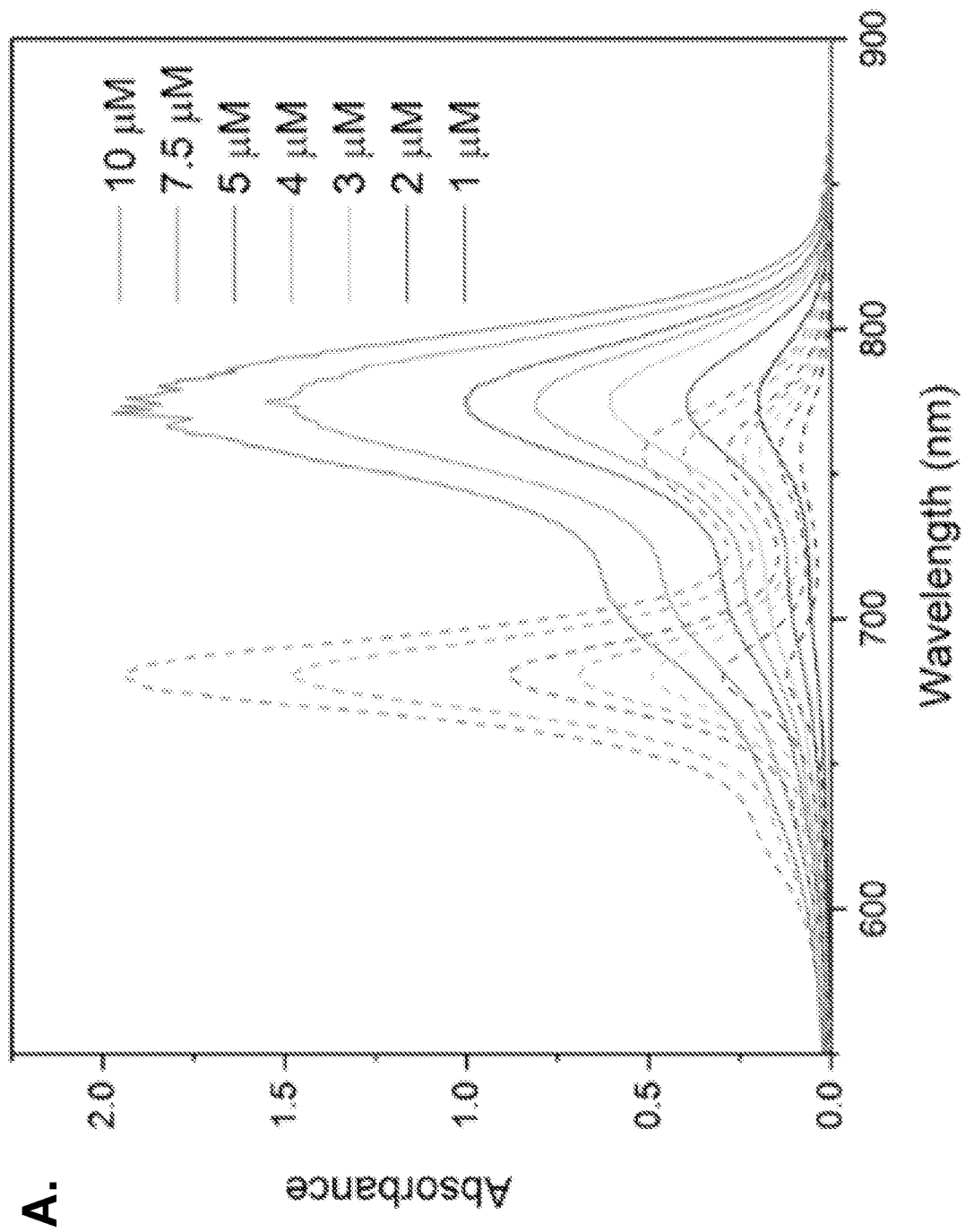
Figure 6:
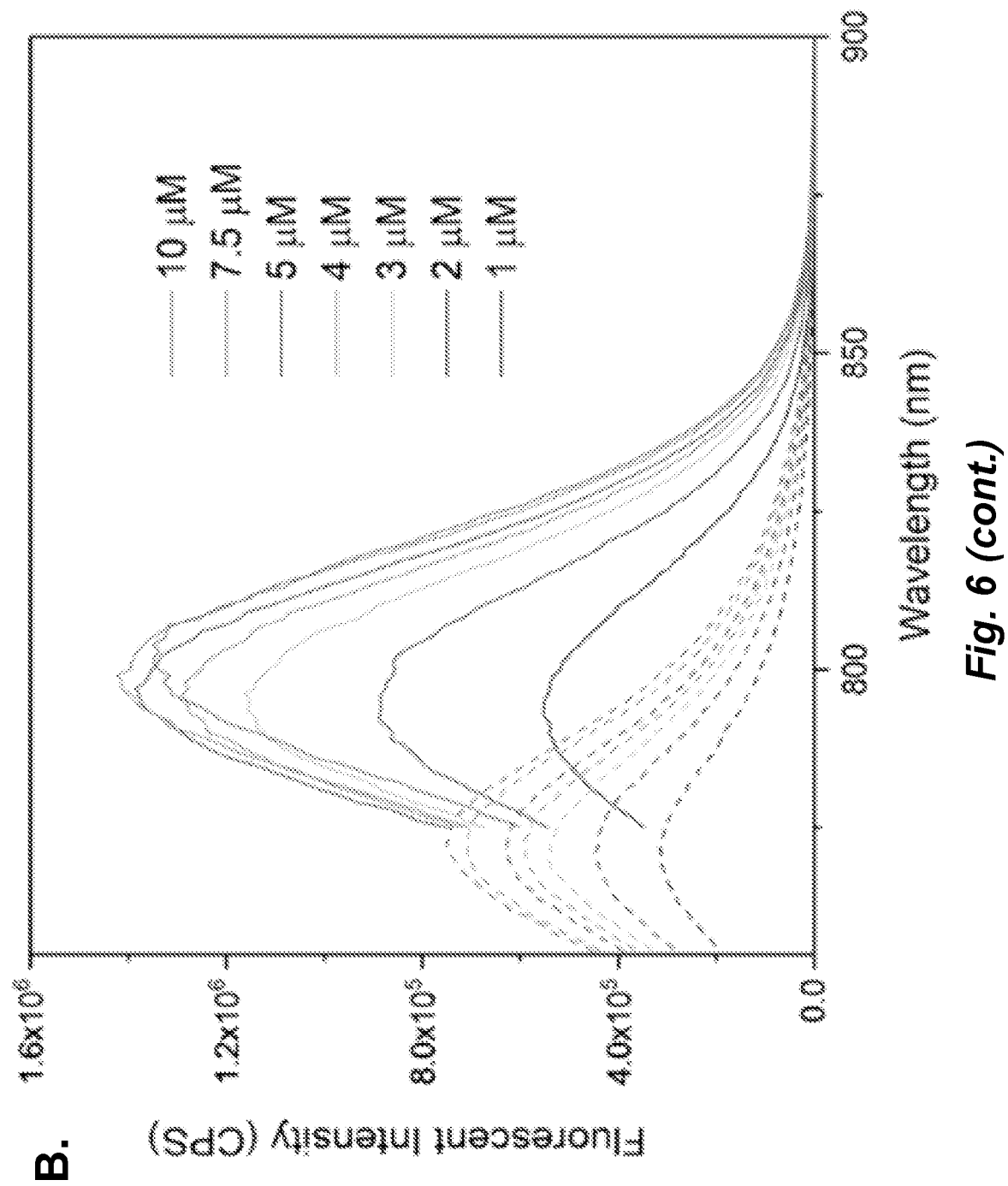

FIG. 6. a) Absorption and b) emission spectra of s775z (solid line) and 756z (dashed line) in water at various concentrations. For s775z, $\lambda_{ex}$=765 nm. For 756z, $\lambda_{ex}$=745 nm.

Figure 7:
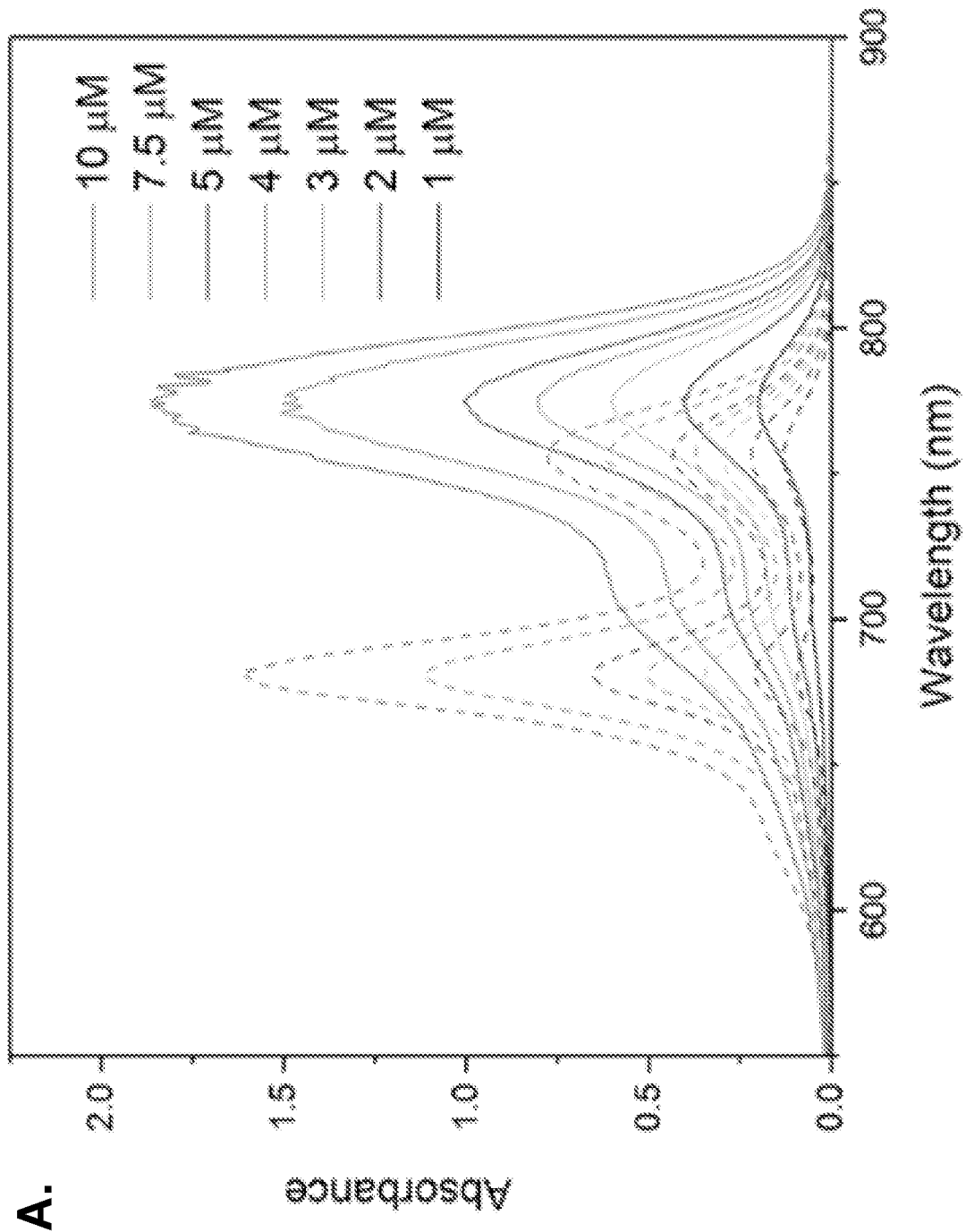
Figure 7:
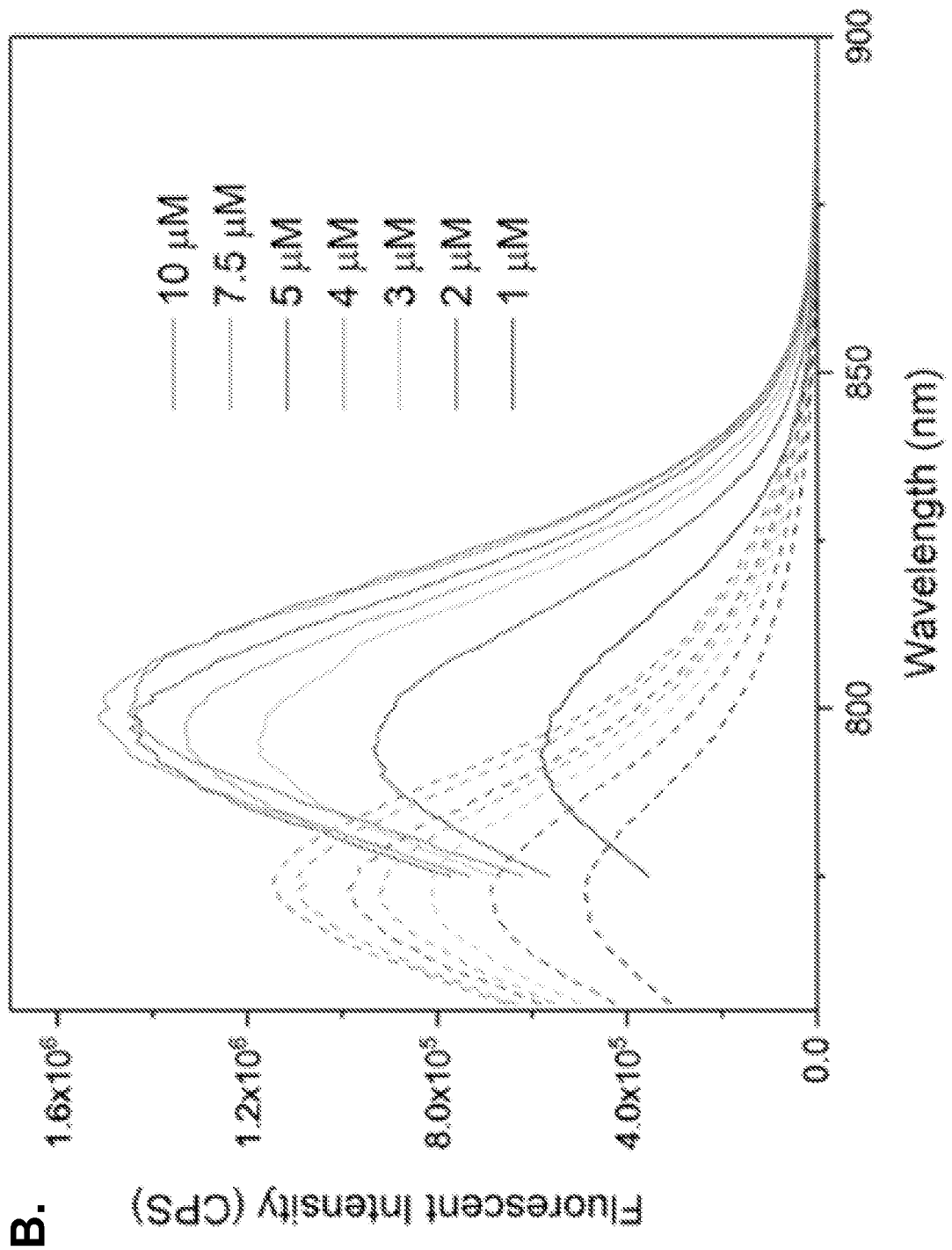

FIG. 7. a) Absorption and b) emission spectra of s775z (solid line) and 756z (dashed line) in PBS, pH 7.4, at various concentrations. For s775z, $\lambda_{ex}$=765 nm. For 756z, $\lambda_{ex}$=745 nm.

Figure 8:
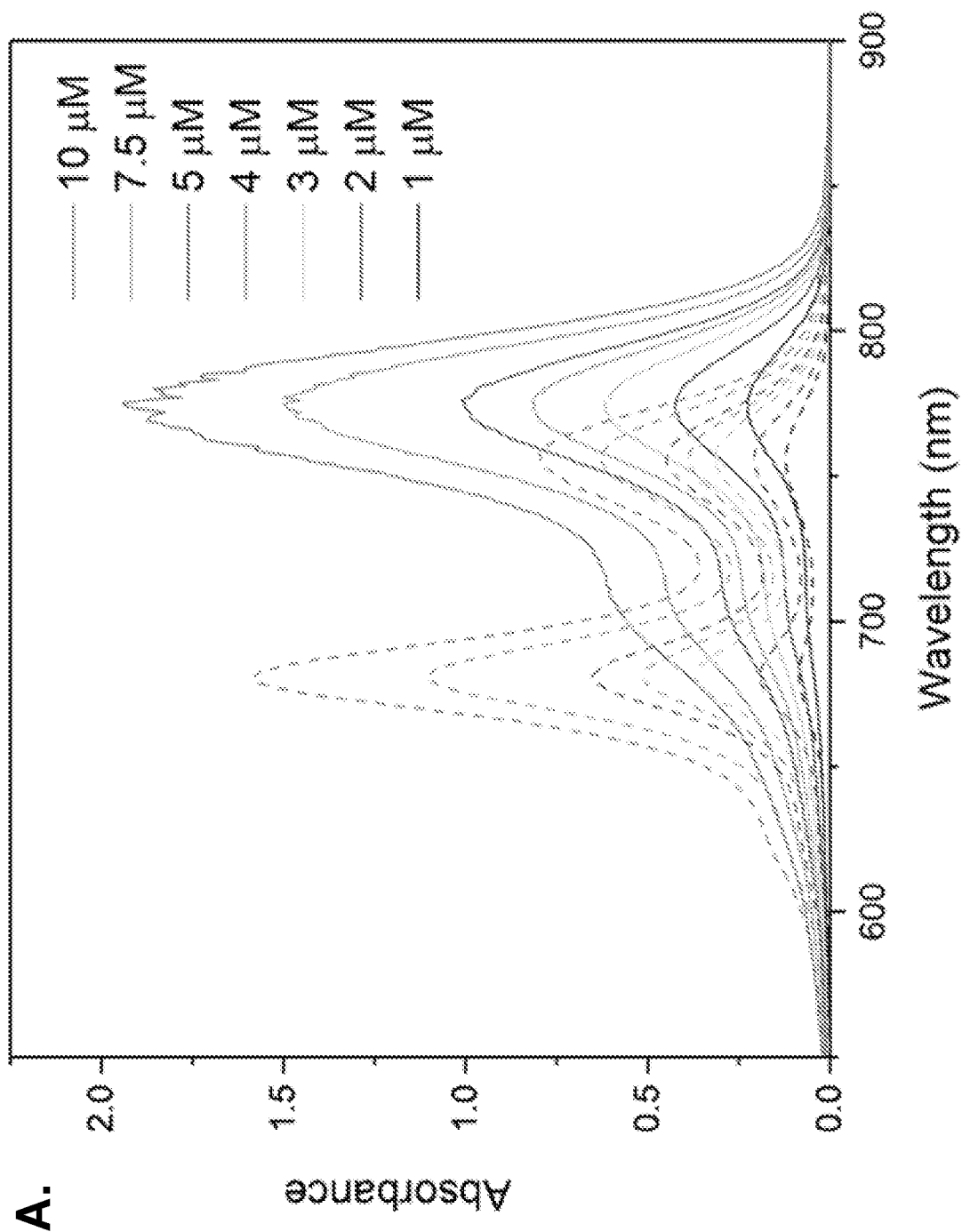
Figure 8:
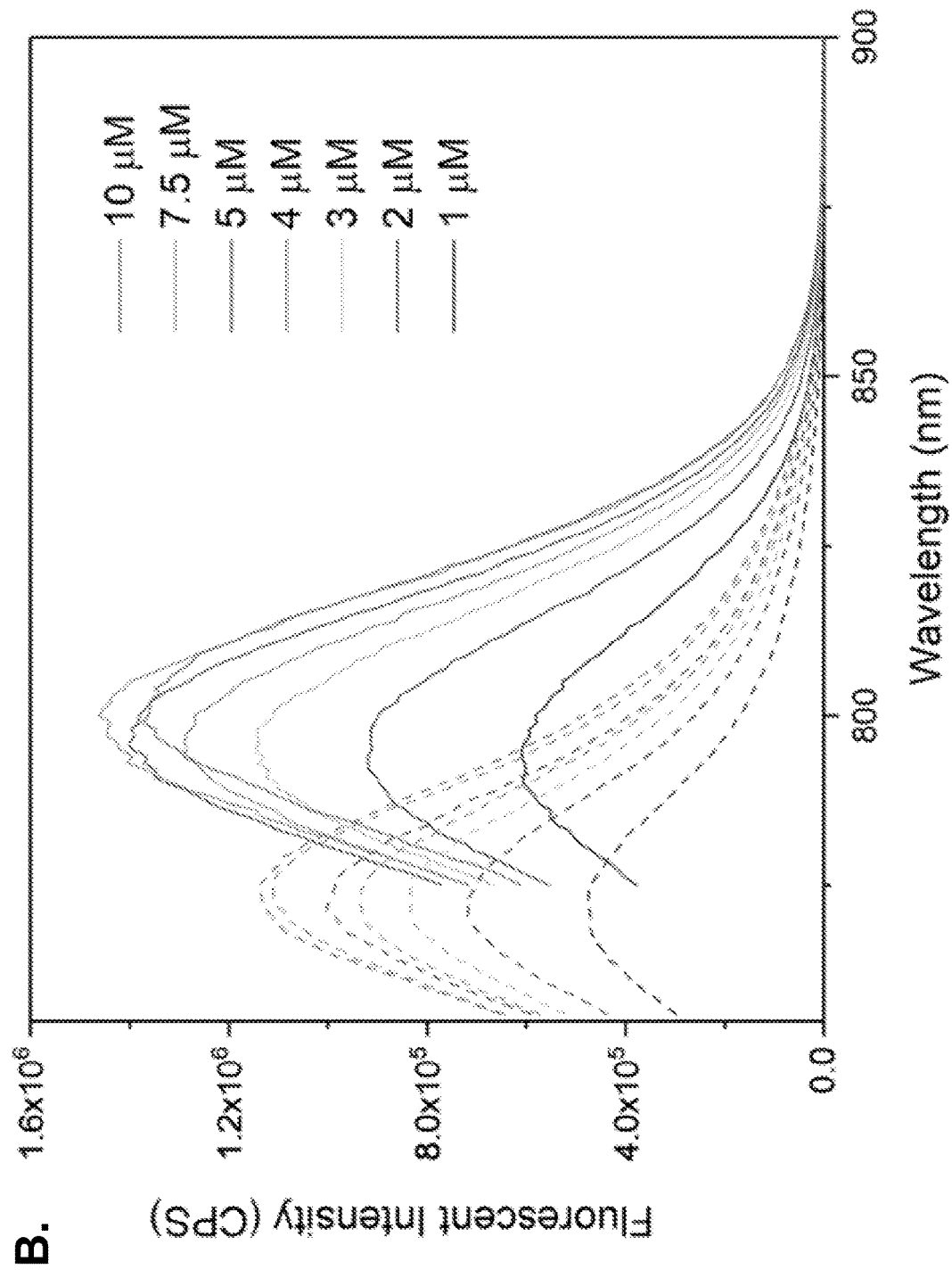

FIG. 8. a) Absorption and b) emission spectra of s775z (solid line) and 756z (dashed line) in 2 µM BSA at various concentrations. 2 µM BSA=2 µM solution of bovine serum albumin in PBS, pH 7.4. For s775z, $\lambda_{ex}$=765 nm. For 756z, $\lambda_{ex}$=745 nm.

Figure 9:
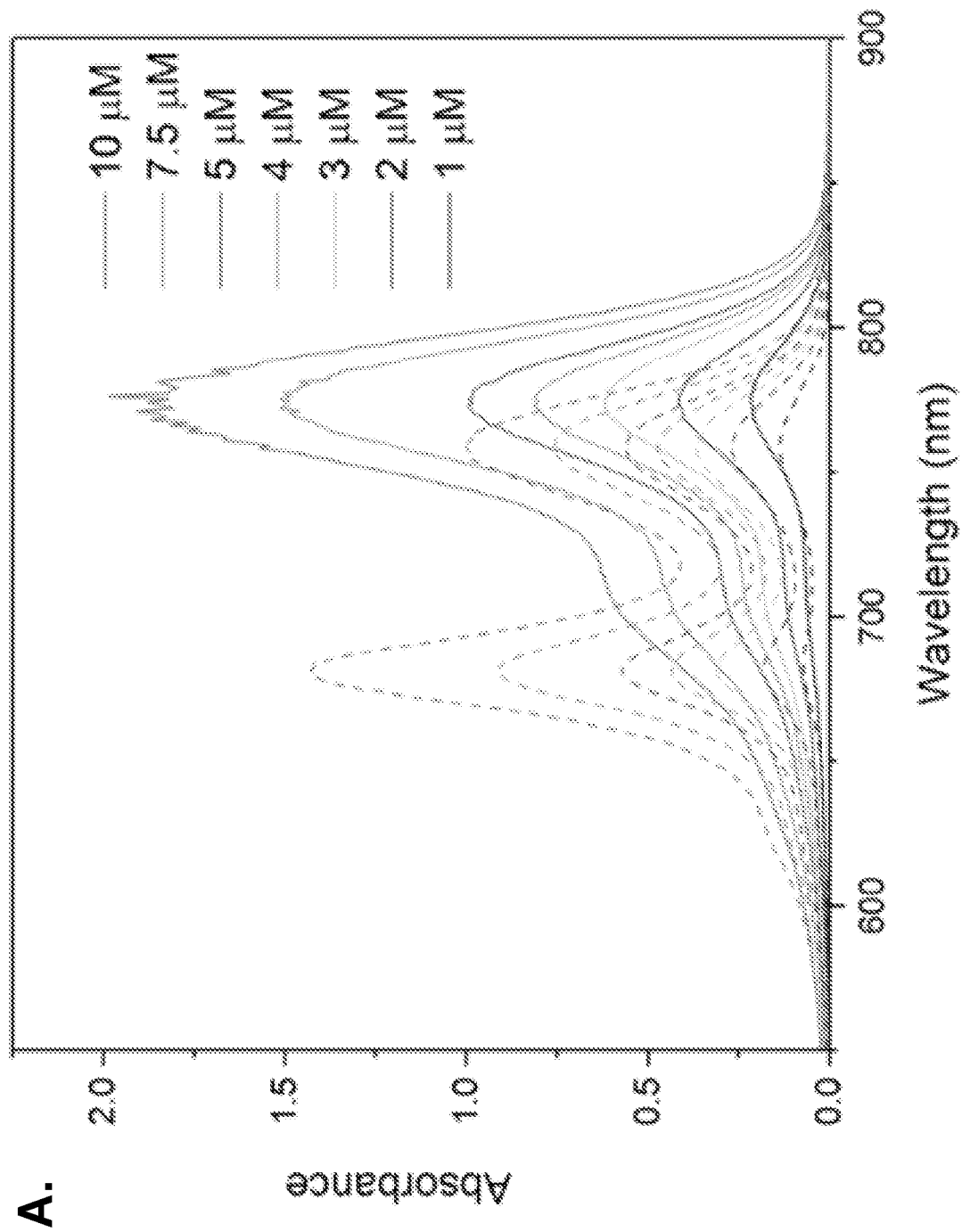
Figure 9:
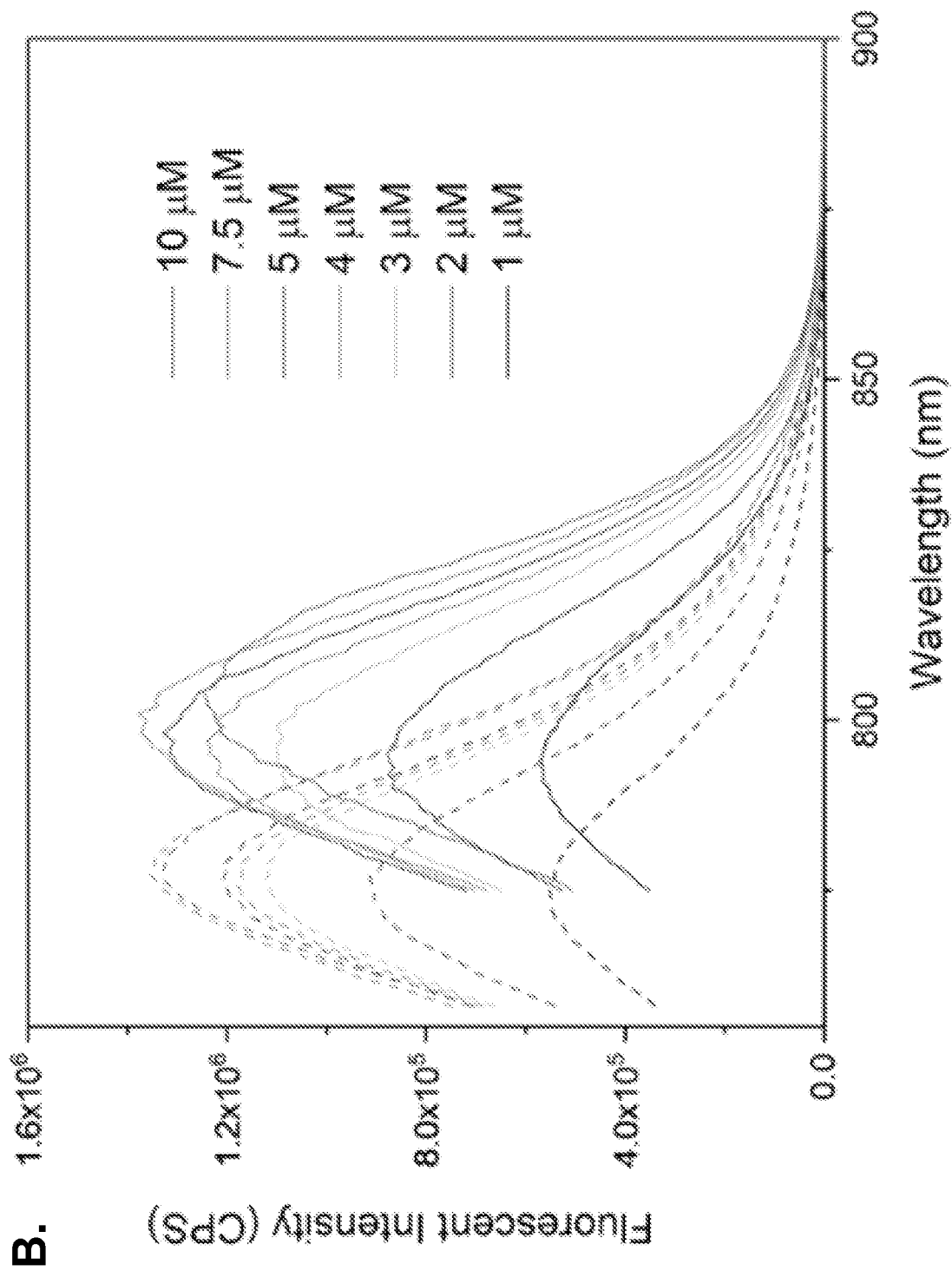

FIG. 9. a) Absorption and b) emission spectra of s775z (solid line) and 756z (dashed line) in 100% FBS at various concentrations. FBS=fetal bovine serum. For s775z, $\lambda_{ex}$=765 nm. For 756z, $\lambda_{ex}$=745 nm.

Figure 10:
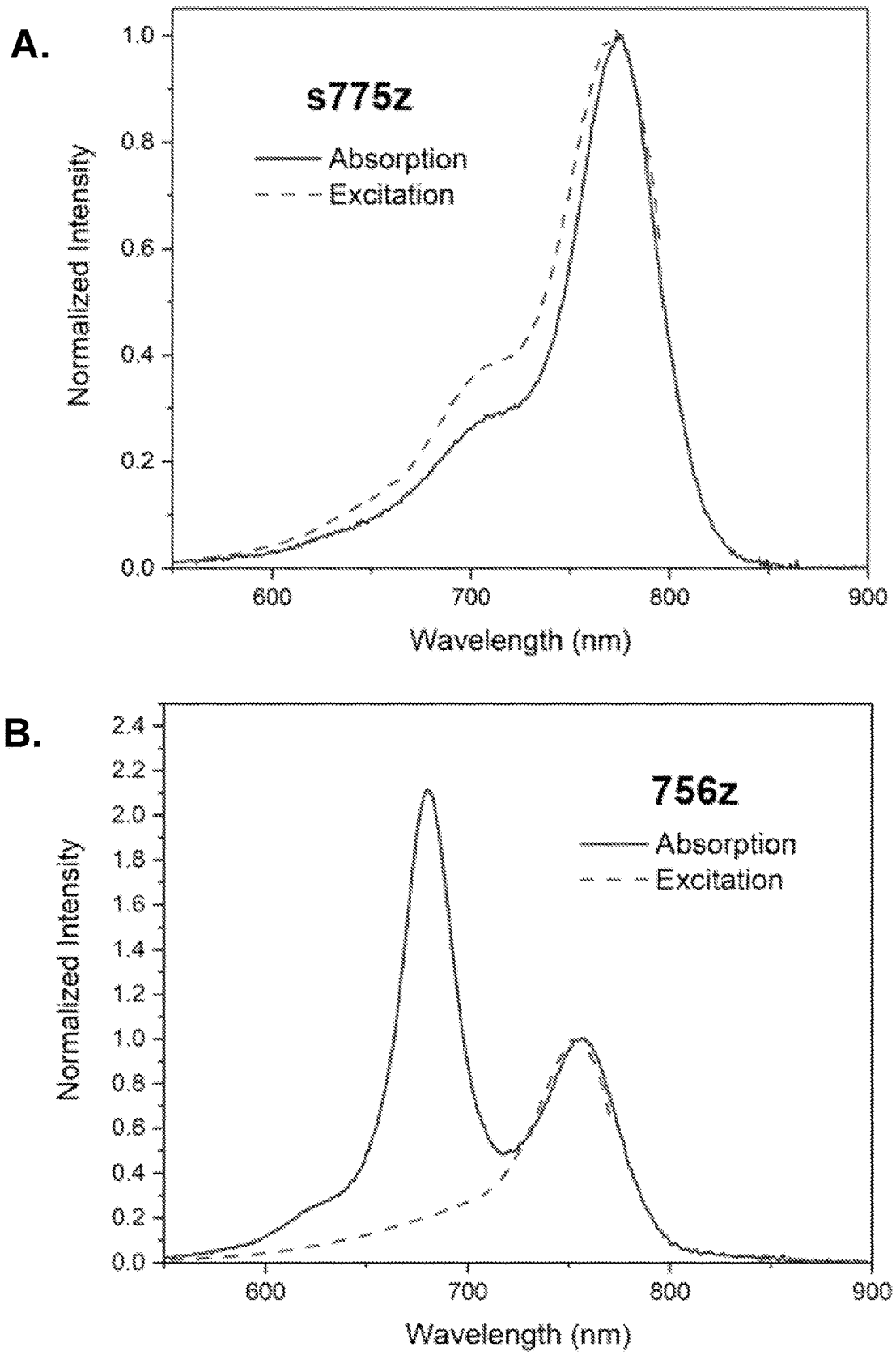
Figure 10:
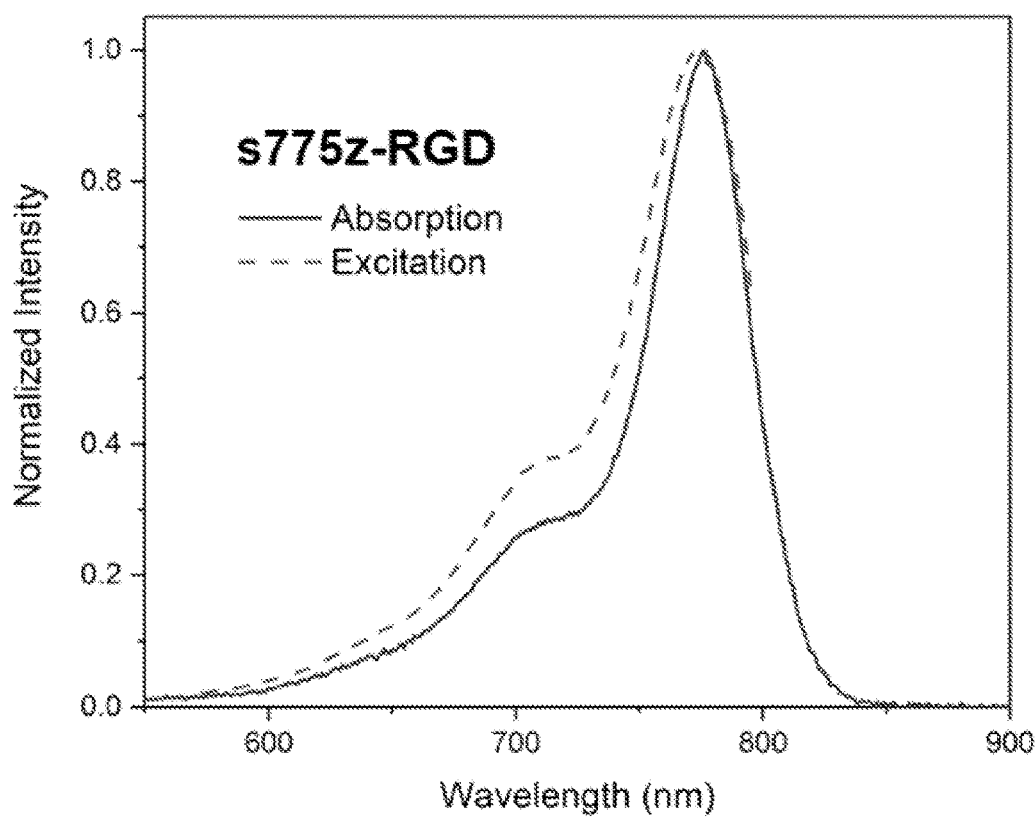
Figure 10:
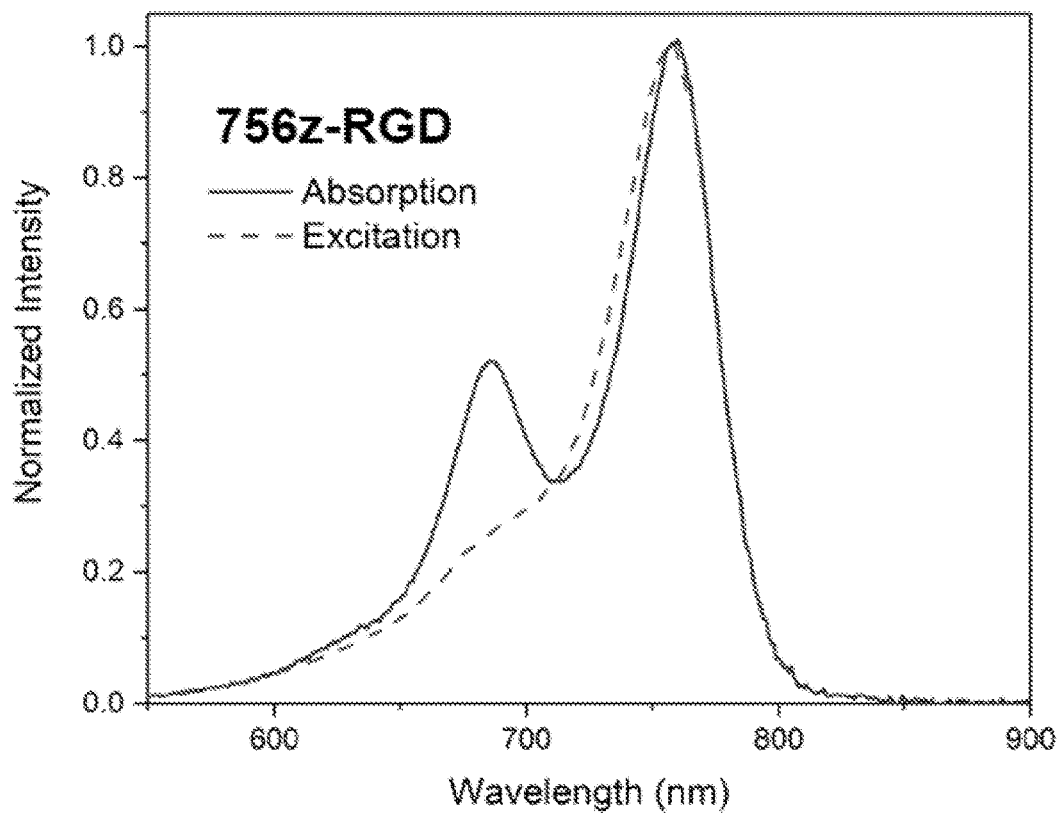

FIG. 10. Absorption (red solid line) and excitation (blue dashed line) spectra of a) s775z, b) 756z, c) s775z-RGD and d) 756z-RGD in water (2 µM). The excitation spectra of 756z and 756z-RGD indicate that the H-aggregation bands are non-fluorescent. For s775z and s775z-RGD, $\lambda_{em}$=805 nm. For 756z and 756z-RGD, $\lambda_{em}$=780 nm.

Figure 11:
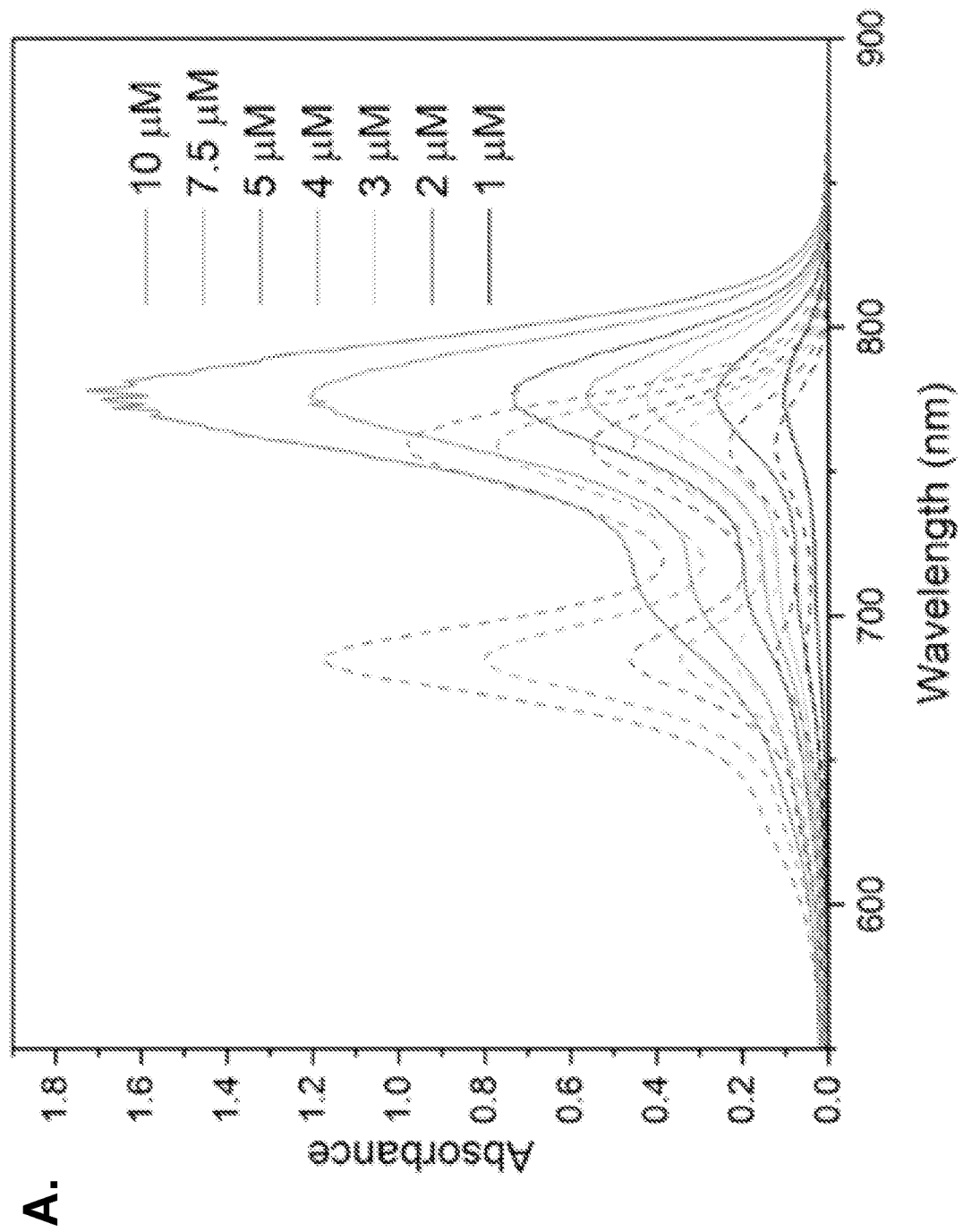
Figure 11:
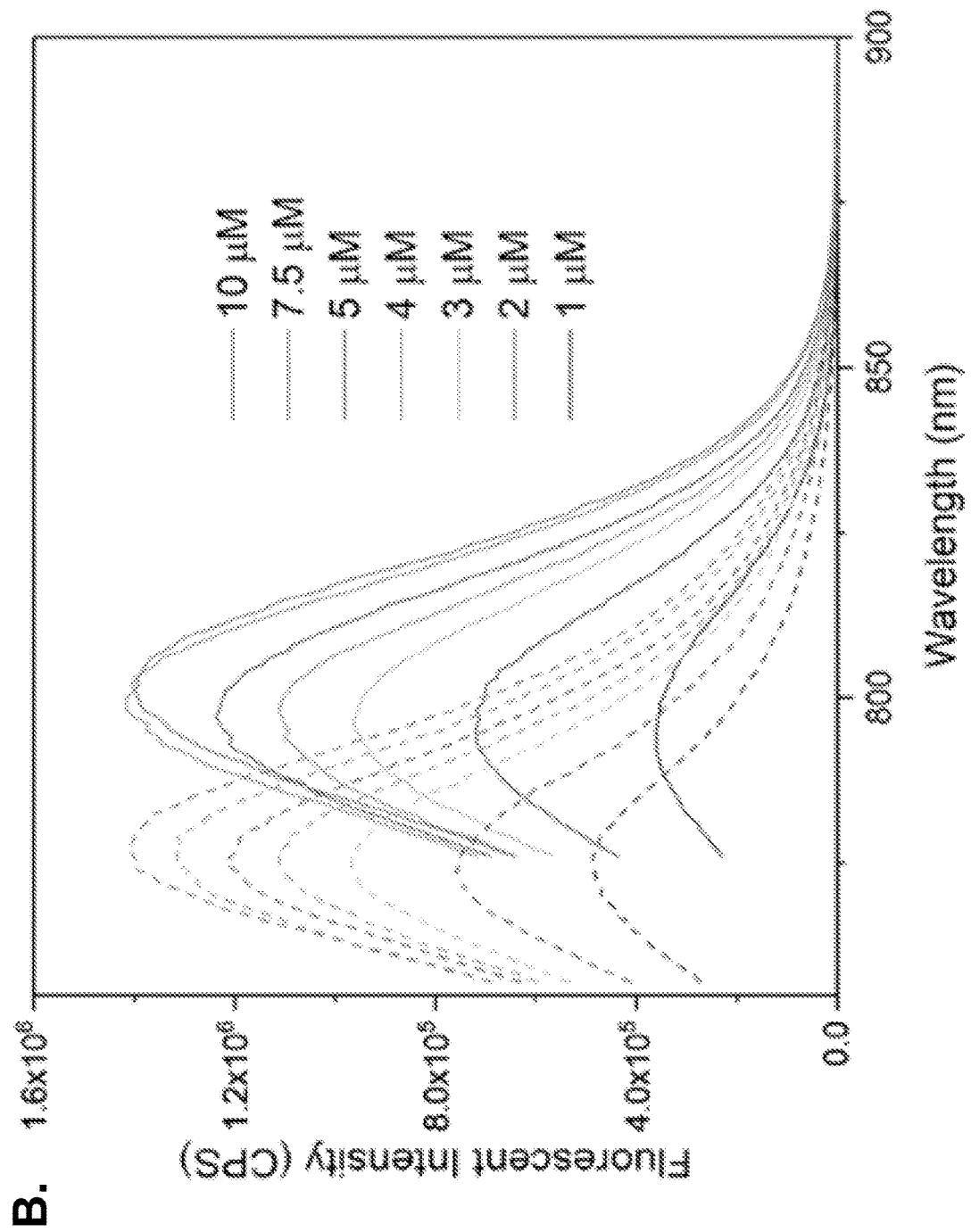

FIG. 11. a) Absorption and b) emission spectra of s775z-RGD (solid line) and 756-RGD (dashed line) in water at various concentrations. For s775z-RGD, $\lambda_{ex}$=765 nm. For 756-RGD, $\lambda_{ex}$=745 nm.

Figure 12:
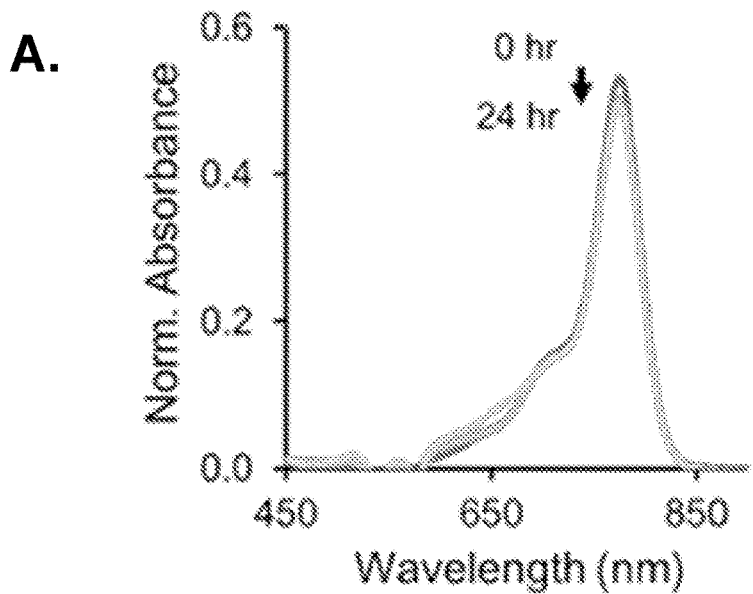
Figure 12:
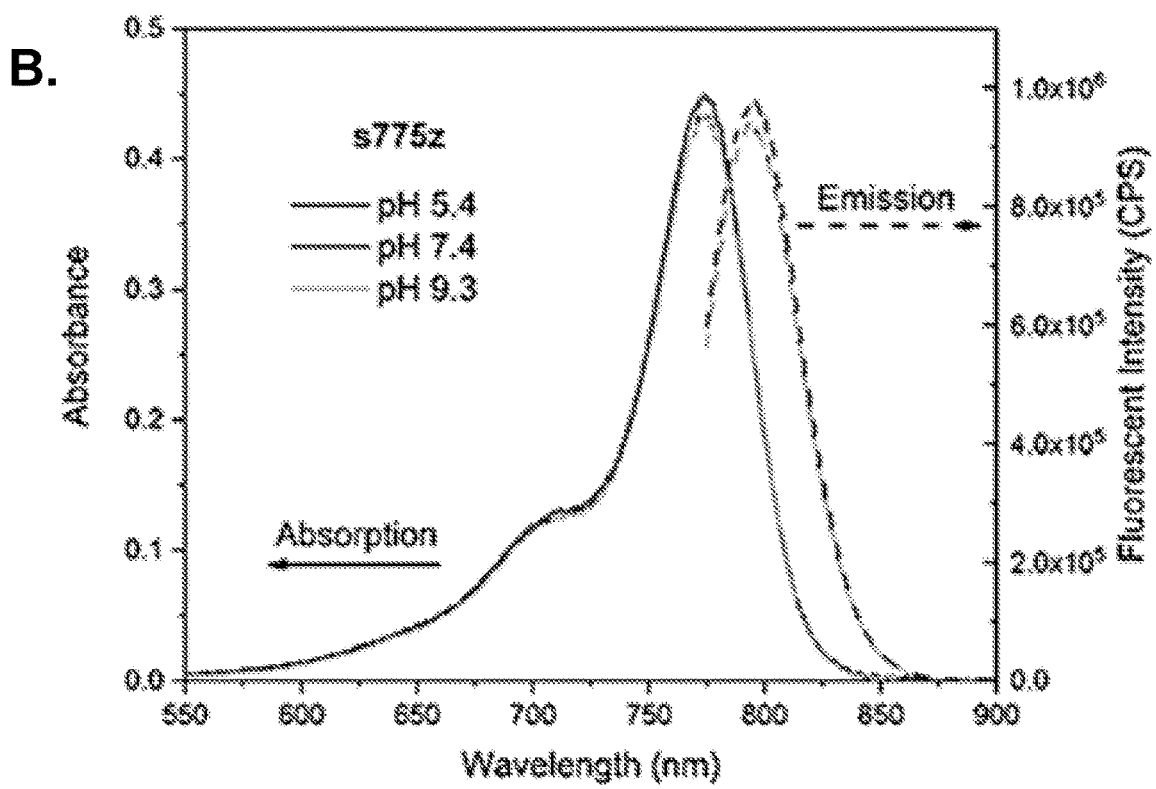
Figure 12:
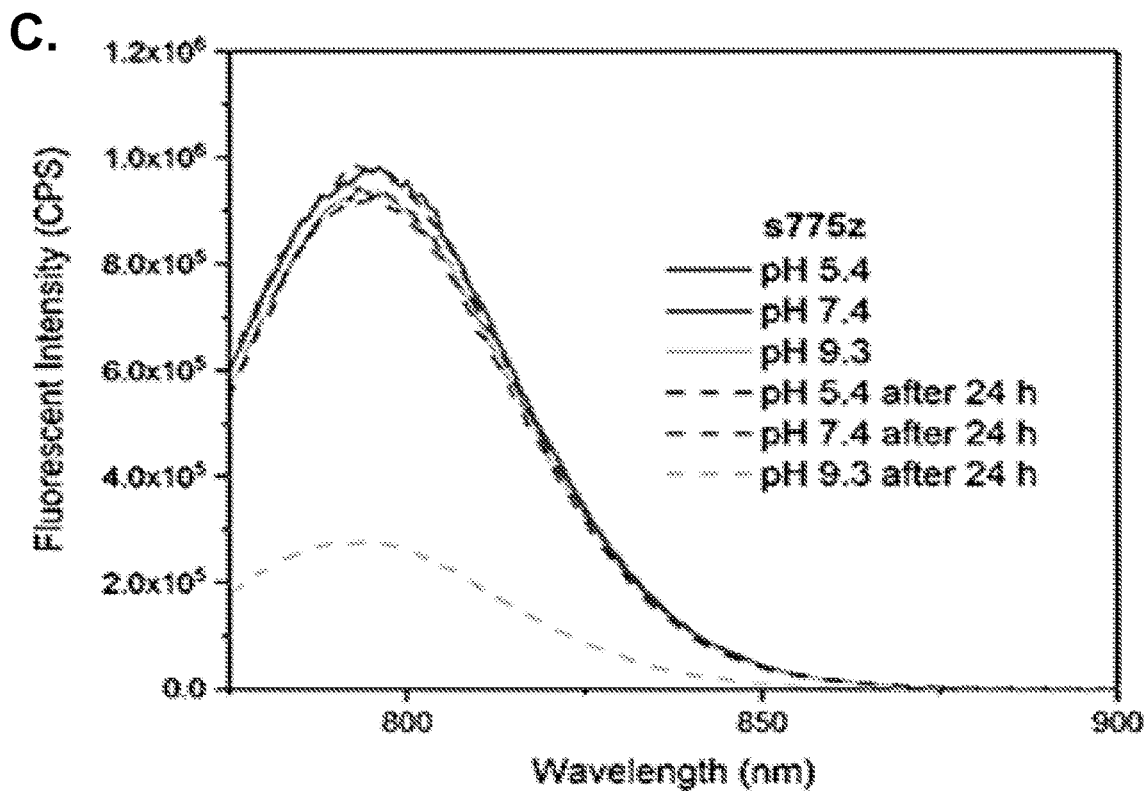

FIG. 12. a) Negligible change in absorbance for shielded heptamethine s775z (2 µM) in 100% fetal bovine serum after 24 hr at 37° C., pH 7.4. b) No change in absorbance/emission profile for s775z (2 µM) across the pH range of 5-9. c) No change in fluorescence for s775z (2 µM) after 24 hr at pH 5-7.

Figure 13:
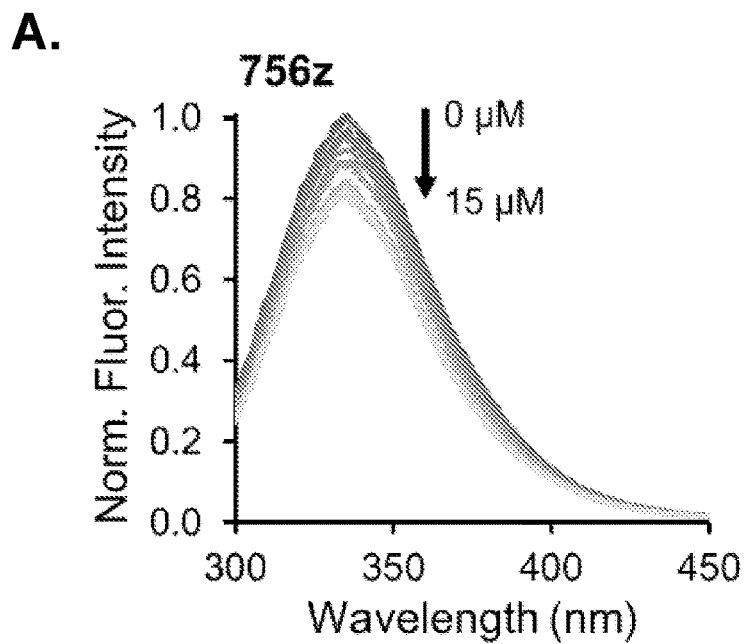
Figure 13:
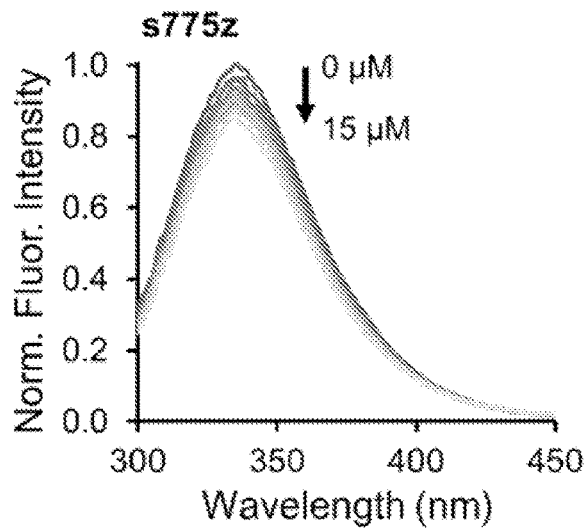
Figure 13:
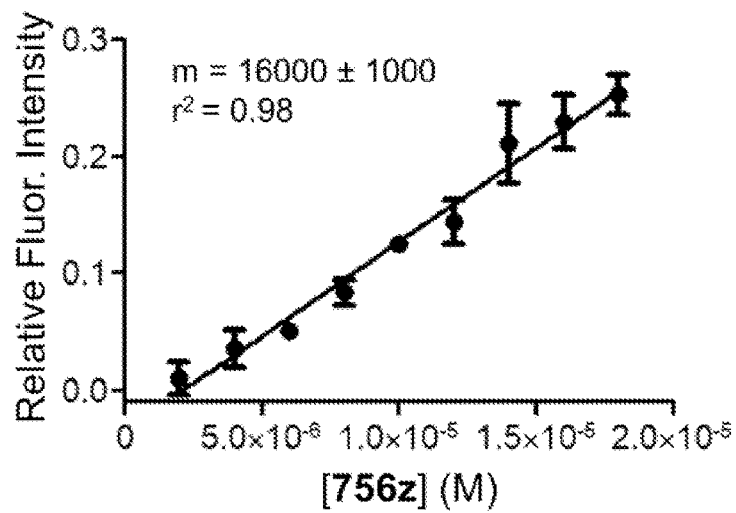
Figure 13:
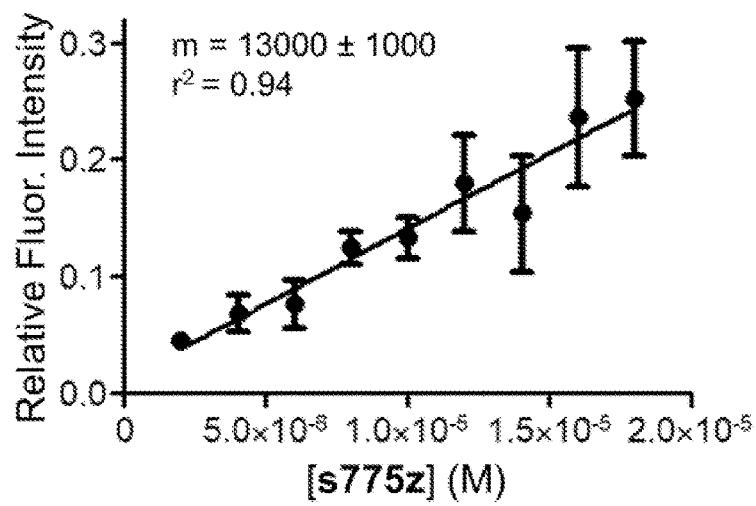
Figure 13:
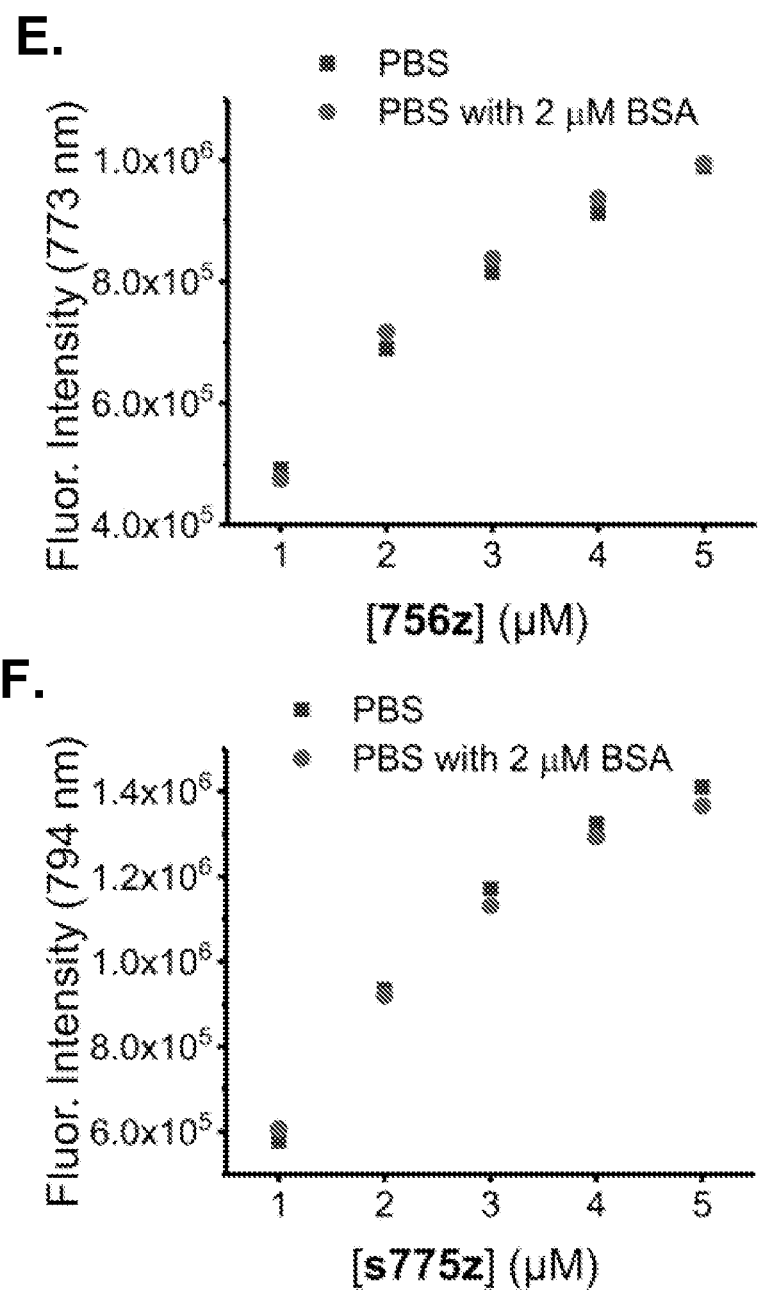

FIG. 13. Aliquots of 756z and s775z were added incrementally (up to 15 µM) to a solution of bovine serum albumin (BSA, 2 µM) at 37° C. The BSA tryptophan fluorescence intensity (ex: 280 nm, slit width: 2 nm) was plotted as a function of dye concentration for a), c) 756z and b), d) s775z. The relative fluorescence intensity at 335 nm was determined using the following equation, where $F_0$ is the initial fluorescence intensity, F is the fluorescence intensity after each aliquot addition of dye, and the slope of the trend line (m) corresponds to $K_a$±SD.

$$\text{Relative Fluorescence Intensity} = \frac{F_0 - F}{F}$$

Graph of fluorescence intensity for e) 756z (ex: 745 nm, em: 773 nm) and f) s775z (ex: 765 nm, em: 794 nm) in PBS at various concentrations, in the presence and absence of BSA (2 µM).

Figure 14:
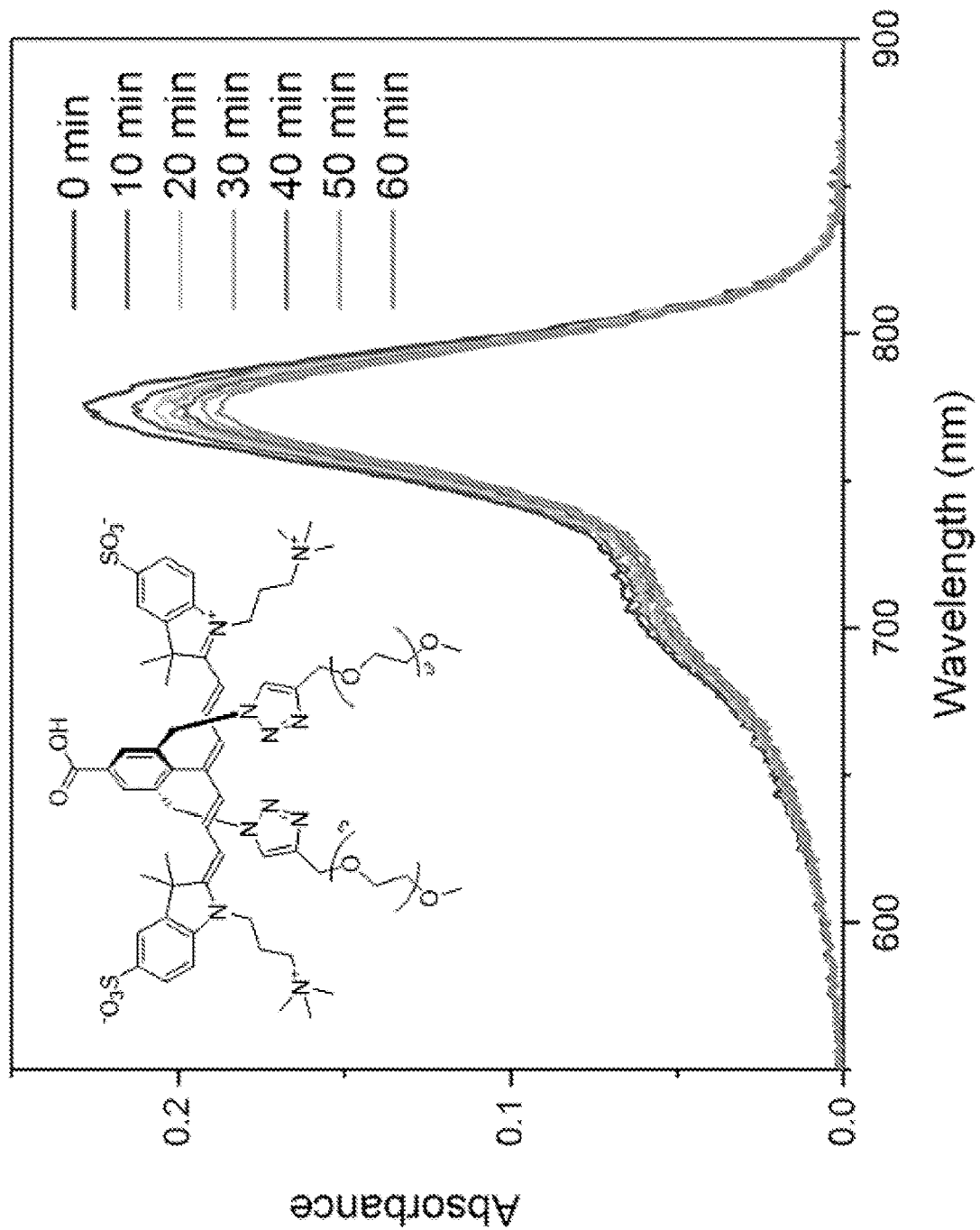

FIG. 14. Absorption change of s775z (1 µM, PBS, 23° C.) irradiated by a Xenon lamp with a 620 nm long-pass filter.

Figure 15:
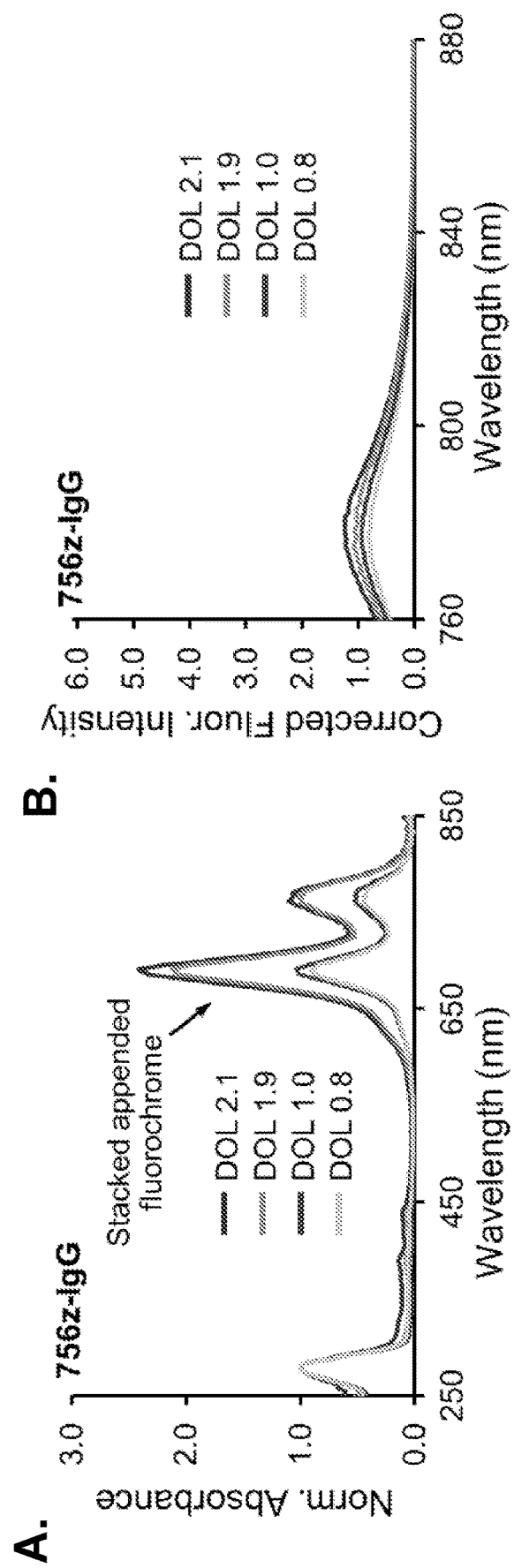
Figure 15:
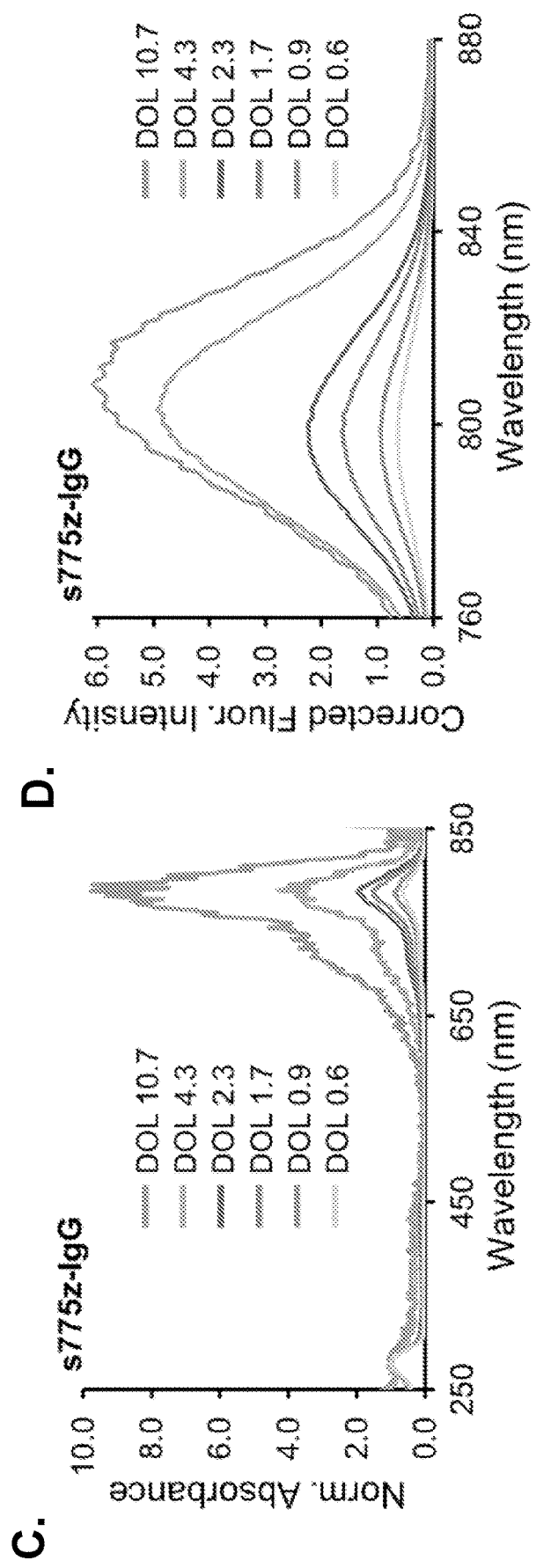

FIG. 15. Photophysical properties of goat IgG antibody bioconjugates. Absorbance and emission spectra in buffer B for a), b) 756z-IgG and c), d) s775z-IgG. Absorbance spectra were normalized to the absorbance at 280 nm. Emission spectra (ex: 745 nm, slit width 4 nm) were divided by the fluorescence emission intensity at 355 nm (ex: 280 nm, slit width: 2 nm) to obtain corrected fluorescence spectra that accounts for variations in antibody concentration. DOL, degree of labeling.

Figure 16:
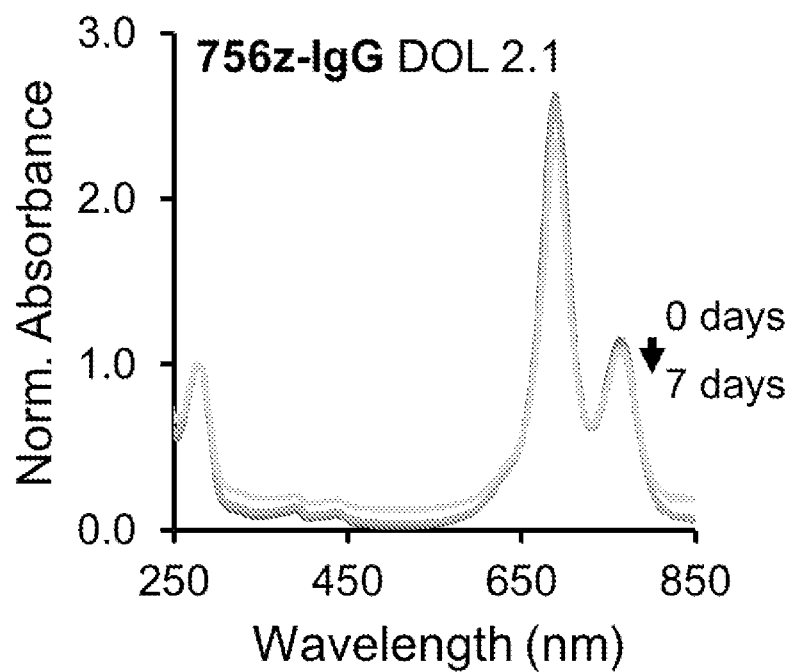
Figure 16:
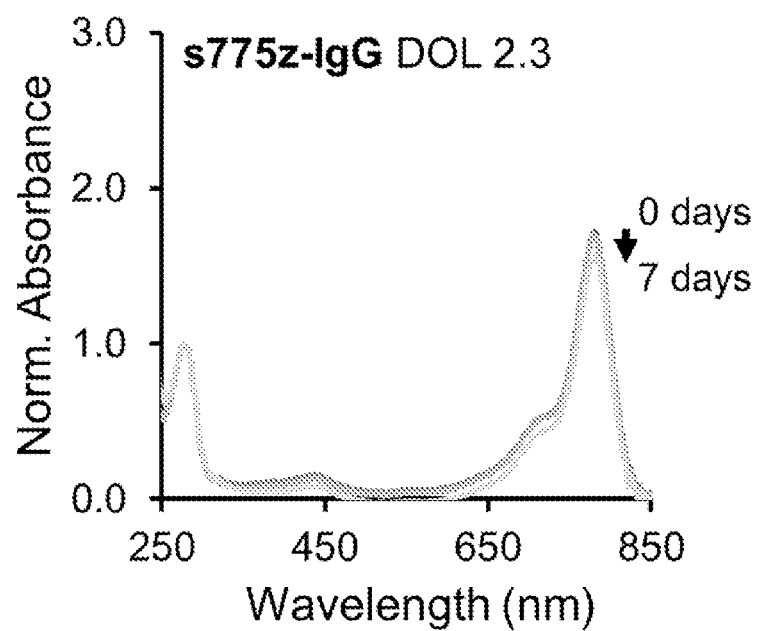

FIG. 16. Stability of antibody conjugates at 4° C. in buffer B over 7 days. Absorbance spectra of a) 756z-IgG DOL 2.1 and b) s775z-IgG DOL 2.3.

Figure 17:
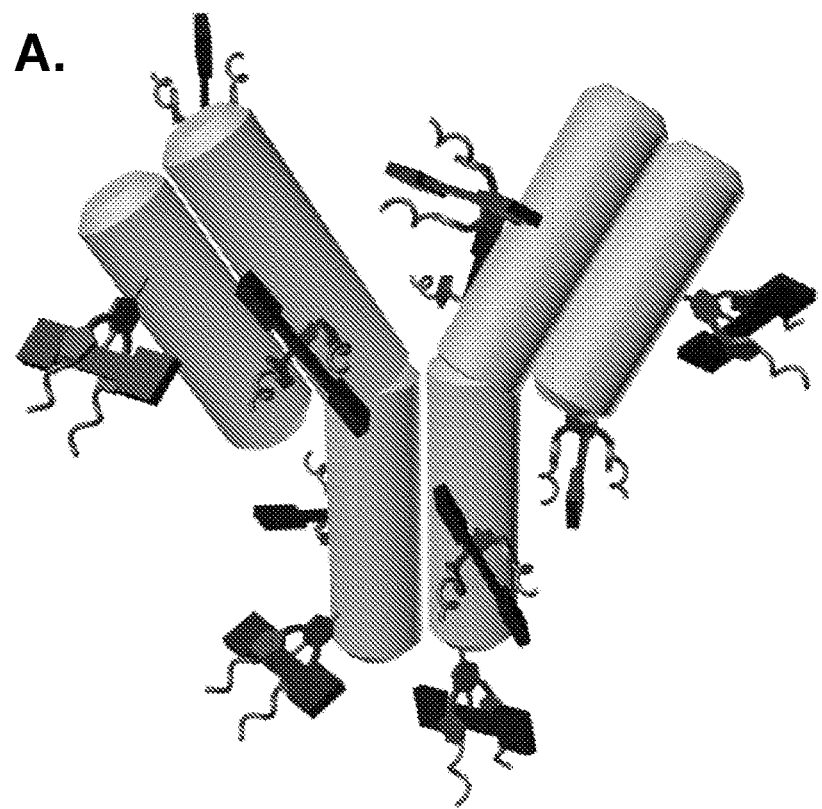
Figure 17:
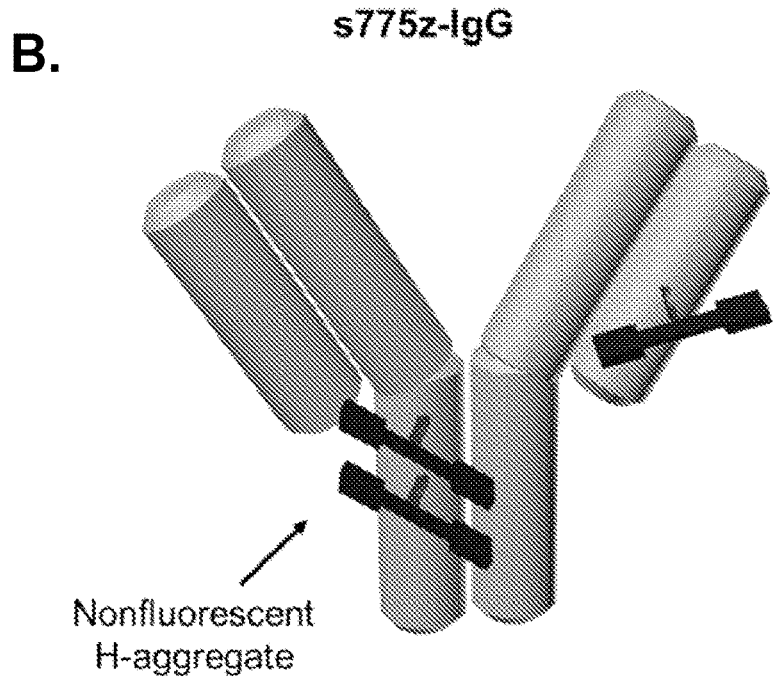

FIG. 17. Schematic picture of IgG antibody labeled with: a) eleven copies of s775z to give s775z-IgG DOL=11, the two red shielding arms on each blue fluorochrome ensures that the s775z NHS ester molecules react with lysine residues that are quite separated from each other on the antibody surface. b) three copies of 756z to give 756z-IgG DOL=3, the propensity of 756z NHS ester molecules to self-aggregate favors dye attachment at proximal lysine positions on the IgG surface (stacked appended fluorochromes) leading to a highly quenched (non-fluorescent) antibody-dye conjugate that exhibits a strong "H-aggregate" peak at 680 nm in the absorption spectrum.

Figure 18:
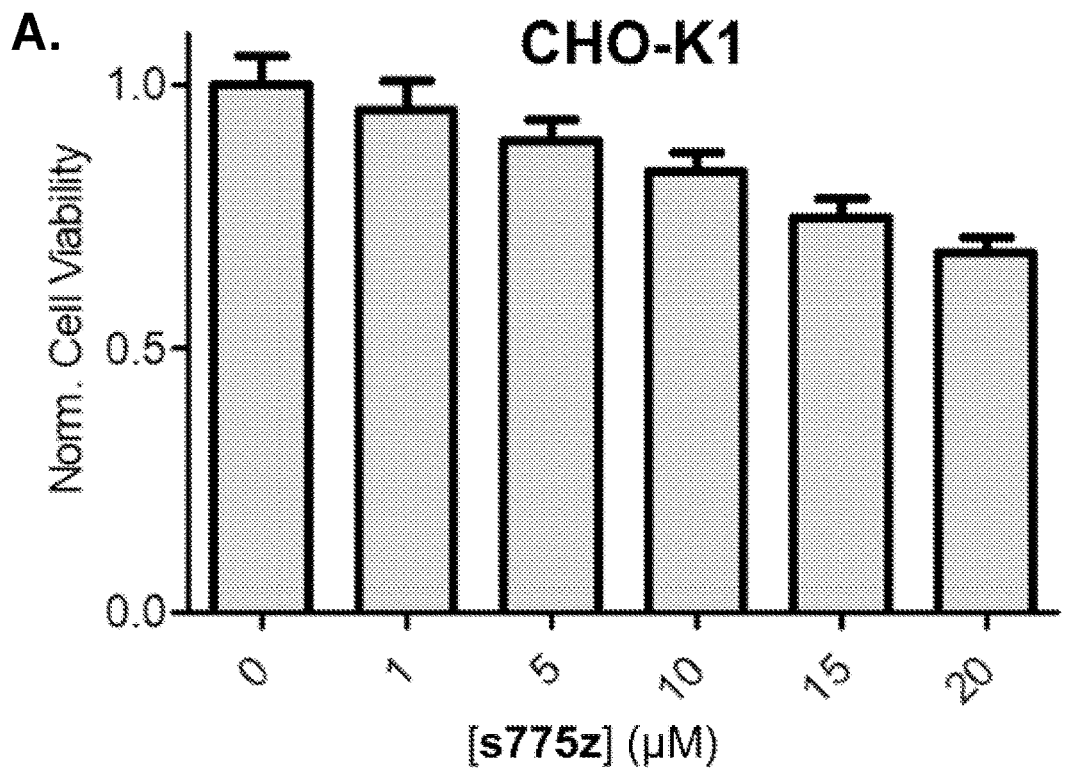
Figure 18:
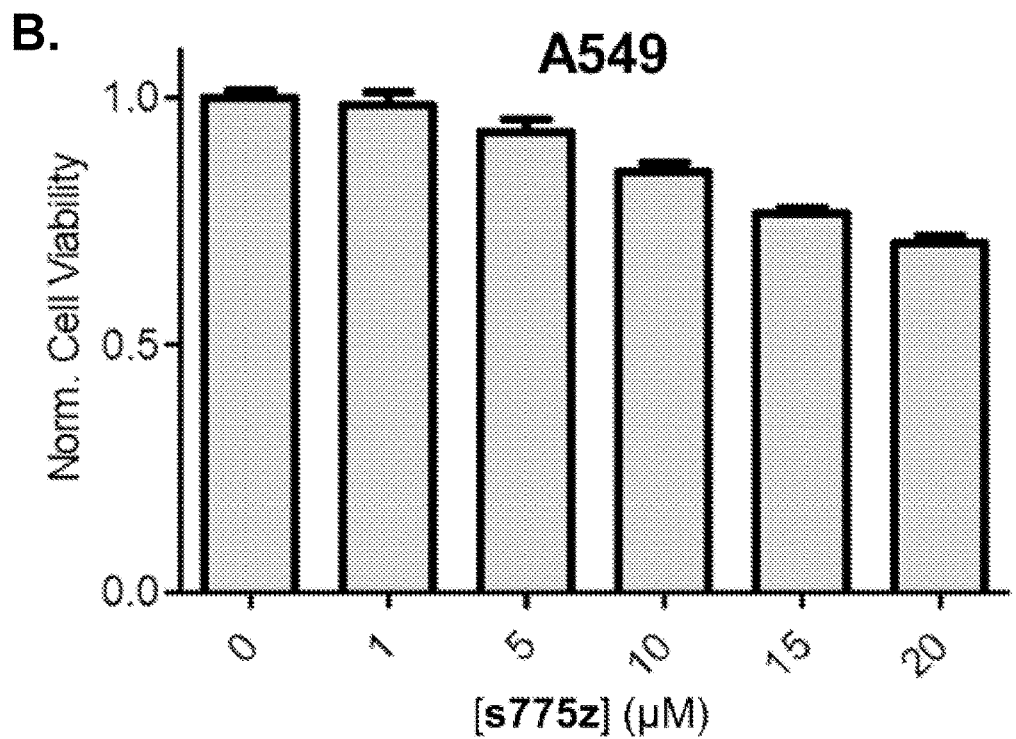
Figure 18:
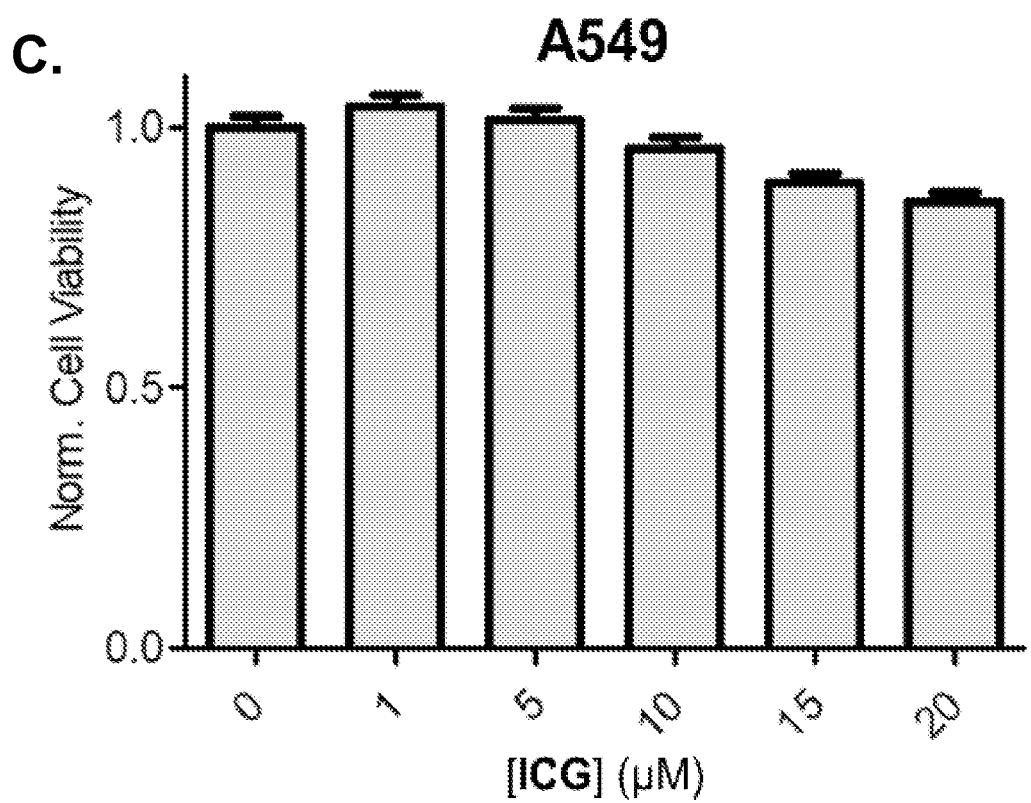

FIG. 18. MTT cell viability assay. a) CHO-K1 cells were treated for 24 hr at 37° C., 5% $CO_2$ with s775z. A549 cells were treated for 24 hr at 37° C., 5% $CO_2$ with either b) s775z or c) ICG.

Figure 19:
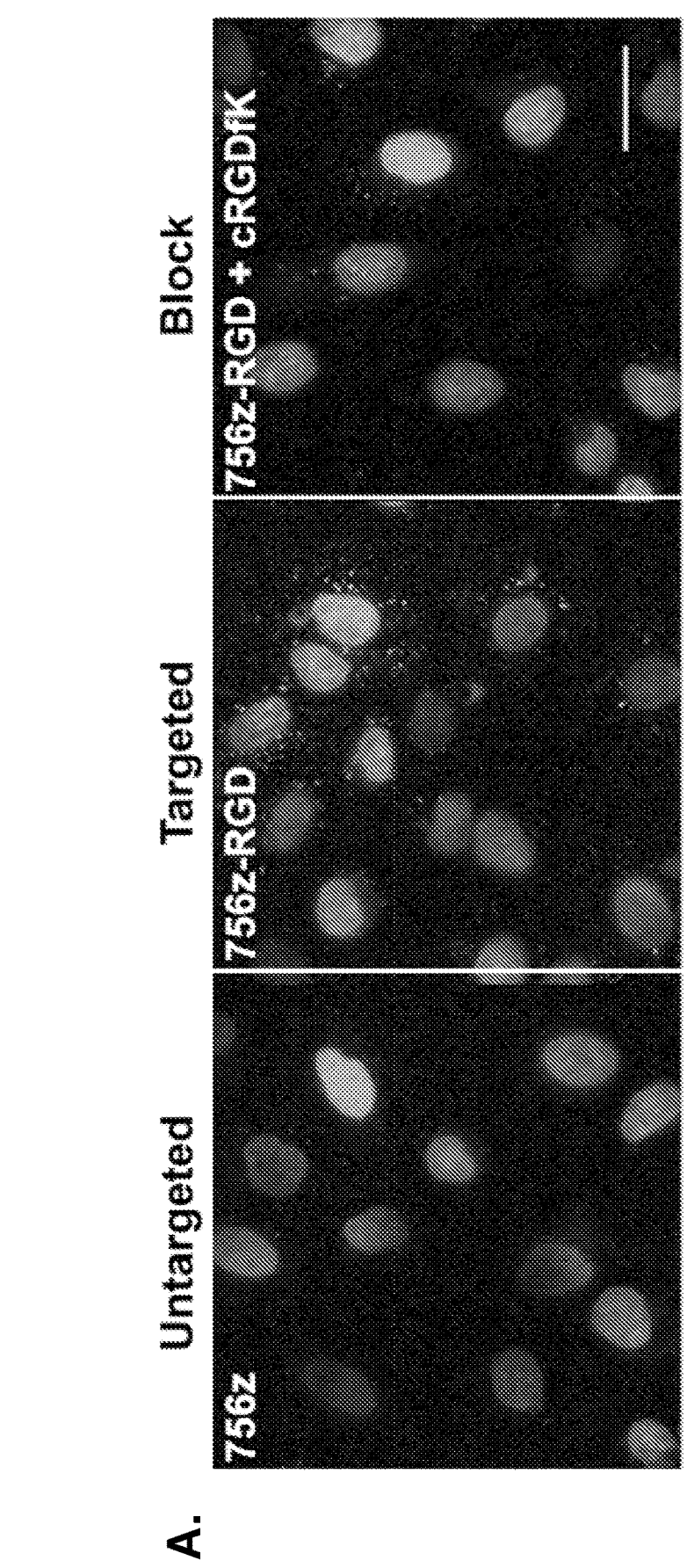
Figure 19:
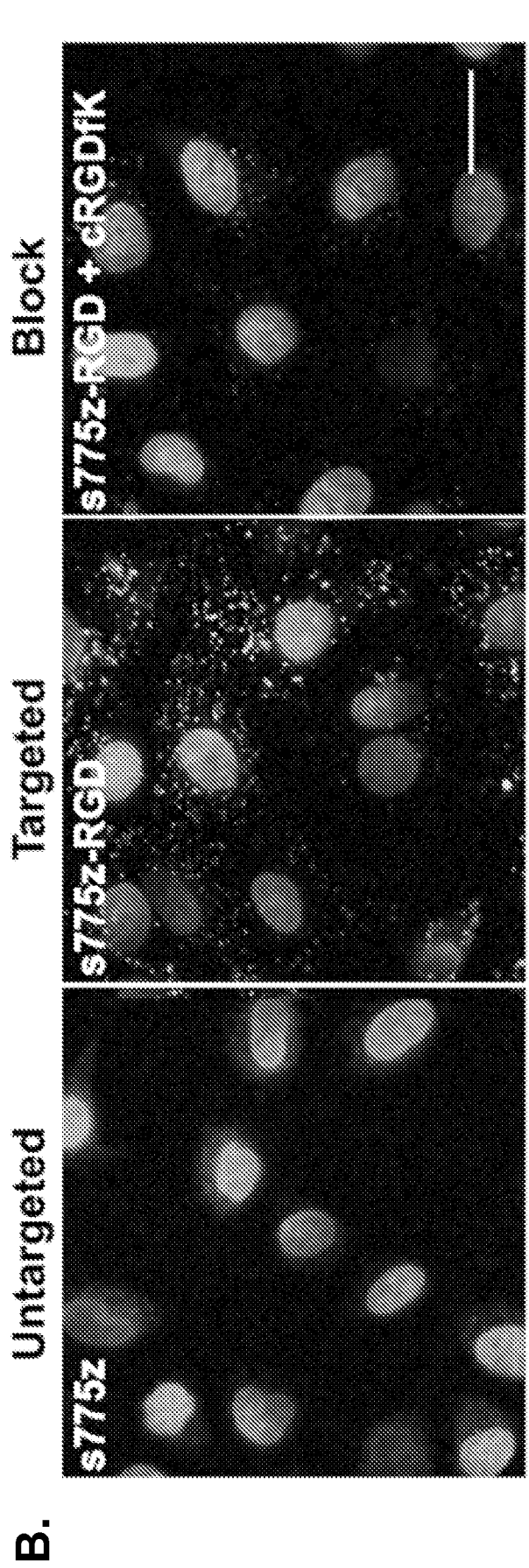
Figure 19:
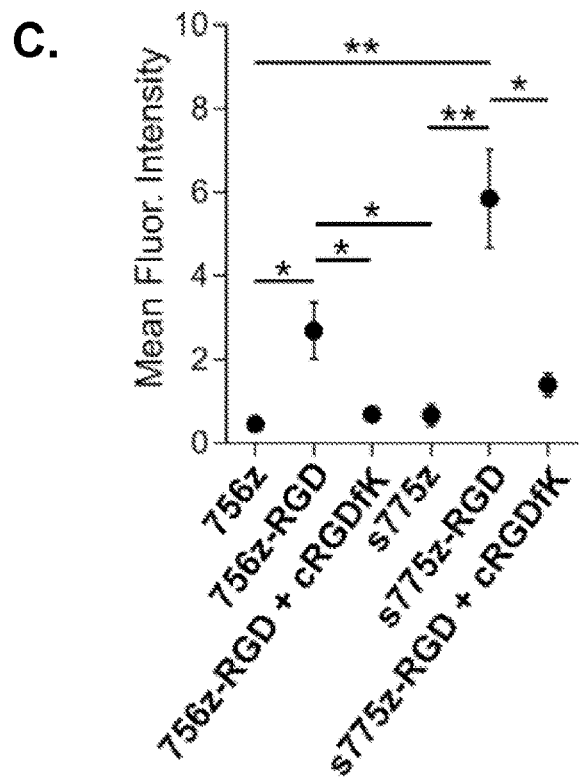

FIG. 19. Representative epifluorescence micrographs of integrin positive A549 cells that were treated for 1 hr with 10 µM of either (a) unshielded 756z or its targeted analogue 756z-RGD, (b) shielded s775z and its targeted analogue s775z-RGD. The two targeted dyes contain a cyclic peptide cRGDfK sequence for targeting the overexpressed cell surface integrin receptors. The blocking experiments added 100 µM of free cRGDfK prior to the incubation with RGD probes. NIR heptamethine fluorescence is shown in green, and Hoechst nuclear stain is shown in blue. Scale bar=30 µm. (c) Quantification of intracellular mean fluorescence intensities as a measure of NIR dye internalization (6 micrographs per condition and 3 replicates). * indicates $p<0.05$, and ** $p<0.01$.

Figure 20:
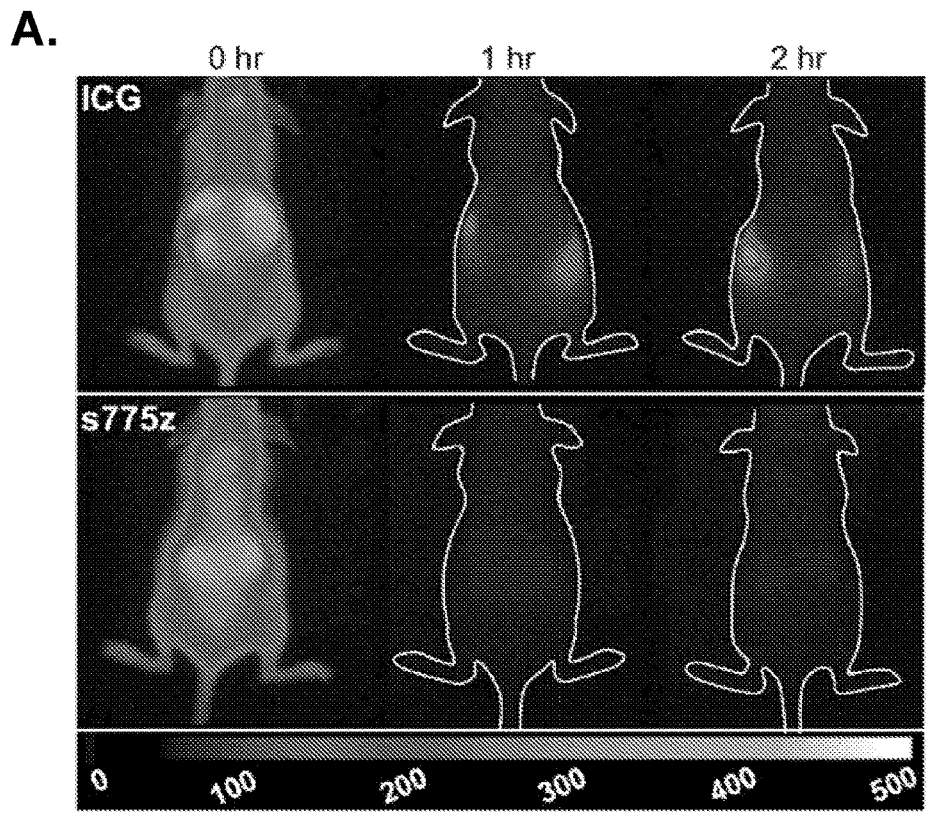
Figure 20:
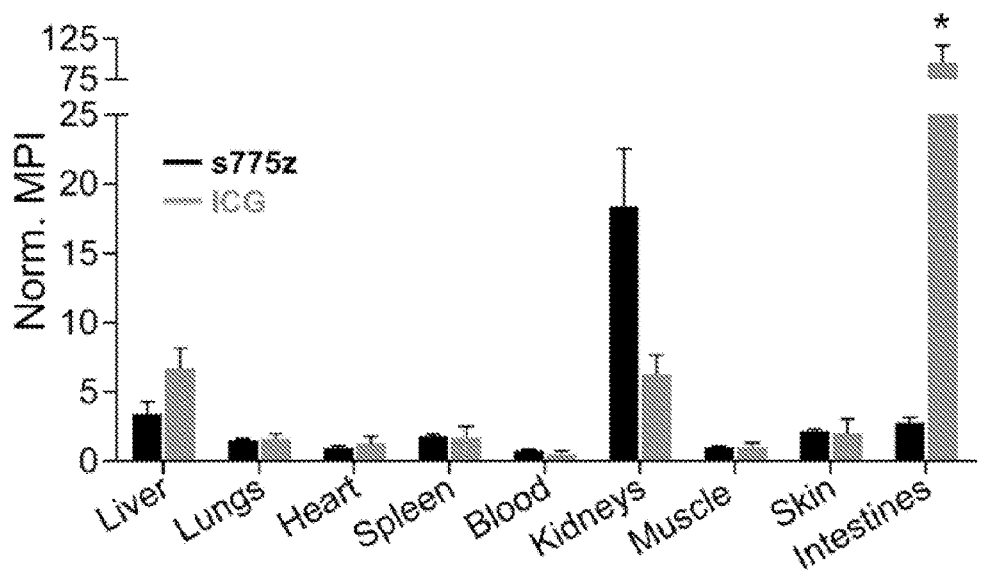

FIG. 20. a) Representative whole-body NIR fluorescence images of living SKH1 hairless mice at 0, 1, and 2 hr after intravenous injection of either ICG or s775z (10 nmol). b) In vivo biodistribution of s775z and ICG in normal mice. The SKH1 hairless mice (N=4) received an intravenous injection of ICG or s775z (10 nmol) and were sacrificed after 2 hr. The mean pixel intensity (MPI) for each excised organ is relative to the MPI for thigh muscle from the same animal; error bars indicate ±SEM. * indicates $p<0.05$. Note: the y-axis is truncated.

Figure 21:
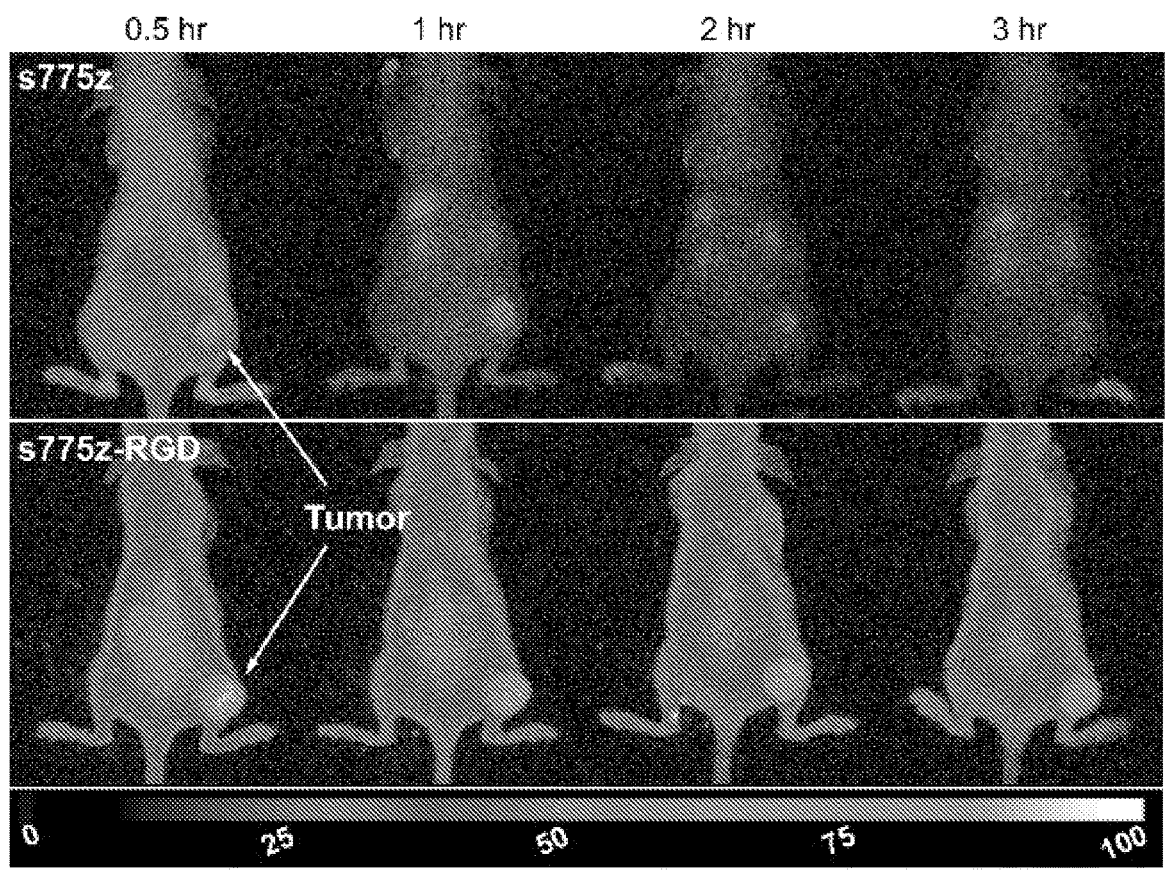

FIG. 21. Representative whole-body fluorescence images of living nude mice bearing a subcutaneous tumor (human A549 cells) at 0.5, 1, 2, and 3 hr after intravenous injection of either s775z or s775z-RGD (10 nmol). Fluorescence intensity scale in arbitrary units.

Figure 22:
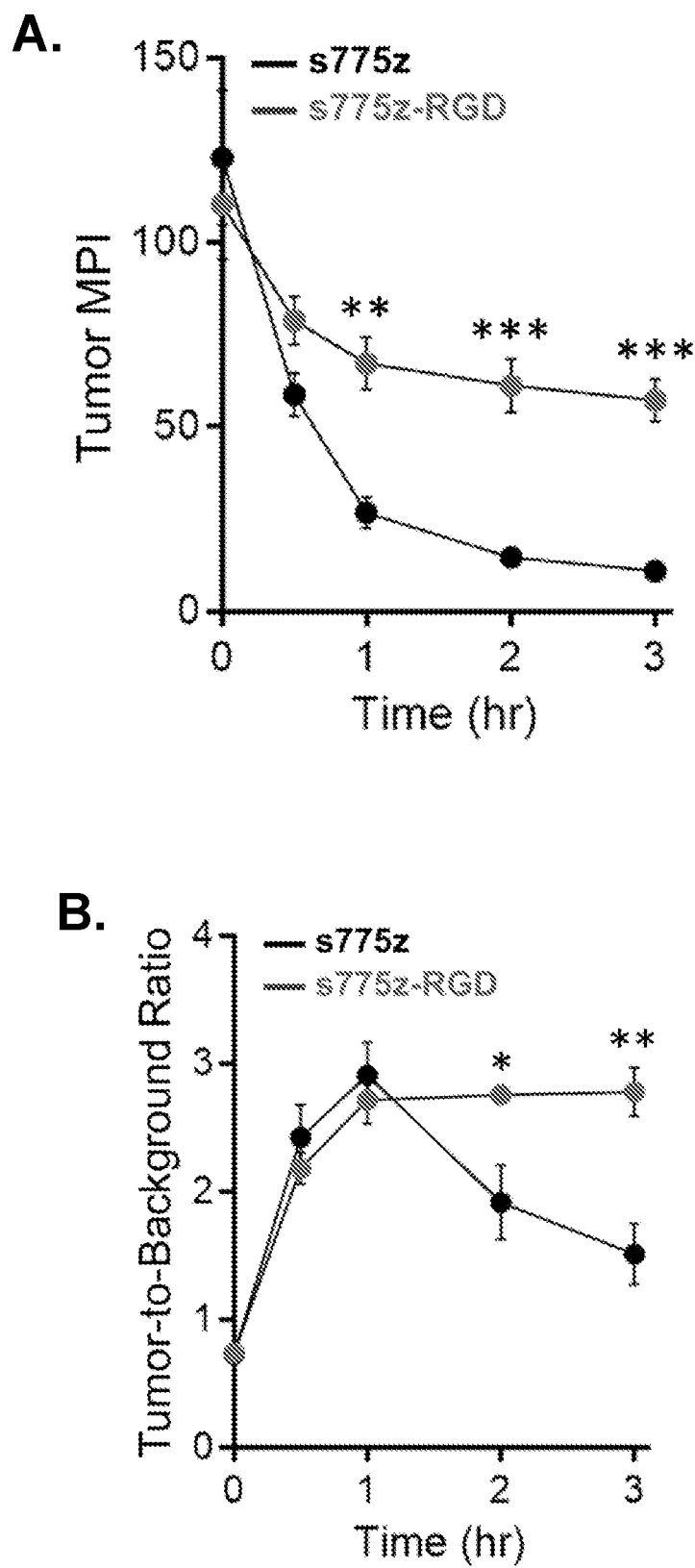

FIG. 22. a) Tumor MPI, and b) Tumor-to-Background Ratio for living nude mice bearing a subcutaneous tumor (human A549 cells) after intravenous injection of s775z or s775z-RGD (10 nmol). The fluorescence mean pixel intensity (MPI) of two regions of interest (equal sizes) on the fluorescent images (tumor or background site on the opposite flank), at different post-injection time points, were measured using ImageJ2 software and used to calculate values for Tumor MPI, and Tumor-to-Background Ratio. * indicates $p<0.05$,  $p<0.01$, and * $p<0.001$.

Figure 23:
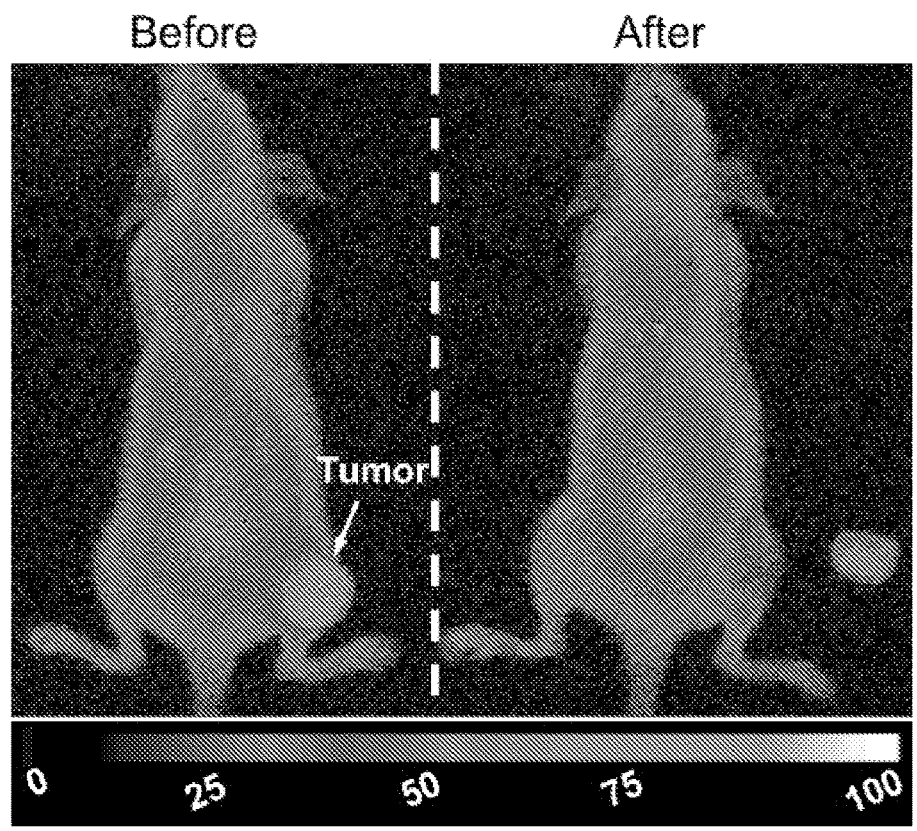

FIG. 23. Representative NIR fluorescence images of a nude mouse bearing a subcutaneous tumor (human A549 cells) at 3 hr after intravenous injection of s775z-RGD (10 nmol). Images were taken before mock surgery and after the tumor was fully excised. Fluorescence intensity scale in arbitrary units.

Figure 24:
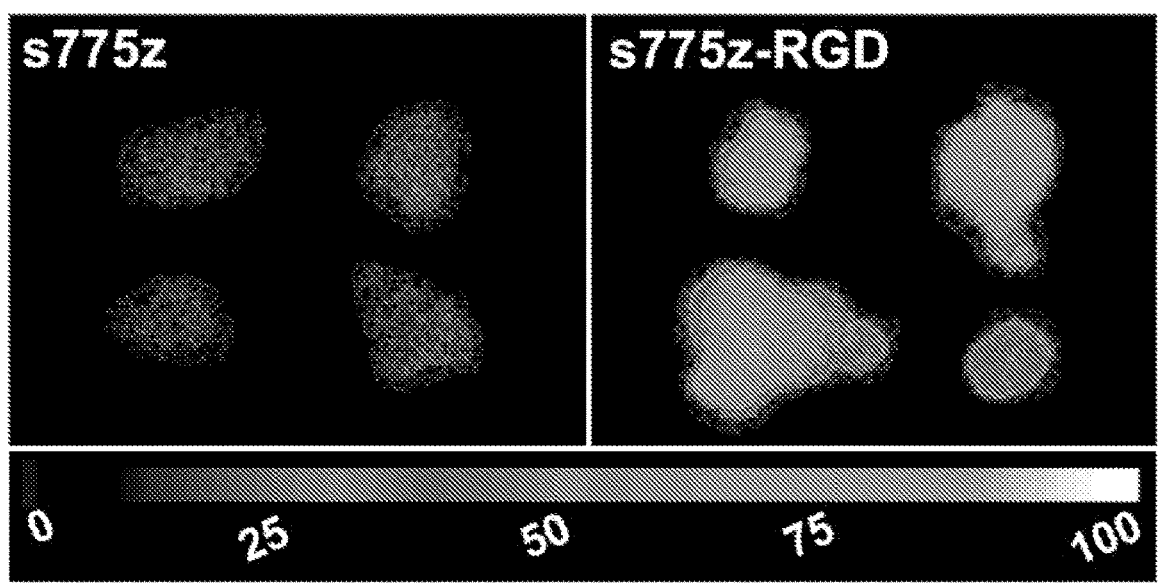

FIG. 24. NIR fluorescence images of excised subcutaneous tumors (human A549 cells) that were harvested from different mice at 3 hr after intravenous injection of either s775z or s775z-RGD (10 nmol) (each N=4). Fluorescence intensity scale in arbitrary units.

Figure 25:
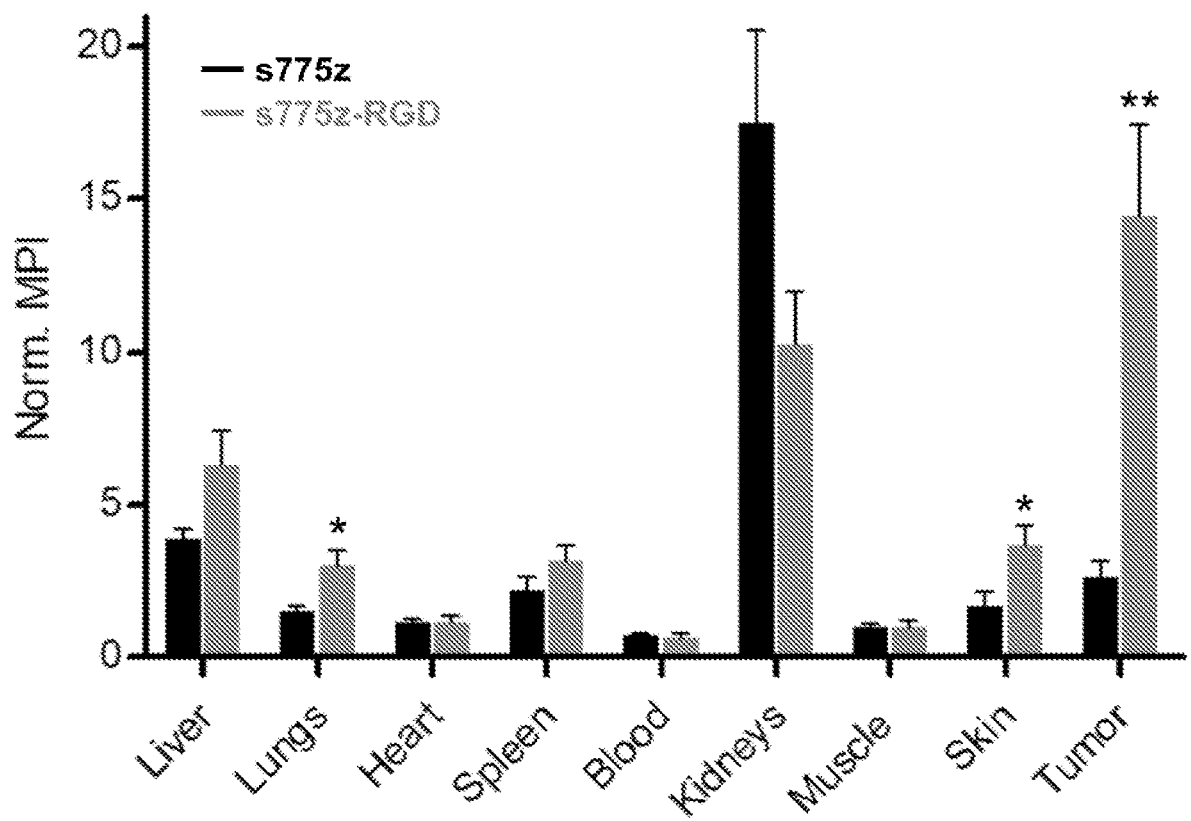

FIG. 25. Biodistribution of s775z and s775z-RGD in tumor-bearing mice. A549 xenograft nude mice received an intravenous injection of either s775z or s775z-RGD (10 nmol) and were sacrificed after 3 hr. The mean pixel intensity (MPI) for each excised organ is relative to the MPI for thigh muscle from the same animal; error bars indicate ±SEM. * indicates $p<0.05$, and ** $p<0.01$.

DETAILED DESCRIPTION

For about thirty years, chemical research on heptamethine cyanine dyes has focused on flat molecules with a polar periphery. This study validates a new three-dimensional structural strategy that simultaneously projects two shielding arms directly over each face of the polyene. Compared to the benchmark heptamethine cyanine dyes listed in Scheme 1, shielded s775z and its bioconjugates exhibit an unsurpassed combination of photophysical, physiochemical and biodistribution properties that greatly enhance bioimaging performance. Shielded s775z has a C-Aryl group at the meso position of a heptamethine polyene which makes the fluorochrome chemically more stable than the popular heptamethine cyanines CW800 or ZW800-1 which each have a more labile meso C-OAryl linkage. A large set of comparative NIR fluorescence studies compared s775z to unshielded control dye 756z and found that shielding prevents dye self-aggregation and non-specific biological interactions. Importantly, the shielding arms do not prevent high affinity targeting of bioconjugates to cell surface receptors, or renal clearance from the blood stream. Notably, the integrin targeted probe s775z-RGD permitted high contrast cancer cell microscopy and mouse tumor imaging, with the latter producing a very high Tumor-to-Background ratio and ultralow retention in background tissue. Additional bioconjugation studies showed that multiple copies of shielded s775z can be attached to an antibody to produce a densely labeled conjugate without any stacking of appended fluorochromes. Next generation versions of densely labeled s775z-antibodies can likely be used as very bright, fluorescent probes for deployment at microdoses in various diagnostics or clinical imaging procedures. Furthermore, shielded s775z exhibits much better photostability than the benchmark heptamethine cyanines CW800, ZW800-1, or UL766 whose polyenes are electronically activated to react with photogenerated singlet oxygen. The remarkably high photostability of s775z makes it very attractive for incorporation into modern photon-intensive microscopy experiments such as single molecule tracking or super resolution imaging, as well as emerging clinical procedures, such as fluorescence guided surgery, which require long periods of sustained light exposure. The synthetic modularity that underlies the structure of s775z enables easy customization of bioimaging performance by modifying the two shielding arms to rationally fine-tune pharmacokinetics, or the polyene structure to enhance photophysical properties.

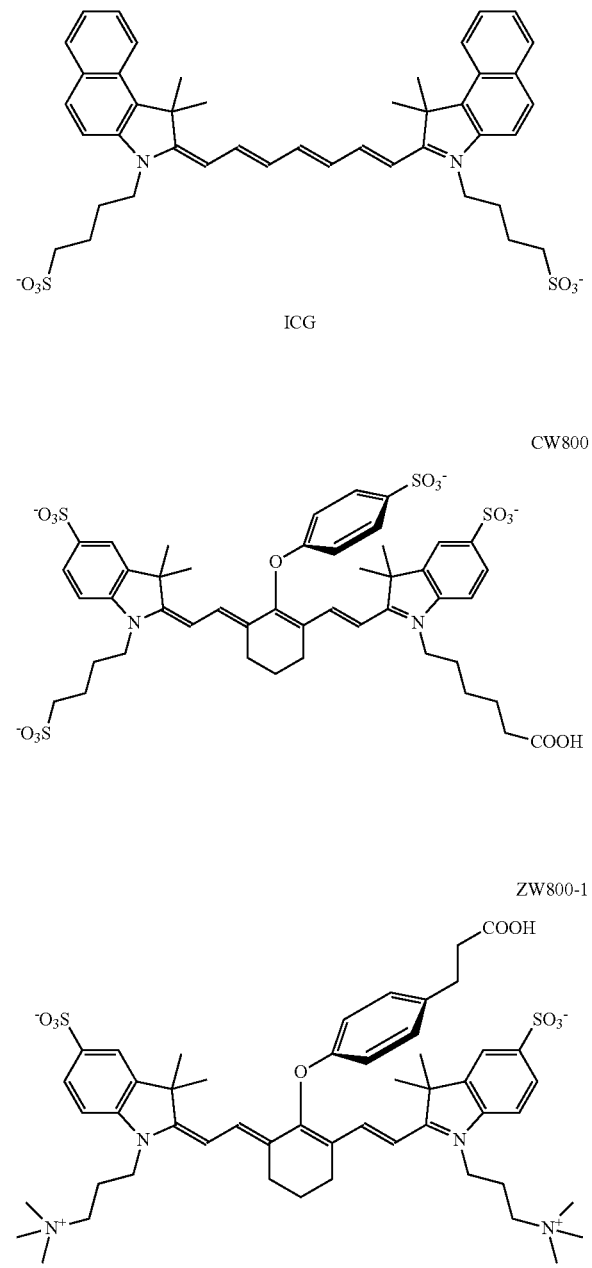

Scheme 1. Chemical Structures of Heptamethine Cyanine Dyes.

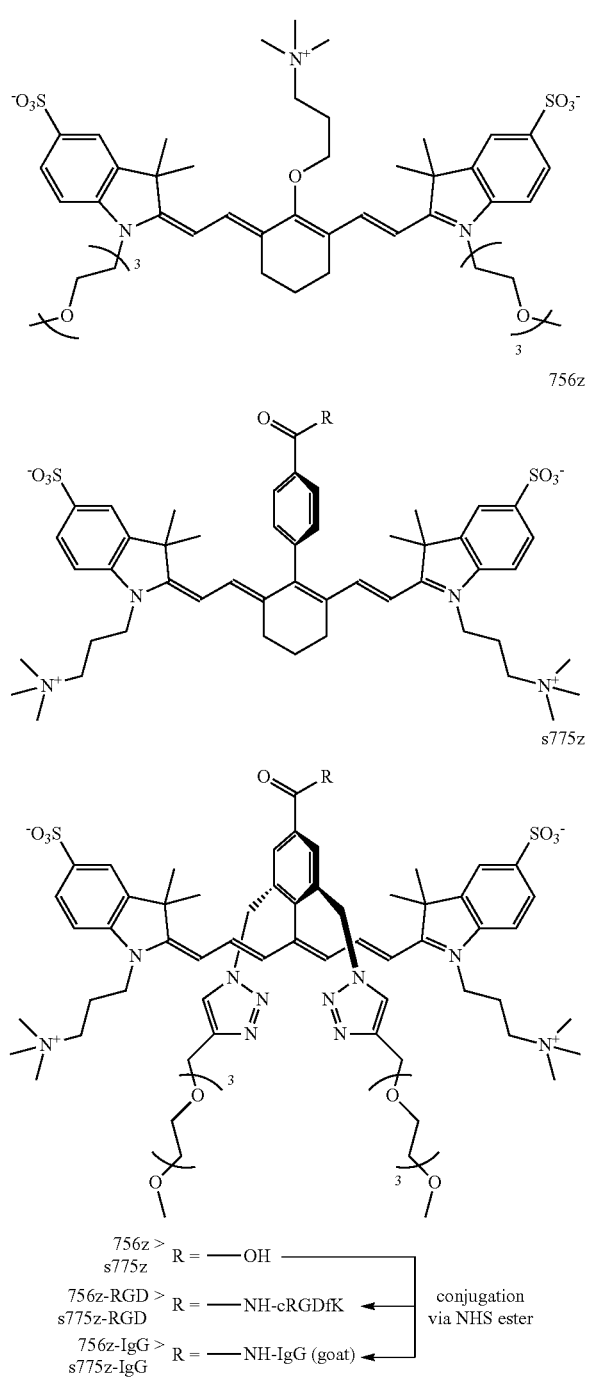

Definitions

The following definitions are included to provide a clear and consistent understanding of the specification and claims. As used herein, the recited terms have the following meanings. All other terms and phrases used in this specification have their ordinary meanings as one of skill in the art would understand. Such ordinary meanings may be obtained by reference to technical dictionaries, such as *Hawley's Condensed Chemical Dictionary* 14th Edition, by R. J. Lewis, John Wiley & Sons, New York, N.Y., 2001.

References in the specification to "one embodiment", "an embodiment", etc., indicate that the embodiment described may include a particular aspect, feature, structure, moiety, or characteristic, but not every embodiment necessarily includes that aspect, feature, structure, moiety, or characteristic. Moreover, such phrases may, but do not necessarily, refer to the same embodiment referred to in other portions of the specification. Further, when a particular aspect, feature, structure, moiety, or characteristic is described in connection with an embodiment, it is within the knowledge of one skilled in the art to affect or connect such aspect, feature, structure, moiety, or characteristic with other embodiments, whether or not explicitly described.

The singular forms "a," "an," and "the" include plural reference unless the context clearly dictates otherwise. Thus, for example, a reference to "a compound" includes a plurality of such compounds, so that a compound X includes a plurality of compounds X. It is further noted that the claims may be drafted to exclude any optional element. As such, this statement is intended to serve as antecedent basis for the use of exclusive terminology, such as "solely," "only," and the like, in connection with any element described herein, and/or the recitation of claim elements or use of "negative" limitations.

The term "and/or" means any one of the items, any combination of the items, or all of the items with which this term is associated. The phrases "one or more" and "at least one" are readily understood by one of skill in the art, particularly when read in context of its usage. For example, the phrase can mean one, two, three, four, five, six, ten, 100, or any upper limit approximately 10, 100, or 1000 times higher than a recited lower limit. For example, one or more substituents on a phenyl ring refers to one to five, or one to four, for example if the phenyl ring is disubstituted.

As will be understood by the skilled artisan, all numbers, including those expressing quantities of ingredients, properties such as molecular weight, reaction conditions, and so forth, are approximations and are understood as being optionally modified in all instances by the term "about." These values can vary depending upon the desired properties sought to be obtained by those skilled in the art utilizing the teachings of the descriptions herein. It is also understood that such values inherently contain variability necessarily resulting from the standard deviations found in their respective testing measurements. When values are expressed as approximations, by use of the antecedent "about," it will be understood that the particular value without the modifier "about" also forms a further aspect.

The terms "about" and "approximately" are used interchangeably. Both terms can refer to a variation of ±5%, ±10%, ±20%, or ±25% of the value specified. For example, "about 50" percent can in some embodiments carry a variation from 45 to 55 percent, or as otherwise defined by a particular claim. For integer ranges, the term "about" can include one or two integers greater than and/or less than a recited integer at each end of the range. Unless indicated otherwise herein, the terms "about" and "approximately" are intended to include values, e.g., weight percentages, proximate to the recited range that are equivalent in terms of the functionality of the individual ingredient, composition, or embodiment. The terms "about" and "approximately" can also modify the end-points of a recited range as discussed above in this paragraph.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. It is therefore understood that each unit between two particular units are also disclosed. For example, if 10 to 15 is disclosed, then 11, 12, 13, and 14 are also disclosed, individually, and as part of a range. A recited range (e.g., weight percentages or carbon groups) includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc. As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio. Accordingly, specific values recited for radicals, substituents, and ranges, are for illustration only; they do not exclude other defined values or other values within defined ranges for radicals and substituents. It will be further understood that the endpoints of each of the ranges are significant both in relation to the other endpoint, and independently of the other endpoint.

This disclosure provides ranges, limits, and deviations to variables such as volume, mass, percentages, ratios, etc. It is understood by an ordinary person skilled in the art that a range, such as "number1" to "number2", implies a continuous range of numbers that includes the whole numbers and fractional numbers. For example, 1 to 10 means 1, 2, 3, 4, 5, . . . 9, 10. It also means 1.0, 1.1, 1.2. 1.3, . . . , 9.8, 9.9, 10.0, and also means 1.01, 1.02, 1.03, and so on. If the variable disclosed is a number less than "number10", it implies a continuous range that includes whole numbers and fractional numbers less than number10, as discussed above. Similarly, if the variable disclosed is a number greater than "number10", it implies a continuous range that includes whole numbers and fractional numbers greater than number10. These ranges can be modified by the term "about", whose meaning has been described above.

One skilled in the art will also readily recognize that where members are grouped together in a common manner, such as in a Markush group, the invention encompasses not only the entire group listed as a whole, but each member of the group individually and all possible subgroups of the main group. Additionally, for all purposes, the invention encompasses not only the main group, but also the main group absent one or more of the group members. The invention therefore envisages the explicit exclusion of any one or more of members of a recited group. Accordingly, provisos may apply to any of the disclosed categories or embodiments whereby any one or more of the recited elements, species, or embodiments, may be excluded from such categories or embodiments, for example, for use in an explicit negative limitation.

The term "contacting" refers to the act of touching, making contact, or of bringing to immediate or close proximity, including at the cellular or molecular level, for example, to bring about a physiological reaction, a chemical reaction, or a physical change, e.g., in a solution, in a reaction mixture, in vitro, or in vivo.

As used herein, "subject" or "patient" means an individual having symptoms of, or at risk for, a disease or other malignancy. A patient may be human or non-human and may include, for example, animal strains or species used as "model systems" for research purposes, such a mouse model as described herein. Likewise, patient may include either adults or juveniles (e.g., children). Moreover, patient may mean any living organism, preferably a mammal (e.g., human or non-human) that may benefit from the administration of compositions contemplated herein. Examples of mammals include, but are not limited to, any member of the Mammalian class: humans, non-human primates such as chimpanzees, and other apes and monkey species; farm animals such as cattle, horses, sheep, goats, swine; domestic animals such as rabbits, dogs, and cats; laboratory animals including rodents, such as rats, mice and guinea pigs, and the like. Examples of non-mammals include, but are not limited to, birds, fish and the like. In one embodiment of the methods provided herein, the mammal is a human.

As used herein, the terms "providing", "administering," "introducing," are used interchangeably herein and refer to the placement of a compound of the disclosure into a subject by a method or route that results in at least partial localization of the compound to a desired site. The compound can be administered by any appropriate route that results in delivery to a desired location in the subject.

The compound and compositions described herein may be administered with additional compositions to prolong stability and activity of the compositions, or in combination with other therapeutic drugs.

An "effective amount" refers to an amount effective to bring about a recited effect, such as an amount necessary to form products in a reaction mixture. Determination of an effective amount is typically within the capacity of persons skilled in the art, especially in light of the detailed disclosure provided herein. The term "effective amount" is intended to include an amount of a compound or reagent described herein, or an amount of a combination of compounds or reagents described herein, e.g., that is effective to form products in a reaction mixture. Thus, an "effective amount" generally means an amount that provides the desired effect.

The term "substantially" as used herein, is a broad term and is used in its ordinary sense, including, without limitation, being largely but not necessarily wholly that which is specified. For example, the term could refer to a numerical value that may not be 100% the full numerical value. The full numerical value may be less by about 1%, about 2%, about 3%, about 4%, about 5%, about 6%, about 7%, about 8%, about 9%, about 10%, about 15%, or about 20%.

Wherever the term "comprising" is used herein, options are contemplated wherein the terms "consisting of" or "consisting essentially of" are used instead. As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the aspect element. As used herein, "consisting essentially of" does not exclude materials or steps that do not materially affect the basic and novel characteristics of the aspect. In each instance herein any of the terms "comprising", "consisting essentially of" and "consisting of" may be replaced with either of the other two terms. The disclosure illustratively described herein may be suitably practiced in the absence of any element or elements, limitation or limitations which is not specifically disclosed herein.

This disclosure provides methods of making the compounds and compositions of the invention. The compounds and compositions can be prepared by any of the applicable techniques described herein, optionally in combination with standard techniques of organic synthesis. Many techniques such as etherification and esterification are well known in the art. However, many of these techniques are elaborated in Compendium of Organic Synthetic Methods (John Wiley & Sons, New York), Vol. 1, Ian T. Harrison and Shuyen Harrison, 1971; Vol. 2, Ian T. Harrison and Shuyen Harrison, 1974; Vol. 3, Louis S. Hegedus and Leroy Wade, 1977; Vol. 4, Leroy G. Wade, Jr., 1980; Vol. 5, Leroy G. Wade, Jr., 1984; and Vol. 6; as well as standard organic reference texts such as March's Advanced Organic Chemistry: Reactions, Mechanisms, and Structure, 5th Ed., by M. B. Smith and J. March (John Wiley & Sons, New York, 2001); Comprehensive Organic Synthesis. Selectivity, Strategy & Efficiency in Modern Organic Chemistry. In 9 Volumes, Barry M. Trost, Editor-in-Chief (Pergamon Press, New York, 1993 printing); Advanced Organic Chemistry, Part B: Reactions and Synthesis, Second Edition, Cary and Sundberg (1983); for heterocyclic synthesis see Hermanson, Greg T., Bioconjugate Techniques, Third Edition, Academic Press, 2013.

The formulas and compounds described herein can be modified using protecting groups. Suitable amino and carboxy protecting groups are known to those skilled in the art (see for example, Protecting Groups in Organic Synthesis, Second Edition, Greene, T. W., and Wutz, P. G. M., John Wiley & Sons, New York, and references cited therein; Philip J. Kocienski; Protecting Groups (Georg Thieme Verlag Stuttgart, New York, 1994), and references cited therein); and Comprehensive Organic Transformations, Larock, R. C., Second Edition, John Wiley & Sons, New York (1999), and referenced cited therein.

The term "halo" or "halide" refers to fluoro, chloro, bromo, or iodo. Similarly, the term "halogen" refers to fluorine, chlorine, bromine, and iodine.

The term "alkyl" refers to a branched or unbranched hydrocarbon having, for example, from 1-20 carbon atoms, and often 1-12, 1-10, 1-8, 1-6, or 1-4 carbon atoms; or for example, a range between 1-20 carbon atoms, such as 2-6, 3-6, 2-8, or 3-8 carbon atoms. As used herein, the term "alkyl" also encompasses a "cycloalkyl", defined below. Examples include, but are not limited to, methyl, ethyl, 1-propyl, 2-propyl (iso-propyl), 1-butyl, 2-methyl-1-propyl (isobutyl), 2-butyl (sec-butyl), 2-methyl-2-propyl (t-butyl), 1-pentyl, 2-pentyl, 3-pentyl, 2-methyl-2-butyl, 3-methyl-2-butyl, 3-methyl-1-butyl, 2-methyl-1-butyl, 1-hexyl, 2-hexyl, 3-hexyl, 2-methyl-2-pentyl, 3-methyl-2-pentyl, 4-methyl-2-pentyl, 3-methyl-3-pentyl, 2-methyl-3-pentyl, 2,3-dimethyl-2-butyl, 3,3-dimethyl-2-butyl, hexyl, octyl, decyl, dodecyl, and the like. The alkyl can be unsubstituted or substituted, for example, with a substituent described below or otherwise described herein. The alkyl can also be optionally partially or fully unsaturated. As such, the recitation of an alkyl group can include an alkenyl group or an alkynyl group. The alkyl can be a monovalent hydrocarbon radical, as described and exemplified above, or it can be a divalent hydrocarbon radical (i.e., an alkylene).

An alkylene is an alkyl group having two free valences at a carbon atom or two different carbon atoms of a carbon chain. Similarly, alkenylene and alkynylene are respectively an alkene and an alkyne having two free valences at two different carbon atoms.

The term "cycloalkyl" refers to cyclic alkyl groups of, for example, from 3 to 10 carbon atoms having a single cyclic ring or multiple condensed rings. Cycloalkyl groups include, by way of example, single ring structures such as cyclopropyl, cyclobutyl, cyclopentyl, cyclooctyl, and the like, or multiple ring structures such as adamantyl, and the like. The cycloalkyl can be unsubstituted or substituted. The cycloalkyl group can be monovalent or divalent, and can be optionally substituted as described for alkyl groups. The cycloalkyl group can optionally include one or more cites of unsaturation, for example, the cycloalkyl group can include one or more carbon-carbon double bonds, such as, for example, 1-cyclopent-1-enyl, 1-cyclopent-2-enyl, 1-cyclopent-3-enyl, cyclohexyl, 1-cyclohex-1-enyl, 1-cyclohex-2-enyl, 1-cyclohex-3-enyl, and the like.

The term "heterocycloalkyl" or "heterocyclyl" refers to a saturated or partially saturated monocyclic, bicyclic, or polycyclic ring containing at least one heteroatom selected from nitrogen, sulfur, oxygen, preferably from 1 to 3 heteroatoms in at least one ring. Each ring is preferably from 3 to 10 membered, more preferably 4 to 7 membered. Examples of suitable heterocycloalkyl substituents include pyrrolidyl, tetrahydrofuryl, tetrahydrothiofuranyl, piperidyl, piperazyl, tetrahydropyranyl, morpholino, 1,3-diazapane, 1,4-diazapane, 1,4-oxazepane, and 1,4-oxathiapane. The group may be a terminal group or a bridging group.

The term "aromatic" refers to either an aryl or heteroaryl group or substituent described herein. Additionally, an aromatic moiety may be a bisaromatic moiety, a trisaromatic moiety, and so on. A bisaromatic moiety has a single bond between two aromatic moieties such as, but not limited to, biphenyl, or bipyridine. Similarly, a trisaromatic moiety has a single bond between each aromatic moiety.

The term "aryl" refers to an aromatic hydrocarbon group derived from the removal of at least one hydrogen atom from a single carbon atom of a parent aromatic ring system. The radical attachment site can be at a saturated or unsaturated carbon atom of the parent ring system. The aryl group can have from 6 to 30 carbon atoms, for example, about 6-10 carbon atoms. The aryl group can have a single ring (e.g., phenyl) or multiple condensed (fused) rings, wherein at least one ring is aromatic (e.g., naphthyl, dihydrophenanthrenyl, fluorenyl, or anthryl). Typical aryl groups include, but are not limited to, radicals derived from benzene, naphthalene, anthracene, biphenyl, and the like. The aryl can be unsubstituted or optionally substituted with a substituent described below.

The term "heteroaryl" refers to a monocyclic, bicyclic, or tricyclic ring system containing one, two, or three aromatic rings and containing at least one nitrogen, oxygen, or sulfur atom in an aromatic ring. The heteroaryl can be unsubstituted or substituted, for example, with one or more, and in particular one to three, substituents, as described in the definition of "substituted". Typical heteroaryl groups contain 2-20 carbon atoms in the ring skeleton in addition to the one or more heteroatoms, wherein the ring skeleton comprises a 5-membered ring, a 6-membered ring, two 5-membered rings, two 6-membered rings, or a 5-membered ring fused to a 6-membered ring. Examples of heteroaryl groups include, but are not limited to, 2H-pyrrolyl, 3H-indolyl, 4H-quinolizinyl, acridinyl, benzo[b]thienyl, benzothiazolyl, β-carbolinyl, carbazolyl, chromenyl, cinnolinyl, dibenzo[b,d]furanyl, furazanyl, furyl, imidazolyl, imidizolyl, indazolyl, indolisinyl, indolyl, isobenzofuranyl, isoindolyl, isoquinolyl, isothiazolyl, isoxazolyl, naphthyridinyl, oxazolyl, perimidinyl, phenanthridinyl, phenanthrolinyl, phenarsazinyl, phenazinyl, phenothiazinyl, phenoxathiinyl, phenoxazinyl, phthalazinyl, pteridinyl, purinyl, pyranyl, pyrazinyl, pyrazolyl, pyridazinyl, pyridyl, pyrimidinyl, pyrrolyl, quinazolinyl, quinolyl, quinoxalinyl, thiadiazolyl, thianthrenyl, thiazolyl, thienyl, triazolyl, tetrazolyl, and xanthenyl. In one embodiment the term "heteroaryl" denotes a monocyclic aromatic ring containing five or six ring atoms containing carbon and 1, 2, 3, or 4 heteroatoms independently selected from non-peroxide oxygen, sulfur, and N(Z) wherein Z is absent or is H, O, alkyl, aryl, or (C$_1$-C$_6$)alkylaryl. In some embodiments, heteroaryl denotes an ortho-fused bicyclic heterocycle of about eight to ten ring atoms derived therefrom, particularly a benz-derivative or one derived by fusing a propylene, trimethylene, or tetramethylene diradical thereto.

As used herein, the term "substituted" or "substituent" is intended to indicate that one or more (for example, in various embodiments, 1-10; in other embodiments, 1-6; in some embodiments 1, 2, 3, 4, or 5; in certain embodiments, 1, 2, or 3; and in other embodiments, 1 or 2) hydrogens on the group indicated in the expression using "substituted" (or "substituent") is replaced with a selection from the indicated group(s), or with a suitable group known to those of skill in the art, provided that the indicated atom's normal valency is not exceeded, and that the substitution results in a stable compound. Suitable indicated groups include, e.g., alkyl, alkenyl, alkynyl, alkoxy, haloalkyl, hydroxyalkyl, aryl, heteroaryl, heterocyclyl, cycloalkyl, alkanoyl, alkoxycarbonyl, amino, alkylamino, dialkylamino, carboxyalkyl, alkylthio, alkylsulfinyl, and alkylsulfonyl. Substituents of the indicated groups can be those recited in a specific list of substituents described herein, or as one of skill in the art would recognize, can be one or more substituents selected from alkyl, alkenyl, alkynyl, alkoxy, halo, haloalkyl, hydroxy, hydroxyalkyl, aryl, heteroaryl, heterocycle, cycloalkyl, alkanoyl, alkoxycarbonyl, amino, alkylamino, dialkylamino, trifluoromethylthio, difluoromethyl, acylamino, nitro, trifluoromethyl, trifluoromethoxy, carboxy, carboxyalkyl, keto, thioxo, alkylthio, alkylsulfinyl, alkylsulfonyl, and cyano. Suitable substituents of indicated groups can be bonded to a substituted carbon atom include F, Cl, Br, I, OR', OC(O)N(R')$_2$, CN, CF$_3$, OCF$_3$, R', O, S, C(O), S(O), methylenedioxy, ethylenedioxy, N(R')$_2$, SR', SOR', SO$_2$R', SO$_2$N(R')$_2$, SO$_3$R', C(O)R', C(O)C(O)R', C(O)CH$_2$C(O)R', C(S)R', C(O)OR', OC(O)R', C(O)N(R')$_2$, OC(O)N(R')$_2$, C(S)N(R')$_2$, (CH$_2$)O—$_2$NHC(O)R', N(R')N(R')C(O)R', N(R')N(R')C(O)OR', N(R')N(R')CON(R')$_2$, N(R')SO$_2$R', N(R')SO$_2$N(R')$_2$, N(R')C(O)OR', N(R')C(O)R', N(R')C(S)R', N(R')C(O)N(R')$_2$, N(R')C(S)N(R')$_2$, N(COR')COR', N(OR')R', C(=NH)N(R')$_2$, C(O)N(OR')R', or C(=NOR')R' wherein R' can be hydrogen or a carbon-based moiety (e.g., (C$_1$-C$_6$)alkyl), and wherein the carbon-based moiety can itself be further substituted. When a substituent is monovalent, such as, for example, F or Cl, it is bonded to the atom it is substituting by a single bond. When a substituent is divalent, such as O, it is bonded to the atom it is substituting by a double bond; for example, a carbon atom substituted with O forms a carbonyl group, C=O.

Embodiments of the Invention

This disclosure provides a compound of Formula I:

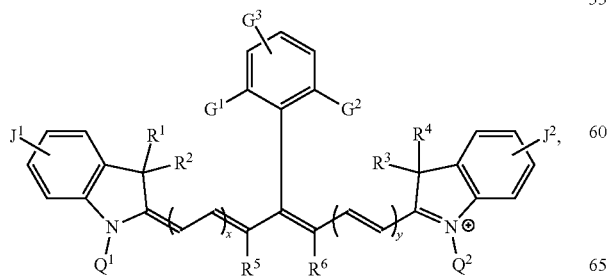

(I)

or a salt thereof;

wherein

G$^1$ and G$^2$ are each independently —(C$_1$-C$_4$)alkyl-(Z)—R$^W$;

each Z is independently 5- or 6-membered heterocycle;

each R$^W$ is independently —X$^1$(C$_1$-C$_4$)alkyl-(O(C$_2$-C$_4$)alkyl)m-O(C$_1$-C$_4$)alkyl, or H;

each X$^1$ is independently absent, O, S, or NH;

each m is independently 0-500;

G$^3$ is —(C=O)R$^A$ wherein R$^A$ is OR$^B$, NR$^B$R$^C$, H, or halo;

R$^B$ and R$^C$ are each independently H, N-succinimidyl, drug, biologic, or biomolecule;

J1 and J2 are each independently SO$_3$H or CO$_2$H;

Q$^1$ and Q$^2$ are each independently —(C$_2$-C$_6$)alkyl-X$^2$;

each X$^2$ is independently N$^+$(R$^D$)$_3$, N(R$^D$)$_2$, CO$_2$H, SO$_3$H, or —O(C$_1$-C$_6$)alkyl;

each R$^D$ is independently —(C$_1$-C$_6$)alkyl;

R$^1$, R$^2$, R$^3$ and R$^4$ are each independently —(C$_1$-C$_4$)alkyl or H;

R$^5$ and R$^6$ are each independently H or —(C$_1$-C$_4$)alkyl; or

R$^5$ and R$^5$ taken together form a 5- or 6-membered carbocycle; and x and y are each independently 0-3;

wherein the moieties (C$_2$-C$_4$)alkyl or (C$_2$-C$_6$)alkyl are optionally branched, and charged moieties present in the compound are counterbalanced with counterions.

In various embodiments, the compound is s775z:

(s775z)

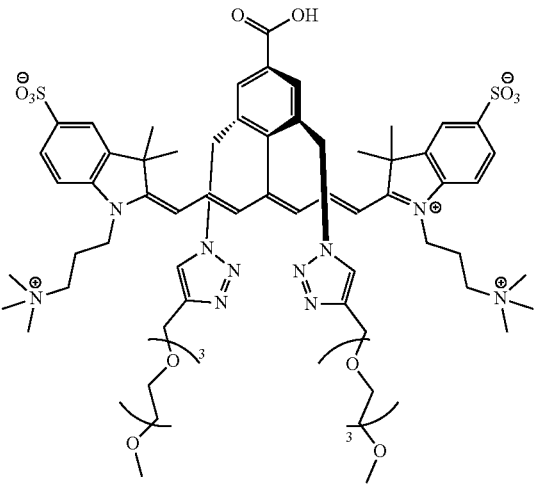

In various embodiments, Z is imidazole, triazole, or tetrazole. In some embodiments, wherein G$^1$ and G$^2$ are

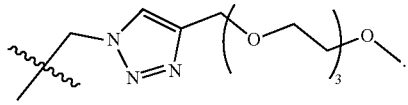

In some embodiments, G$^3$ is CO$_2$H. In some embodiments, G$^3$ is —(C=O)NHR$^C$. In some embodiments, R$^C$ is an arginylglycylaspartic acid, peptide, amino acid, antibody, or immunoglobulin. In various embodiments, J$^1$ and J$^2$ are SO₃H. In various embodiments, Q¹ and Q² are —(CH₂)₃N⁺(CH₃)₃. In some embodiments, R¹, R², R³ and R⁴ are methyl. In various embodiments, $R^W$ is —CH₂(OCH₂CH₂)₃—O(C₁-C₄)alkyl. In some embodiments, R⁵ and R⁶ are H. In some embodiments, x and y are 0, 1, 2, or 3.

In some embodiments, the compound is represented by Formula II:

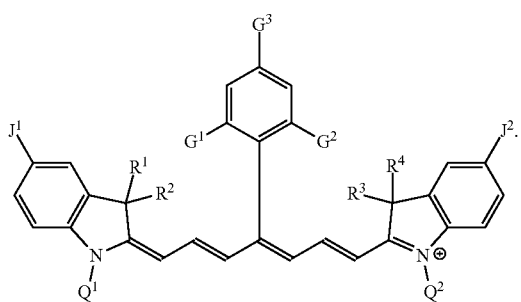

(II)

In some embodiments, the compound is represented by Formula III:

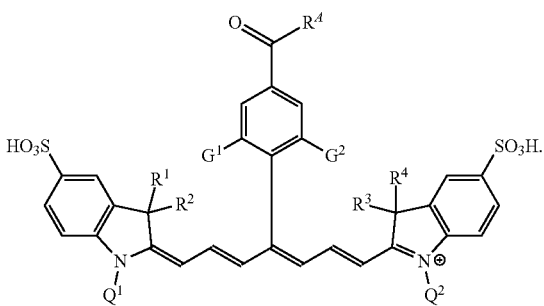

(III)

In some embodiments, the compound is represented by Formula IV:

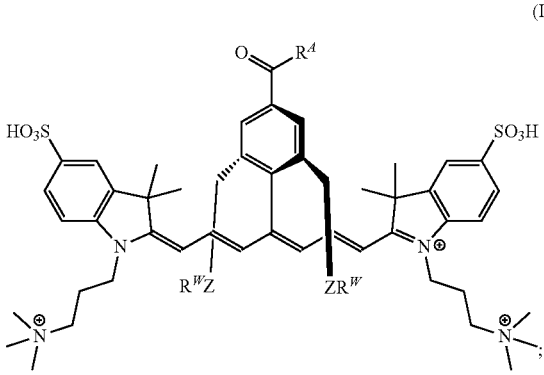

(IV)

wherein $R^W$ is —(C₁-C₄)alkyl-(O(C₂-C₄)alkyl)$_m$-O(C₁-C₄)alkyl, and m is 1-6.

This disclosure provides a composition comprising the compound disclosed herein and a pharmaceutically acceptable excipient, a metal ion, a mineral acid, an organic acid such as trifluoroacetic acid, or an acetate such as the acetate of trifluoroacetic acid.

Also, this disclosure provides a method for imaging a targeted biological organism comprising:
a) conjugating a compound disclosed herein to a drug or biologic to form a bioconjugate wherein the bioconjugate has selective affinity for a targeted biological organism or biomolecule;
b) contacting the bioconjugate and the biological organism, biomolecule, or protein;
c) exciting the bioconjugate a suitable wavelength for inducing a fluorescence signal or photoacoustic signal; and
d) imaging the excited bioconjugate fluorescence signal or photoacoustic signal emanating from within the biological organism;
wherein the targeted biological organism is thereby imaged.

In various embodiments, the bioconjugate is a bioconjugate of the compound s775z disclosed herein and an arginylglycylaspartic acid or immunoglobulin. In some embodiments, the biological organism is cancer tissue, or cell such as a cancer cell.

Additionally, this disclosure provides a method for fluorescence or photoacoustic guided cancer surgery comprising:
a) administering a bioconjugate of a compound disclosed herein to a subject in need of cancer surgery, wherein the bioconjugate has selective affinity for a cancer in the subject;
b) exciting the bioconjugate a suitable wavelength for inducing a fluorescence signal or photoacoustic signal, wherein the excited bioconjugate fluorescence signal or photoacoustic signal is emanating from within the cancer; and
c) surgically removing the cancer in the subject.

In various embodiments, the bioconjugate is a bioconjugate of the compound s775z. In other embodiments, the cancer is brain, lung, breast, bladder, kidney, eye, skin, esophageal, pancreatic, colorectal cancer, head and/or neck cancer, or melanoma. In other embodiments, the disease is endometriosis or ureter delineation.

This disclosure also provides a compound of Formula V:

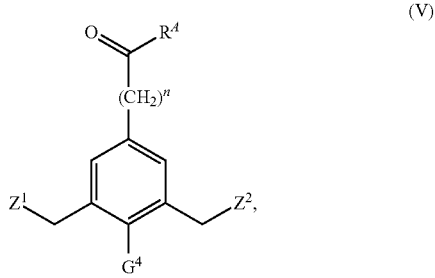

(V)

or a salt thereof;
wherein
G⁴ is pyridyl, pyridiniumyl, or

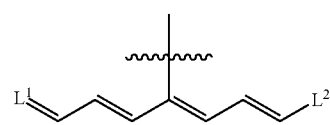

wherein $L^1$ and $L^2$ are each independently a substituted 2-indolyl group or substituted 2-indolium group, wherein the 2-indolyl or 2-indolenium is optionally fused to a benzo ring;

$R^A$ is $OR^B$, $NR^BR^C$, H, or halo;

$R^B$ and $R^C$ are each independently H, N-succinimidyl, —($C_1$-$C_6$)alkyl, drug, or biologic;

$Z^1$ and $Z^2$ are each independently halo, $N_3$, or a triazole substituted with polyethylene glycol wherein each triazole is optionally alkyl quaternized (e.g. $N^+(C_1$-$C_6)_4$); and n is 0-3;

wherein charged moieties when present in the compound are counterbalanced with counterions.

In some embodiments, $G^4$ is 4-pyridyl or 1-(2,4-dinitrophenyl)pyridin-1-ium-4-yl. In some embodiments, n is 0, 1, 2, or 3. In some embodiments, $G^4$ is

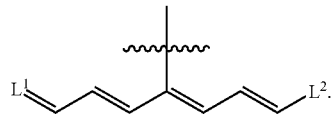

In various embodiments, $L^1$ is represented by Formula Va and $L^2$ is represented by Formula Vb:

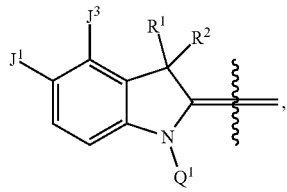

(Va)

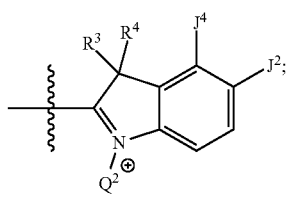

(Vb)

wherein
$J^1$ and $J^2$ are each independently $SO_3H$, $CO_2H$, phenyl-$SO_3H$, polyethylene glycol, or H;
$J^3$ is H; or
$J^3$ and $J^P$ taken together form a fused benzo ring; or
$J^3$, $R^1$ and $R^2$ taken together form a fused benzo ring;
$J^4$ is H; or
$J^4$ and $J^2$ taken together form a fused benzo ring; or
$J^4$, $R^3$ and $R^4$ taken together form a fused benzo ring;
$Q^1$ and $Q^2$ are each independently —($C_2$-$C_6$)alkyl-$X^2$ or polyethylene glycol;
each $X^2$ is independently $N^+(R^D)_3$, $N(R^D)_2$, $CO_2H$, $SO_3H$, or —$O(C_1$-$C_6)$alkyl;
each $R^D$ is independently —($C_1$-$C_6$)alkyl;
$R^1$ and $R^2$ are each independently —($C_1$-$C_4$)alkyl or H when $R^1$ and $R^2$ do not form a fused benzo ring together with $J^3$; and
$R^3$ and $R^4$ are each independently —($C_1$-$C_4$)alkyl or H when $R^3$ and $R^4$ do not form a fused benzo ring together with $J^4$;

wherein each fused benzo ring when present is substituted optionally with one or more $SO_3H$, and charged moieties are counterbalanced with counterions.

In some embodiments, $J^1$ and $J^2$ are $SO_3H$. In some embodiments, $J^3$ and $J^4$ are H. In some embodiments, $R^1$, $R^2$, $R^3$ and $R^4$ are methyl. In some embodiments, $Q^1$ and $Q^2$ are —$(CH_2)_3N^+(CH_3)_3$. In various embodiments, $Z^1$ and $Z^2$ are the triazole. In some embodiments, each triazole is independently represented by Formula Vc:

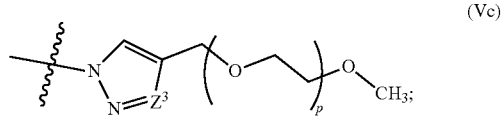

(Vc)

wherein $Z^3$ is N or $N^+(C_1$-$C_6)$alkyl; and p is 1-500.

In some embodiments, the compound is represented by Formula Vd, Ve, or Vf:

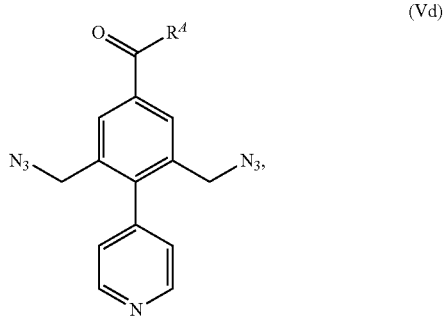

(Vd)

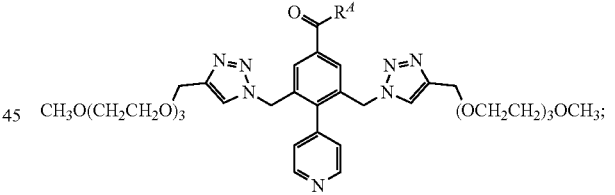

(Ve)

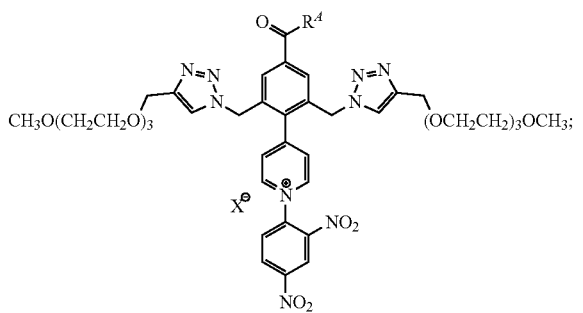

(Vf)

wherein $R^A$ is OH, OCH$_3$, or OC(CH$_3$)$_3$; and X$^-$ is a counterion.
In some embodiments, the compound is:
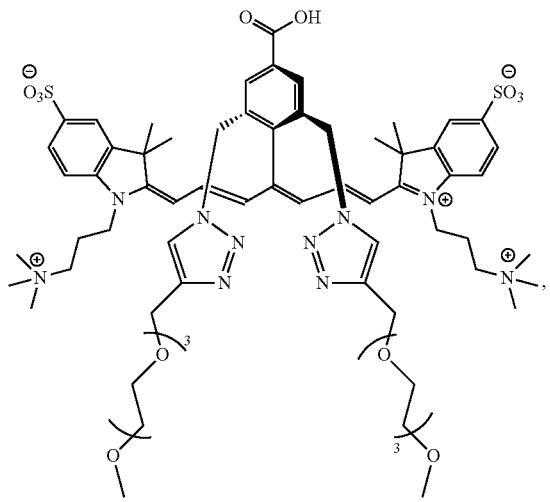
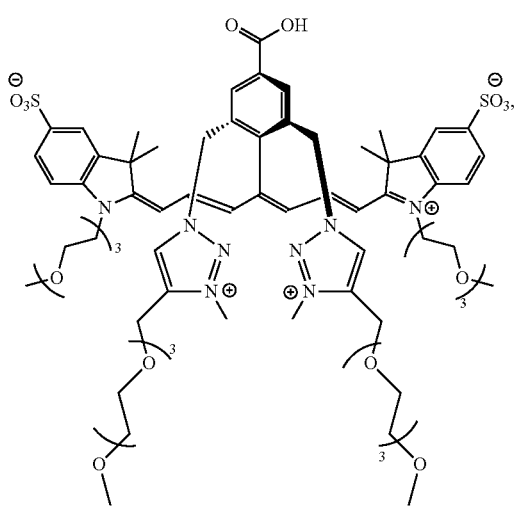
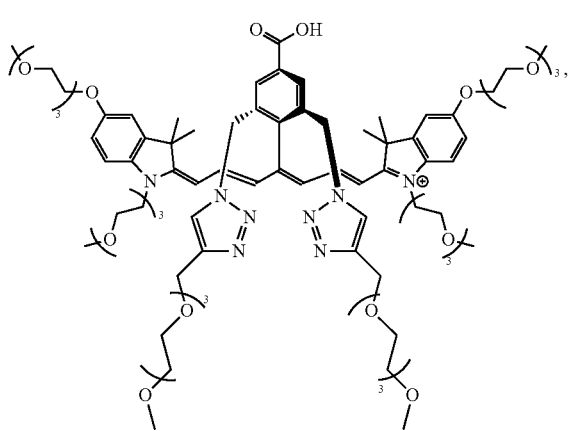
-continued
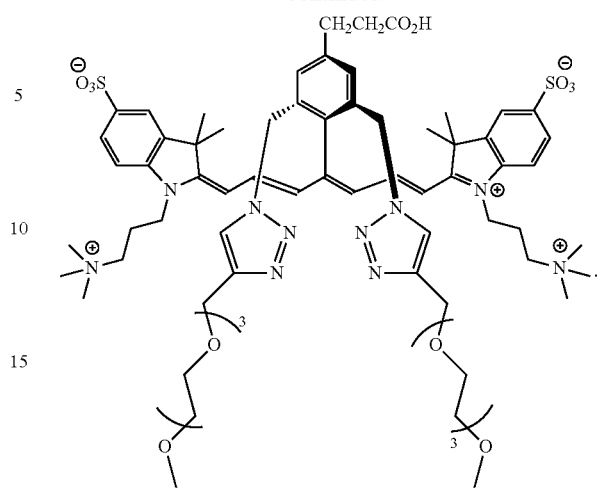
In some embodiments, the compound is:
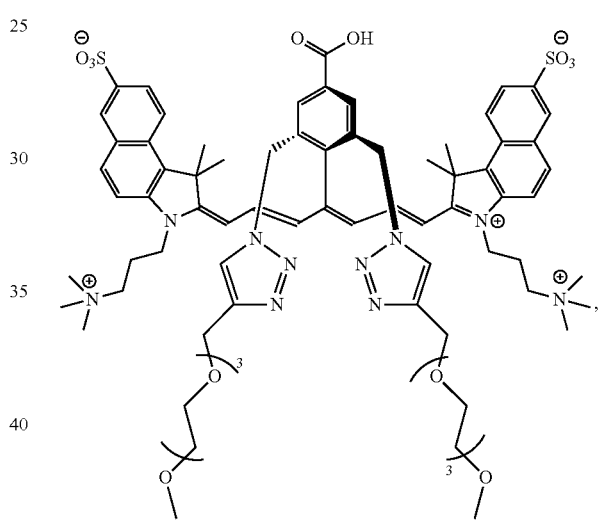
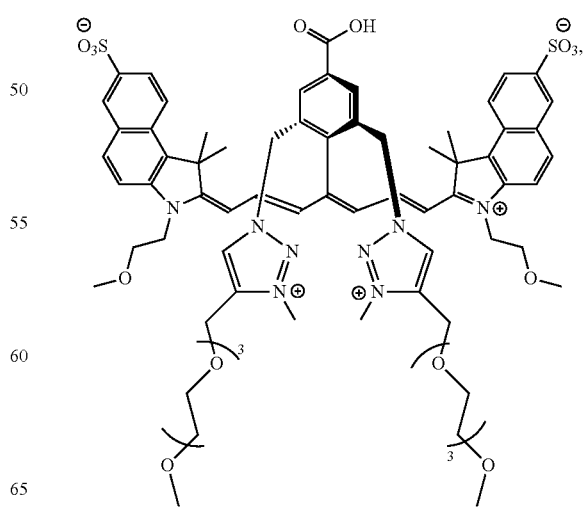

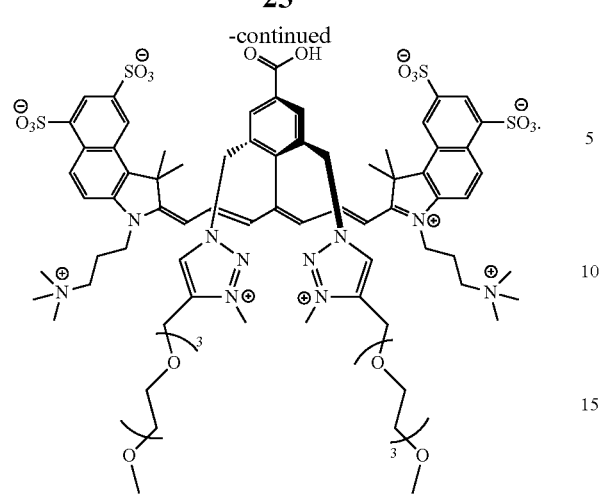
In some embodiments, the compound is:
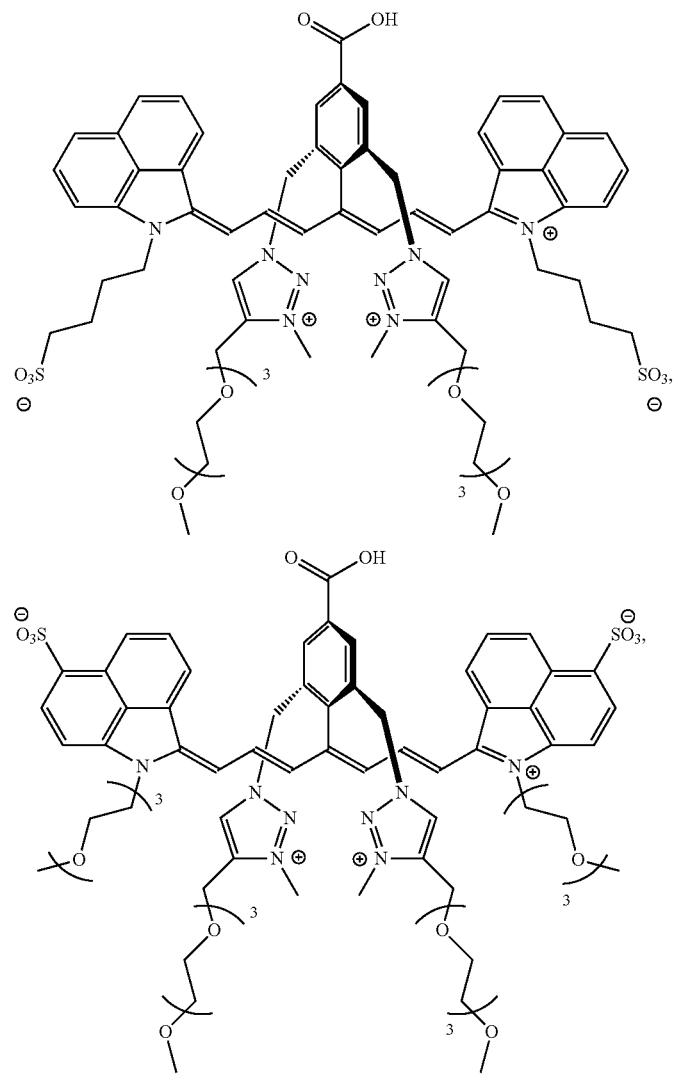

-continued

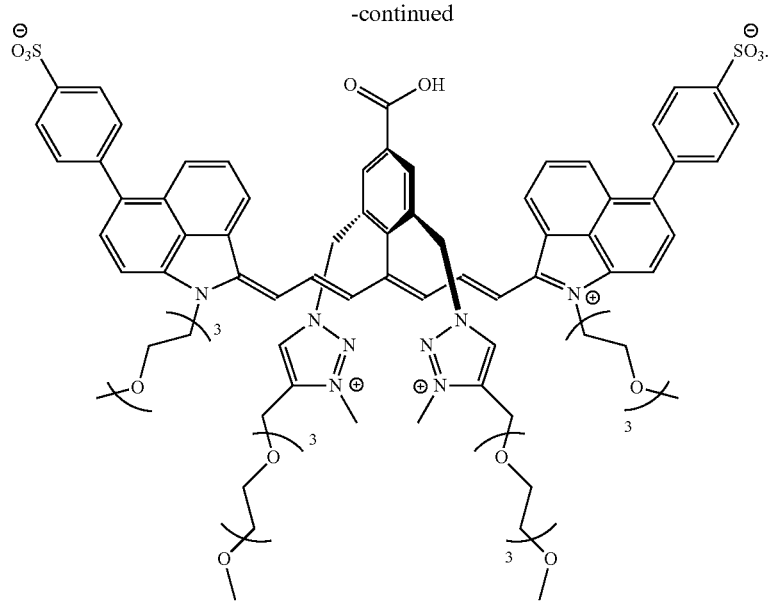

In various embodiments, the compound disclosed herein comprises a counterion. In various embodiments, the counterion is a charged moiety covalently bonded to the compound or ionically bonded to the compound. In various other embodiments, the counterion is a positively charged ion (e.g., $X^+$ or $Y^+$, such as a quaternary amine), a metal ion (e.g., $M^+$), a negatively charged ion (e.g., $X^-$ or $Y^-$), a halide ion, or an acetate such as the acetate of trifluoroacetic acid (TFA$^-$). In various embodiments, the disclosed compound is a charged balanced as a zwitterion. In various other embodiments the zwitterionic compounds disclosed herein are charge balanced with one or more of the counterions.

Additionally, this disclosure provides a method for synthesizing a sterically shielded heptamethine cyanine compound of Formula VI:

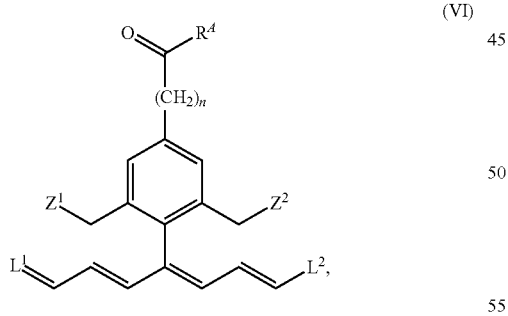

or a salt thereof;
wherein
$L^1$ and $L^2$ are each independently a substituted 2-indolyl or substituted 2-indolinyl group, wherein the 2-indolyl or 2-indolinyl is optionally fused to a benzo ring;
$R^4$ is OH, OCH$_3$, OC(CH$_3$)$_3$, or halo;
$Z^1$ and $Z^2$ are each independently a triazole substituted with polyethylene glycol wherein each triazole is optionally alkyl quaternized (e.g. N$^+$(C$_1$-C$_6$)$_4$); and
n is 0-3;

wherein charged moieties present in the compound are counterbalanced with counterions;
the method comprising:
a) contacting a pyridinium compound of Formula VIIa and an indolium compound of Formula VIIb under suitable Zincke reaction conditions to form the cyanine compound:

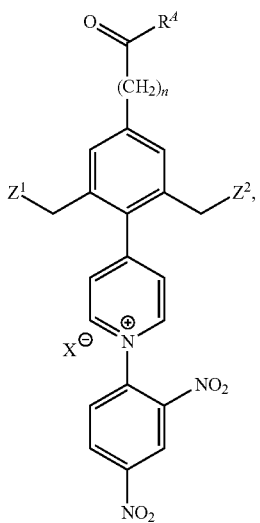

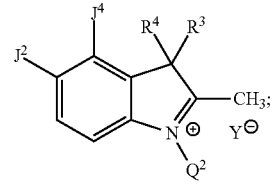

wherein
$R^4$, $Z^1$, $Z^2$ and n are as defined above;
$X^-$ and $Y^-$ are each independently a counterion;

$J^2$ is $SO_3H$, $CO_2H$, phenyl-$SO_3H$, polyethylene glycol, or H;

$J^4$ is H; or $J^4$ and $J^2$ taken together form a fused benzo ring; or $J^4$, $R^3$ and $R^4$ taken together form a fused benzo ring;

$Q^2$ is —$(C_2$-$C_6)$alkyl-$X^2$ or polyethylene glycol;

$X^2$ is $N^+(R^D)_3$, $N(R^D)_2$, $CO_2H$, $SO_3H$, or —$O(C_1$-$C_6)$alkyl;

each $R^D$ is independently —$(C_1$-$C_6)$alkyl; and $R^3$ and $R^4$ are each independently —$(C_1$-$C_4)$alkyl or H, when $R^3$ and $R^4$ do not form a fused benzo ring together with $J^4$;

wherein each fused benzo ring when present is substituted optionally with one or more $SO_3H$; and b) quenching the reaction;

wherein the sterically shielded heptamethine cyanine compound is thereby formed.

In some embodiments the method further comprises contacting the pyridinium compound, indolium compound and a catalyst. In some embodiments the catalyst is a base, an organic compound, an amine, or an aniline. In other embodiments, the aniline is 4-bromoaniline.

In some various embodiments, the cyanine compound is s775z:

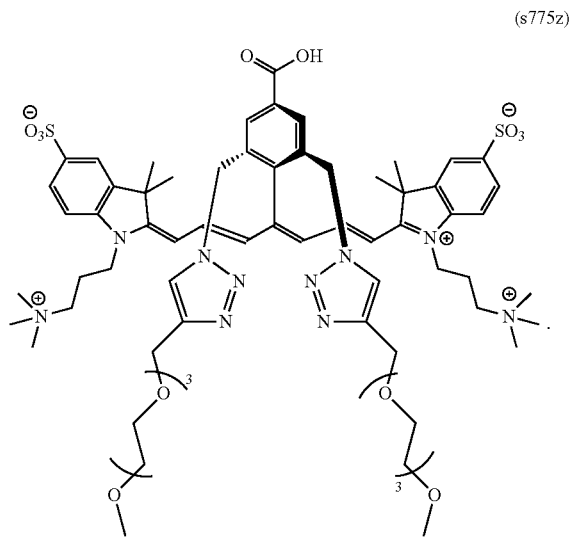

(s775z)

In some embodiments, the pyridinium compound of Formula VIIa is represented by Formula VIIc:

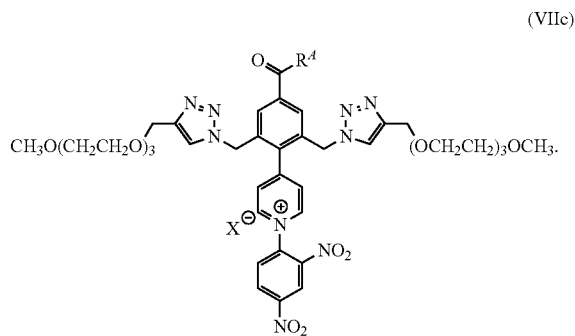

(VIIc)

In some embodiments, the indolium compound of Formula VIIb is represented by Formula VIId:

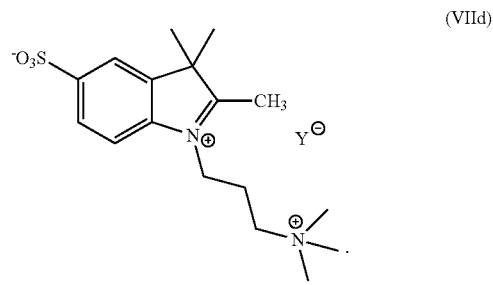

(VIId)

Results and Discussion

Figure 1:
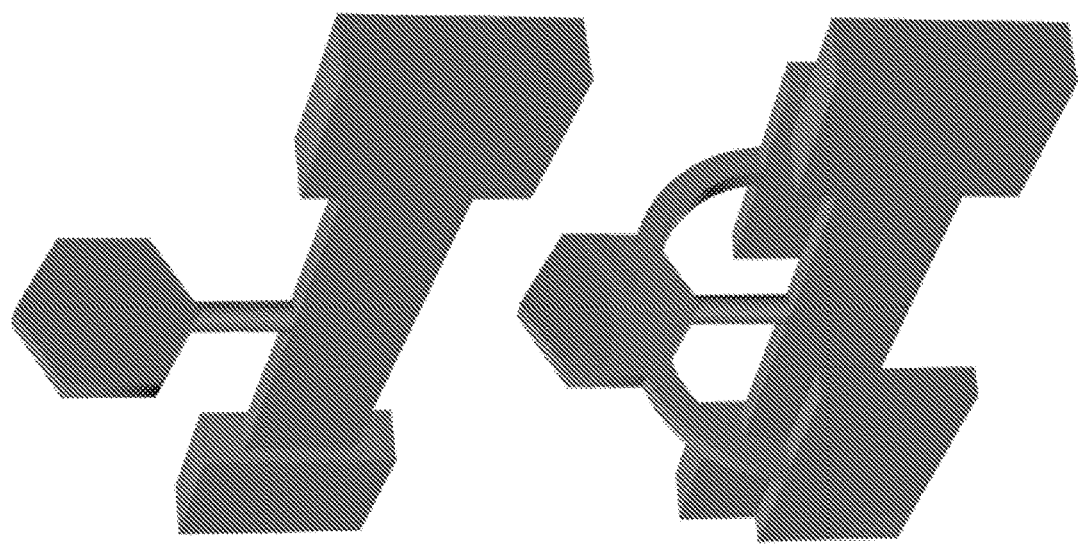
FIG. 1. C—C bond rotation relieves steric crowding. (a) Unshielded Heptamethine Fluorochrome: Rigid hydrophobic polyene core promotes: dye self-aggregation, interaction and reaction with other molecules. (b) Shielded Heptamethine Fluorochrome: Central cyclohexyl ring is absent and the polyene is protected by two arms (X) directed over each face, which prevents: dye self-aggregation, interaction or reaction with other molecules. (c) Molecular Model of s775z: The shielding arms, with triethyleneglycol chains, project over both faces of the polyene section of the blue-colored fluorochrome.
Figure 1:
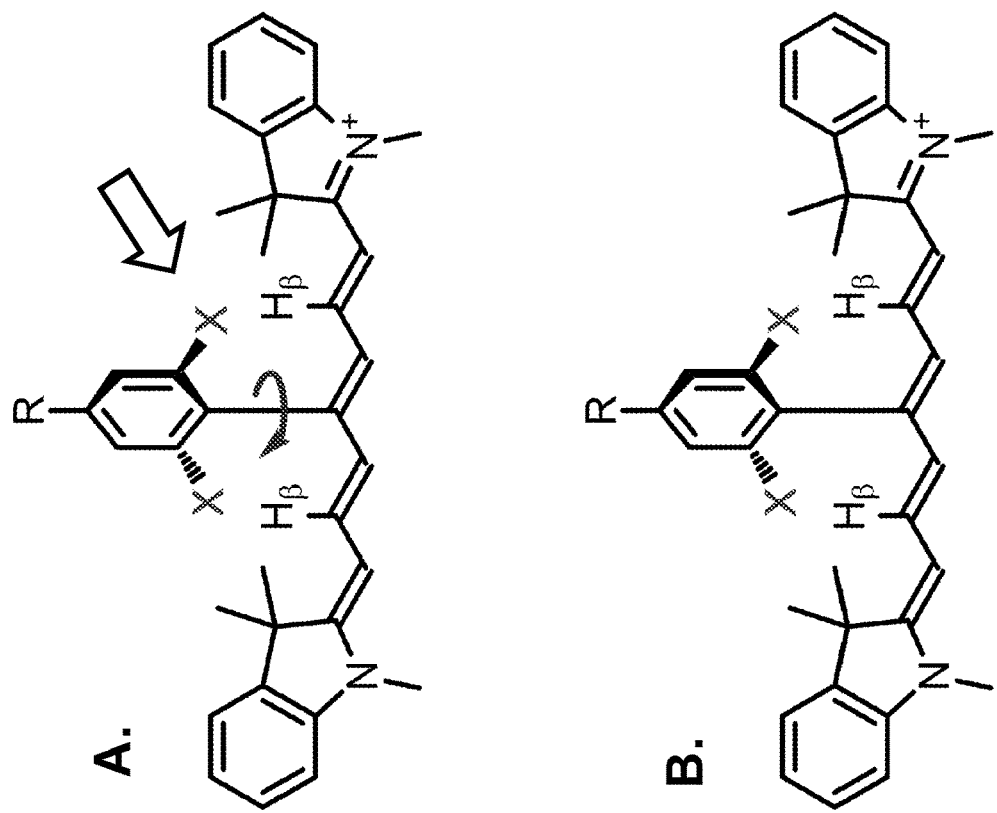
Figure 1:
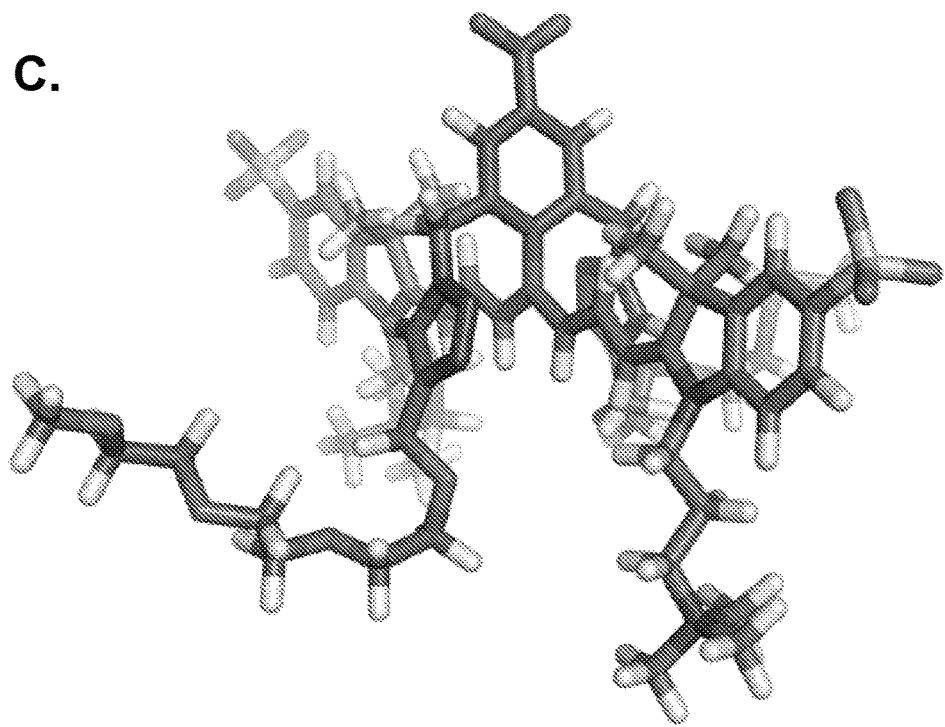

Design and Synthesis. The molecular design is based on the underappreciated fact that a cyanine dye with a meso-Aryl substituent adopts a low-energy conformation with the plane of the aryl ring strongly rotated out the plane of the polyene. Adopting this molecular conformation alleviates steric crowding between the meso-Aryl ortho hydrogens and the proximal β hydrogens on the heptamethine chain (FIG. 1). Synthetically, this structural feature was exploited by designing a new three-dimensional architecture that simultaneously projects two shielding arms directly over each face of the polyene. These shielding arms do not greatly increase the molecular weight, but they block undesired biological interactions and enhance photostability. The literature includes a scattering of studies that report self-shielded dyes, but the strategy has not been applied to conjugatable cyanine dyes which are, by far, the most important for NIR fluorescence imaging. To demonstrate the substantial advantages gained by exploiting this approach, a new shielded and charge balanced heptamethine cyanine dye called s775z along with two bioconjugates (Scheme 1) were prepared. The chemical, photophysical and pharmacokinetic properties of these three fluorescent compounds with an analogous set of compounds that are based on the unshielded analogue 756z were compared and major improvements were found in several different NIR dye properties that lead to broadly enhanced bioimaging performance.

For comparative studies, the benchmark heptamethine dye UL766 was prepared and the dye ICG was obtained from a commercial source. A more transformational synthetic achievement was to prepare the shielded heptamethine s775z and control unshielded analogue 756z, along with two bioconjugates of each dye. The common structural elements in s775z and 756z include a heptamethine indocyanine fluorochrome and a geometric balanced periphery of cationic and anionic residues. There are two crucial structural differences; the presence of the two shielding arms in s775z as discussed in the introduction section, and the presence of the central cyclohexyl ring in 756z. While the central cyclohexyl ring bolsters molecular rigidity, which is often considered a favorable structural attribute for fluorescent dyes, it was reasoned that the rigidity combined with increased hydrophobicity was a factor promoting dye self-aggregation. Reported examples of linear heptamethine polyenes that have a meso-positioned substituent but no central cyclohexyl ring are rare and historically hard to make. The synthetic advance that allowed us to prepare linear and meso-functionalized s775z was the newly reported methodology of Stackovi and coworkers that involves ring opening of Zincke salts. The significant advantage gained by employing this innovative synthetic strategy is that the C—C link to the center of the heptamethine polyene is formed before the complete polyene is created and thus the C—C coupling reaction does not encounter high steric hindrance. The key synthetic intermediate 1 was prepared in five steps and then converted quantitatively into 2 by conducting a copper catalyzed alkyne azide cycloaddition (CuAAC) reaction that attached two triethyleneglycol chains (Scheme 2). The next step was a Zincke reaction; a two-step process that first formed a pyridinium salt, 3, and then reacted it with two molar equivalents of charge balanced indolium 4 to give the t-butyl protected heptamethine dye which was converted into shielded s775z.

Scheme 2. Synthesis of s775z.

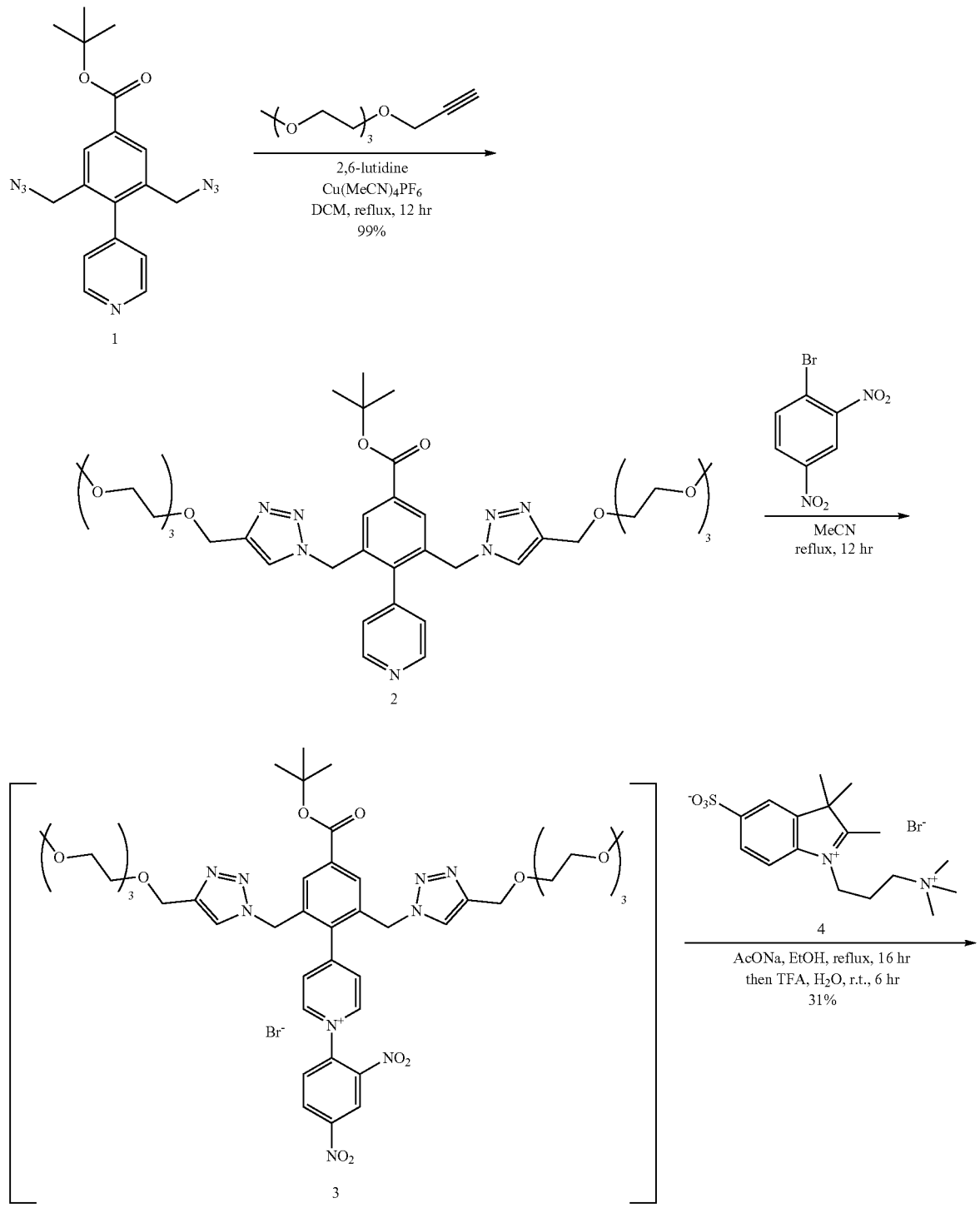

Molecular Structure of s775z

The energy minimized molecular model of s775z in FIG. 1 shows how the two shielding arms, with triethyleneglycol chains, project over both faces of the heptamethine polyene that is an all-trans conformation. The model is consistent with reported X-ray crystal structures showing the meso-Aryl ring strongly rotated out of the plane of the polyene. Close inspection of the $^1$H NMR spectra for s775z in water reveals the heptamethine proton coupling constants ($^3J_{HH}$) to all be 13.5 Hz indicating a polyene chain with an all-trans conformation. In addition, $^1$H-$^1$H NOE experiments identified cross relaxation between indolenine gem-dimethyl protons and polyene protons, as well as shielding chain protons, all consistent with an all-trans polyene. Finally, the chemical shifts for the heptamethine p-protons and indolenine gem-dimethyl groups in 756z and s775z are substantially upfield of the analogous peaks in related heptamethine structures that do not have a meso-Aryl substituent, reflecting strong magnetic shielding of these diagnostic protons by the face of the rotated meso-Aryl ring.

Spectral Properties and Stability. As shown in Tables 1, 2 and 3, the fluorescence brightness of shielded s775z and benchmark UL766 were listed within experimental error. Importantly, the excitation/emission wavelengths of s775z (ex: 775 nm, em: 794, in PBS) closely match the typical default settings of commercial closed box and open field imaging stations, which means minimal refinement of machine configuration is needed for future utilization of molecular probes that are based on s775z.

TABLE 1

Spectral and Reactivity Properties of Dyes in PBS (pH 7.4).[a]

| | 756z | s775z | UL766[g] | ZW800-1[g] | CW800[g] |
|---|---|---|---|---|---|
| $\lambda^{abs}_{max}$ (nm) | 681 (a)[f] 756 (m)[f] | 775 | 766 | 770 | 775 |
| $\lambda^{em}_{max}$ (nm) | 773 | 794 | 789 | 788 | 796 |
| ε ($M^{-1}cm^{-1}$) ($R^2$)[b] | 99,000 (0.942)[b] | 201,000 (0.999) | 229,000 | 246,000 | 242,000 |
| QY[c] | 0.097 | 0.090 | 0.095 | 0.135 | 0.090 |
| Brightness[d] | 9,600 | 18,000 | 22,000 | 33,000 | 22,000 |
| Stable to nucleophiles[e] | Yes | Yes | Yes | No | No |

[a]Concentration range of dyes is 0-5 μM. All measurements were made at room temperature.
[b]Molar absorptivity of monomer band, nonlinear relationship with concentration due to dye self-aggregation.
[c]Quantum yield relative to UL766, error is ±10%.
[d]ε × QY, error is ±15%.
[e]Meso linkage is not cleaved by biological amines or thiols.[10, 12]
[f]a = aggregate; m = monomer.
[g]Spectral data from reference.

Aqueous samples of s775z can be stored indefinitely at 4° C., and samples of s775z in 100% fetal bovine serum (FBS) do not change at 37° C. over 24 hours (FIG. 12a) which is in contrast to the known degradation of CW800 and ZW800-1 under very similar conditions.

High photostability is also a highly desired, but an elusive heptamethine cyanine dye property. Photobleaching of a heptamethine cyanine dye is primarily caused by a bimolecular reaction of the heptamethine polyene with photogenerated singlet oxygen. The predominant reaction pathway forms a strained dioxetane intermediate followed by a fragmentation cascade. A possible second minor pathway is electron transfer from the polyene to singlet oxygen leading to a dimerized dye structure.

Figure 2:
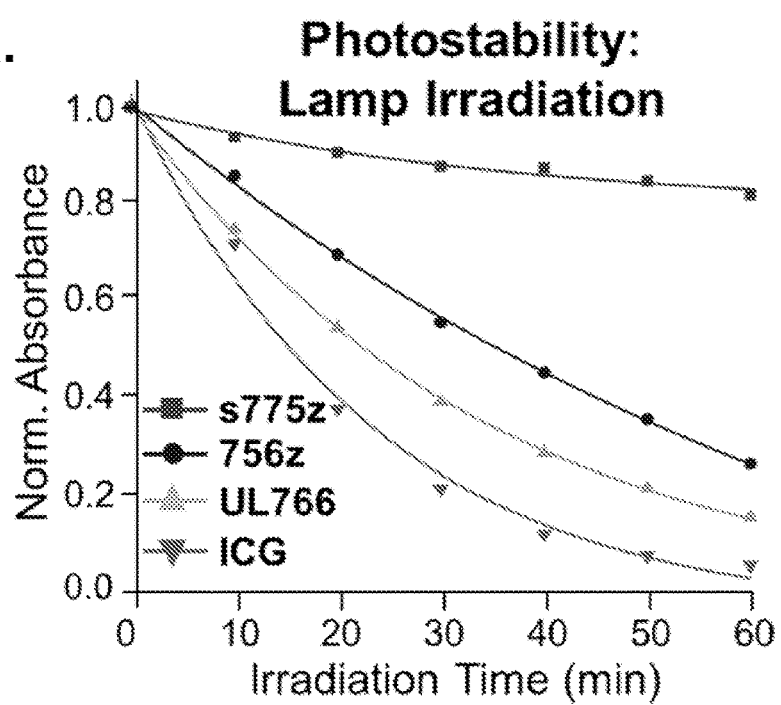
FIG. 2. Two separate photostability studies. (a) Lamp irradiation: Four separate cuvettes, each containing 1 μM dye in PBS buffer, pH 7.4, were irradiated by a 150 W Xenon lamp with a 620 nm long-pass filter. The plot of normalized dye absorbance versus time was fit to a one-phase exponential decay. (b) Imaging station irradiation: Imaging phantoms (immobilized 100 μL drops containing s775z or UL766, 10 μM in PBS buffer, pH 7.4) were irradiated with an in vivo imaging station's 745 nm LED for a total period of 60 min. The mean pixel intensity (MPI) values for the fluorescence images (ex: 745 nm, em: 850 nm) are listed (N=3 for each phantom). The length scale bar on each NIR fluorescence image is 1 cm.
Figure 2:
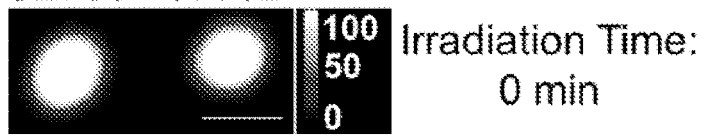
Figure 2:
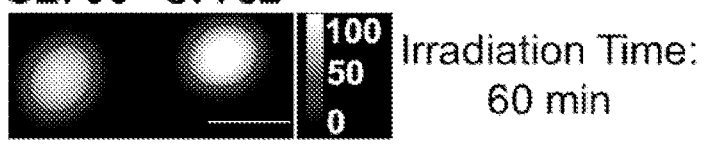

Shown in FIG. 2 are the results of two separate photostability studies. The first study irradiated four different cuvettes, each containing a solution of dye in PBS, with a Xenon lamp (filtered to allow wavelengths >620 nm) and monitored for a decrease in the dye's absorption maxima band (FIG. 2a, see FIG. 15 for the entire set of spectral plots and Table 4 for quantification). The order of photostabilities was observed to be s775z>756z>UL766>ICG. An additional competitive experiment irradiated a single solution containing a mixture of s775z and UL766 which ensured that both dyes were exposed to the same number of photons and photogenerated singlet oxygen. Analysis of the solution mixture after irradiation revealed slight decomposition of the s775z but complete loss of all UL766.

A second, independent photostability study confirmed the difference between s775z and UL766 under milder irradiation conditions that more closely resembled an in vivo imaging experiment or clinical intraoperative imaging procedure. Imaging phantoms were created by immobilizing stable drops of s775z or UL766 (100 μL, 10 μM in PBS buffer, pH 7.4) on a black non-reflective sheet. The phantoms were placed inside a commercial in vivo imaging station and continuously exposed to the station's 745 nm LED. The data in FIG. 2b shows the change in mean pixel intensity (MPI) for the phantom images. After 60 min of constant irradiation, the images of phantoms containing UL766 had decreased to 58±2% of initial intensity; whereas the images of phantoms containing s775z had only decreased to 77±2% of initial intensity.

These heptamethine photostability trends suggest that the meso-Aryl group in s775z with its two shielding arms induces three synergistic effects that inhibit bimolecular reaction of its heptamethine polyene with electrophilic singlet oxygen: (a) the meso-Aryl group within s775z electronically deactivates polyene reactivity (lowers the HOMO energy) compared to UL766 which has an electron donating meso-OAlkyl group, (b) the steric bulk of the meso-Aryl group in s775z destabilizes any putative dioxetane intermediate formed by oxygen/polyene cycloaddition, and (c) the two shielding arms in s775z sterically inhibit singlet oxygen attack at the polyene, compared to unshielded 756z, providing more opportunity for the short-lived singlet oxygen to relax by another physical pathway.

Aggregation of Dyes and Bioconjugates. The solubility of s775z in water is remarkably high at >100 mM and a 1 mM stock solution of s775z in water was found to be unchanged after one month storage at 4° C. In contrast, a freshly prepared 1 mM stock solution of unshielded 756z in water forms a precipitate after 24 hr, and the insoluble material cannot be redissolved after sonication. The difference in water solubility between s775z and 756z correlates with the propensities to form self-aggregates. Self-aggregation of heptamethine cyanine dyes is readily indicated by conversion of monomer absorption bands into aggregate bands, in this case blue-shifted H-aggregates. As shown by the absorption spectra in FIG. 2a and FIG. 6-9, the control dye 756z exists largely as non-fluorescent H-aggregates (see excitation spectra in FIG. 10), whereas the shielded dye s775z is in a fluorescent monomeric state. A series of dye/protein association studies (FIGS. 9 and 13) found that charge balanced 756z and s775z have similar weak affinities for bovine serum albumin (BSA) with $K_a$ values of $1.6 \times 10^4$ $M^{-1}$ and $1.3 \times 10^4$ $M^{-1}$, respectively, which is about 40 times lower than the $K_a$ for BSA association with ICG.

Figure 3:
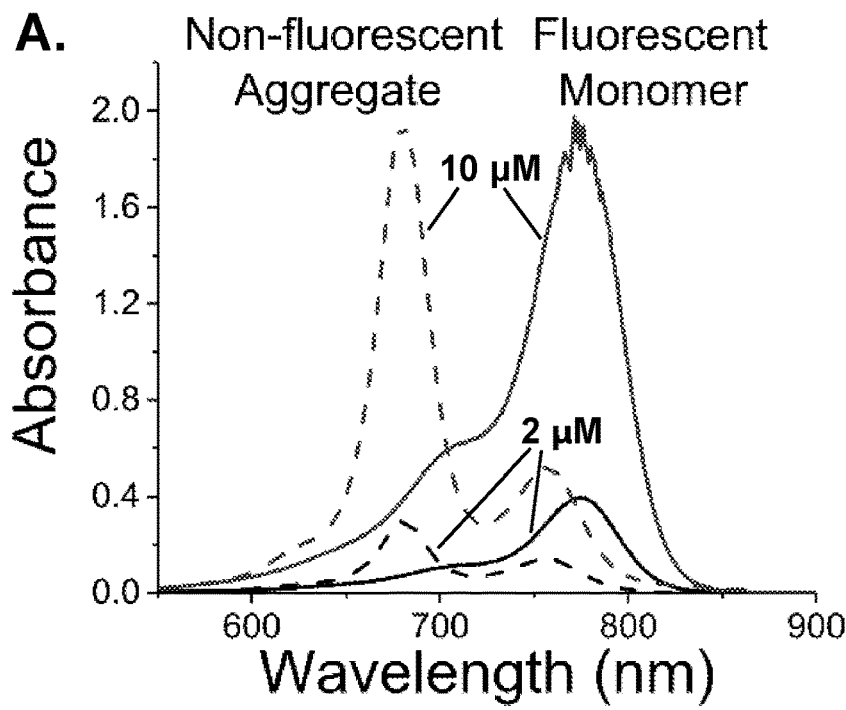
FIG. 3. Absorption spectra. (a) s775z (solid line) and 756z (dashed line), (b) s775z-RGD (solid line) and 756z-RGD (dashed line), in water at different concentrations.
Figure 3:
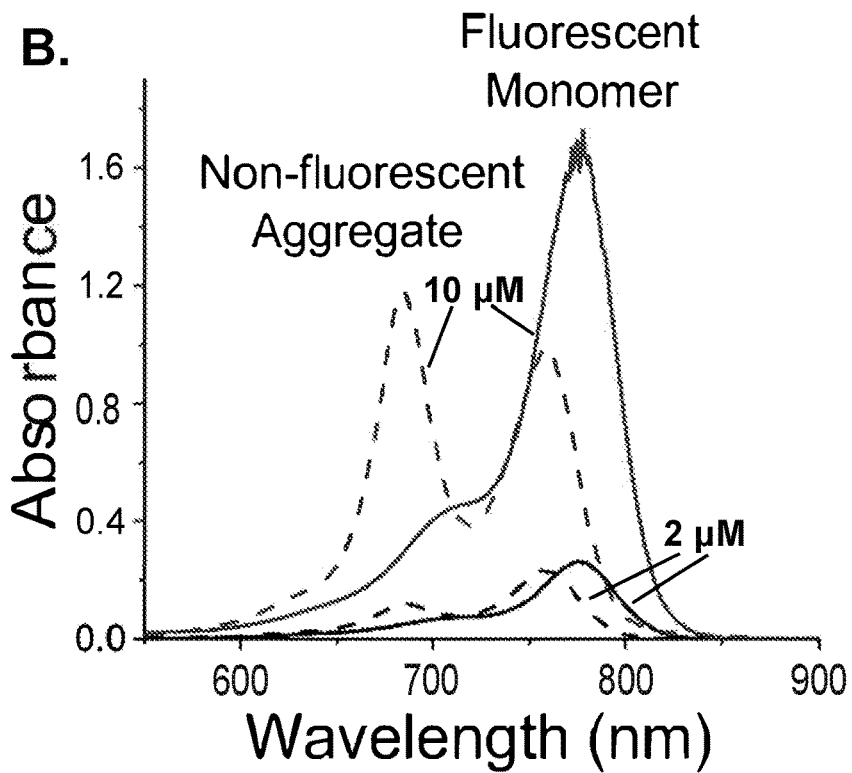

Standard amide bond conjugation chemistry was used to react the NHS ester of 756z or s775z with a free amine on the cyclic peptide targeting unit, cRGDfK, and create the homologous fluorescent peptide probes 756z-RGD and s775z-RGD, respectively (Scheme 1). The absorption spectra in FIG. 3b and FIG. 11 show that the unshielded probe 756z-RGD exists as a concentration-dependent mixture of fluorescent monomer and non-fluorescent H-aggregate (see excitation spectrum in FIG. 10), whereas the shielded probe s775z-RGD is a fluorescent monomer in water even at the highest concentration tested (10 µM).

Amide bond formation was also used to attach multiple copies of either 756z or s775z to an antibody. Two sets of antibody conjugates were each prepared by reacting goat Immunoglobulin G (IgG) with dye NHS ester followed by size exclusion purification to remove any unreacted dye. Purified samples of 756z-IgG (degree of labeling (DOL) =2.1) and s775z-IgG (DOL=2.3) were found to be stable over 7 days when stored at 4° C. in PBS buffer (FIG. 16), unlike antibody conjugates of ZW800-1 which have been reported to partially degrade over 24 hours. The absorption spectrum of control antibody conjugate 756z-IgG (FIG. 4a) shows a blue-shifted H-aggregate peak at 680 nm corresponding to close stacking of the appended fluorochromes because they are attached to the antibody at proximal positions (see FIG. 21 for a schematic picture). A patch of stacked appended fluorescent dyes on an antibody surface is problematic for several reasons, including: (a) the stacked dyes can disrupt antibody folding or structural dynamics and thus antibody function; (b) the H-aggregate peak is non-fluorescent which weakens utility of the antibody conjugate for high sensitivity fluorescence imaging or diagnostics; (c) a patch of stacked appended dyes can become a hydrophobic hot spot on the antibody surface and promote undesired antibody aggregation or association with biological interfaces. This latter point became apparent when versions of control 756z-IgG with DOL>2.1 were prepared; absorption spectra for these samples indicated extensive light scattering due to intermolecular aggregation of the antibody conjugate. In stark contrast, the absorption spectrum of an analogous antibody conjugate, s775z-IgG, did not exhibit a stacked fluorochrome peak (FIG. 4a).

Figure 4:
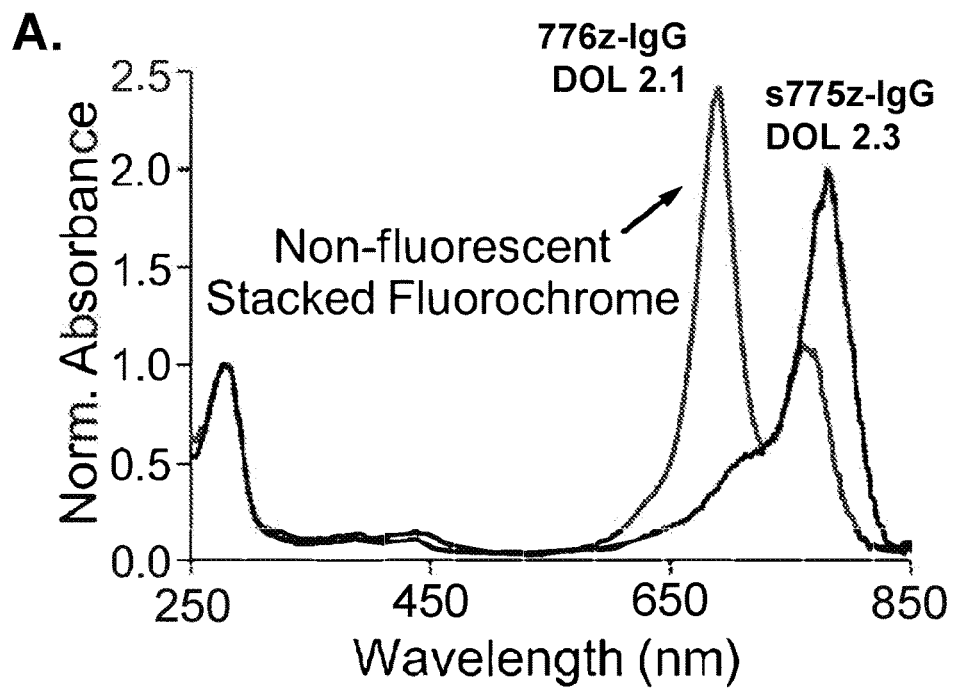
FIG. 4. (a) Absorbance spectra (normalized to the absorbance at 280 nm) for samples of 756z-IgG or s775z-IgG with very similar DOL. Only the 756z-IgG spectrum exhibits a blue-shifted peak corresponding to non-fluorescent stacked fluorochrome. (b) Plot of DOL for 756z-IgG or s775z-IgG versus fluorescence intensity (corrected for protein concentration and normalized relative to s775z-IgG DOL 10.7) for different bands of pure 756z-IgG or s775z-IgG on a polyacrylamide gel.
Figure 4:
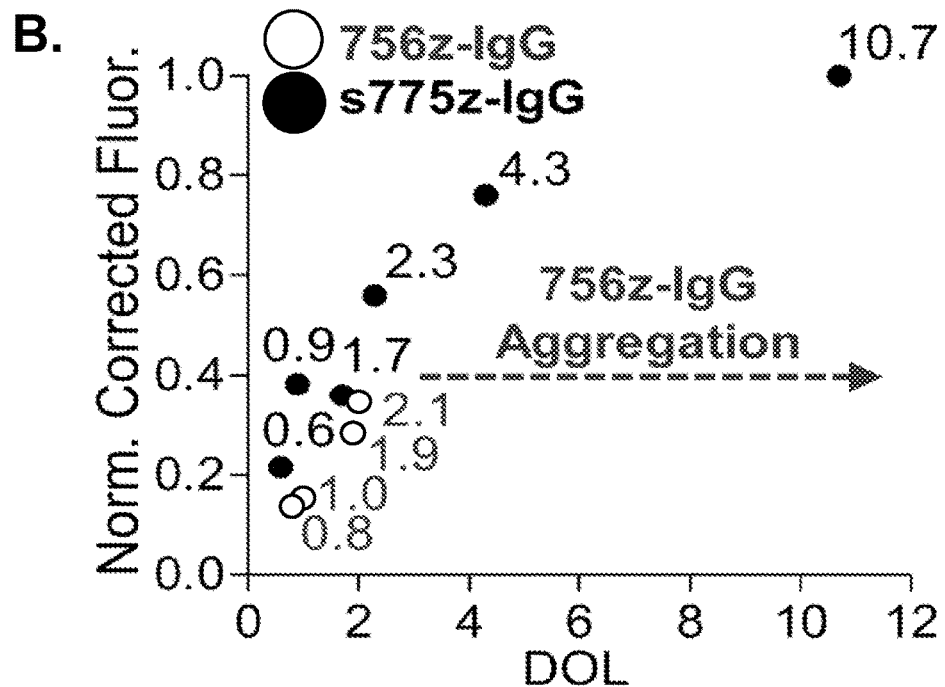

Shown in FIG. 4b is a plot of relative fluorescence intensity for different polyacrylamide gel bands comprised of s775z-IgG with increasing DOL. The plot reveals an inverse exponential dependence of relative fluorescence on DOL, up to the highest DOL tested which was 10.7. Even at this unusually high DOL, there was no stacked fluorochrome peak in the conjugate's absorption spectrum (FIG. 15), indicating that the 10.7 (on average) copies of s775z covalently appended to the surface of the IgG were not spatially close enough for strong Coulombic coupling of dye excitons. The fact that fluorescence intensity for s775z-IgG continually increases with DOL, without reaching a maximum value, is unusual for a protein labeled with a cyanine dye, especially a heptamethine cyanine. This finding has important practical implications because it suggests that bright, densely labeled s775z-antibodies can be used at very low doses for diagnostics or imaging applications. This is crucial in the field of fluorescence guided surgery where the procedural and practical benefits of conducting clinical trials under microdosing regimes are well recognized, but to date very few microdose trials have been attempted with fluorescent antibodies because they are not sufficiently bright.

Biological Imaging Studies. The overall goal of the biological imaging studies was to determine if the heptamethine steric shielding effect promoted high performance NIR fluorescence imaging. More specifically, it was necessary to prove that the length of the shielding triethyleneglycol chains in s775z was long enough to block non-specific interactions with membrane surfaces, serum proteins, and the extracellular matrix. Yet the shielding arms had to be short enough to permit strong association of dye-labeled bioconjugates with specific cell receptors and also allow rapid renal excretion of any unbound probe.

The hypothesis of low non-specific binding was first tested by measuring the cell uptake, cell toxicity, and mouse biodistribution of s775z. Cell microscopy experiments showed negligible cell uptake of s775z, and there was no significant drop in cell viability after 24 hours of dye incubation at the low micromolar concentrations commonly used for biological imaging (FIG. 18). Mouse biodistribution studies injected two separate cohorts of normal mice with a 10 nmol dose of ICG or s775z, followed by whole body imaging over time (all mouse experiments used protocols that were approved by the university's Institutional Animal Care and Use Committee). After 2 hours the mice were sacrificed, and the abdominal cavity of each animal was exposed and imaged. The live mouse images (FIG. 20a) showed that both dyes were quickly cleared from the mouse bloodstream. But as revealed by the representative NIR images of exposed abdomen in FIG. 5a and the associated biodistribution graph (FIG. 20b), the blood clearance pathways were very different. As expected, virtually all of the ICG remained within the animals, where it accumulated in the intestines and liver. In contrast, most of the s775z had undergone near-exclusive renal clearance after 2 hours, with only weak NIR fluorescence remaining in the urine-containing bladder and kidneys.

The next step was to prove that the two shielding triethyleneglycol chains in s775z did not prevent a targeted version of the dye from binding to cancer cell-surface receptors. This was done by first studying the cell targeting properties of the peptide conjugates, s775z-RGD and 756z-RGD. These two conjugates include the cyclic peptide sequence cRGDfK that is well-known to have nanomolar affinity for cell-surface integrin receptors, more specifically the receptor sub-types $\alpha_v\beta_3$ and $\alpha_v\beta_5$. The ubiquity of RGD-based molecular probes makes cRGDfK a sensible choice of targeting unit for comparative studies of biological imaging performance. Cancer cells A549 (human lung adenocarcinoma) were focused on, which is a cell line that overexpresses integrin $\alpha_v\beta_5$ receptors and selectively internalizes fluorescent cRGDfK conjugates. A comparative set of fluorescence microscopy experiments incubated separate samples of A549 cells with each fluorescent compound (s775z-RGD, 756z-RGD, s775z, or 756z) and observed much higher cell uptake of two cRGDfK targeted probes compared to their untargeted counterparts (FIG. 19). Moreover, cell uptake of the shielded s775z-RGD was higher than cell uptake of the unshielded and self-aggregated 756z-RGD. In both cases, the cell uptake of targeted probe was successfully blocked by pre-incubating the cells with an excess amount of the optically transparent targeting peptide cRGDfK (FIG. 5b), strongly indicating that cell uptake was caused by integrin-selective binding and subsequent endocytosis.

Figure 5:
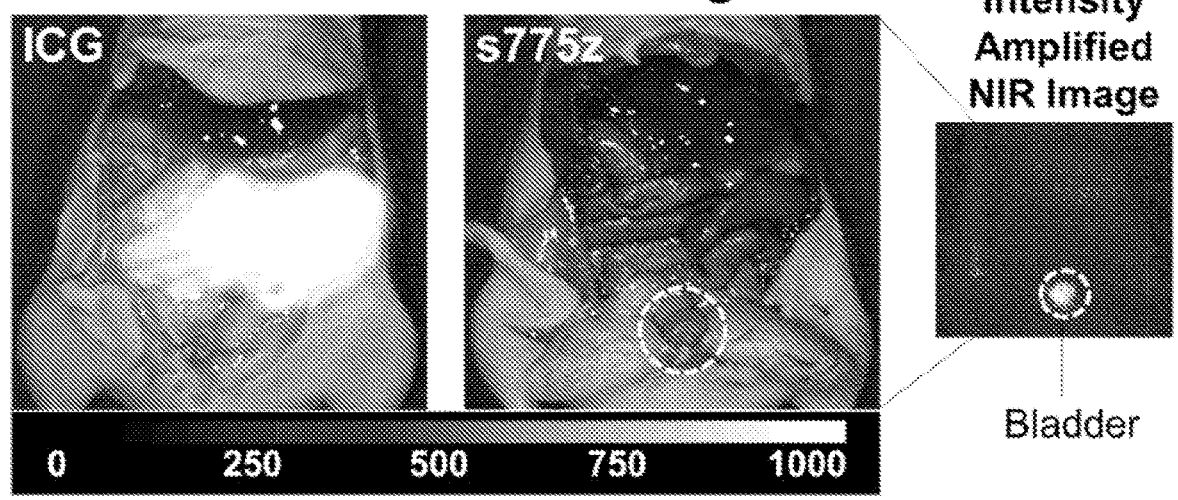
FIG. 5. (a) Representative overlaid brightfield and fluorescence images of exposed abdomen of normal mice (no tumor) sacrificed 2 hr after retro-orbital injection of either ICG or s775z (10 nmol). The fluorescence intensity scale, in arbitrary units, is the same for both overlaid images, whereas the intensity of smaller NIR fluorescence image is amplified. (b) Plot of intracellular mean fluorescence intensities as a measure of NIR dye cell uptake. Integrin positive A549 cells were treated for 1 hr with 10 µM of NIR probe. The blocking experiments added 100 µM of free cRGDfK prior to the incubation with RGD probes. (c) Representative whole-body NIR fluorescence images of living mice bearing a subcutaneous A549 tumor at 0.5 and 3 hr after retro-orbital injection of either s775z or s775z-RGD (10 nmol). (d) Plot of Tumor-to-Background Ratio (TBR) in living mice at different post-injection time points. (e) Plot of MPI for excised tumors normalized to thigh muscle from the same mouse sacrificed at 3 hr post-injection. Average for each cohort (N=4) is indicated by a black line, with error bars indicating ±SEM. Representative NIR fluorescence image of an excised tumor is shown above each cohort. * indicates $p<0.05$, and ** $p<0.01$.
Figure 5:
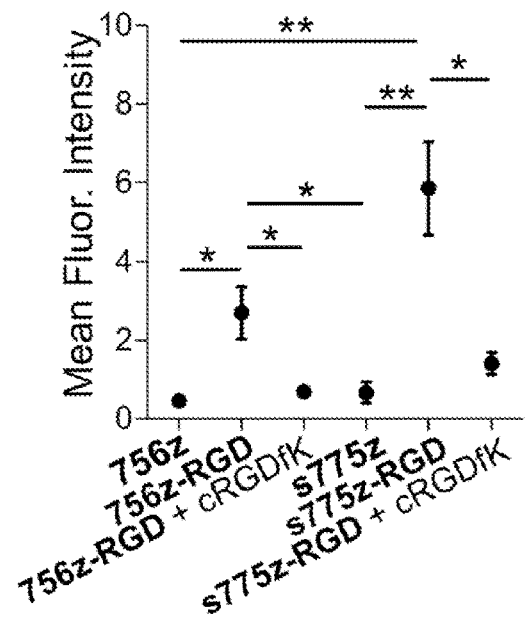
Figure 5:
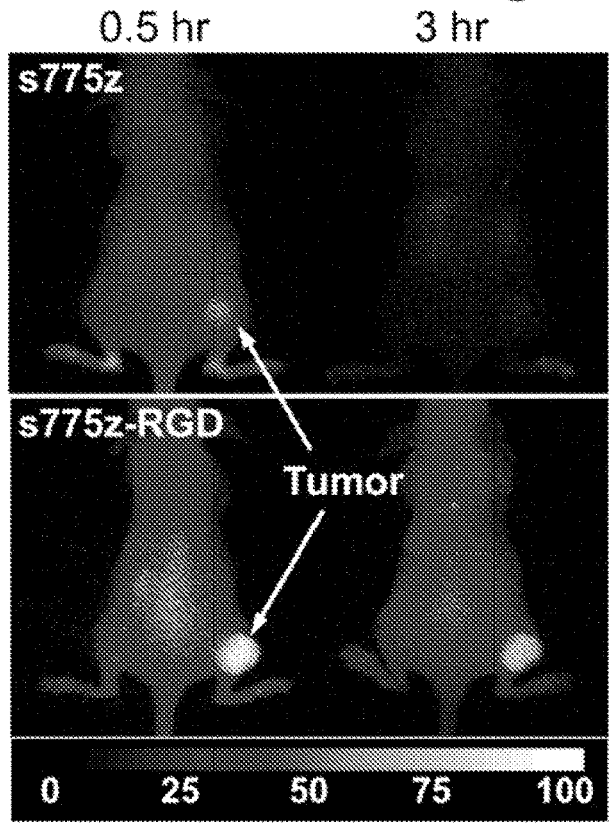
Figure 5:
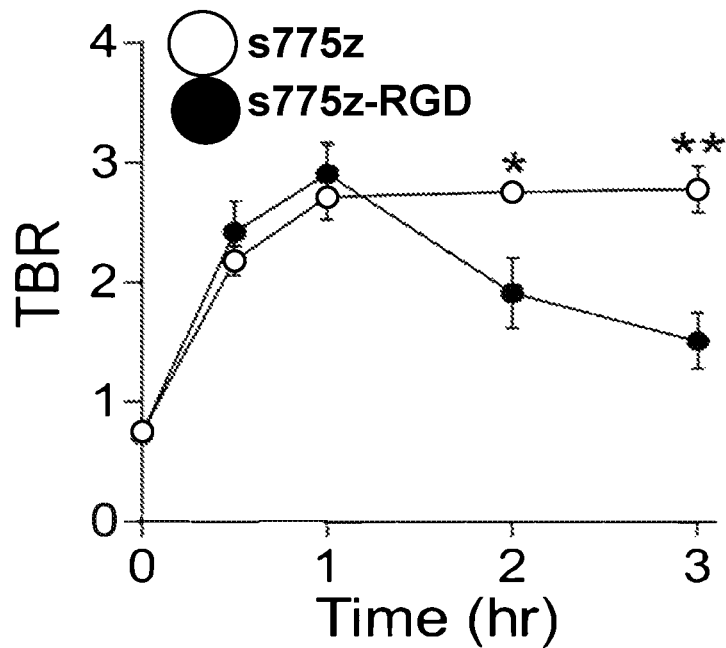
Figure 5:
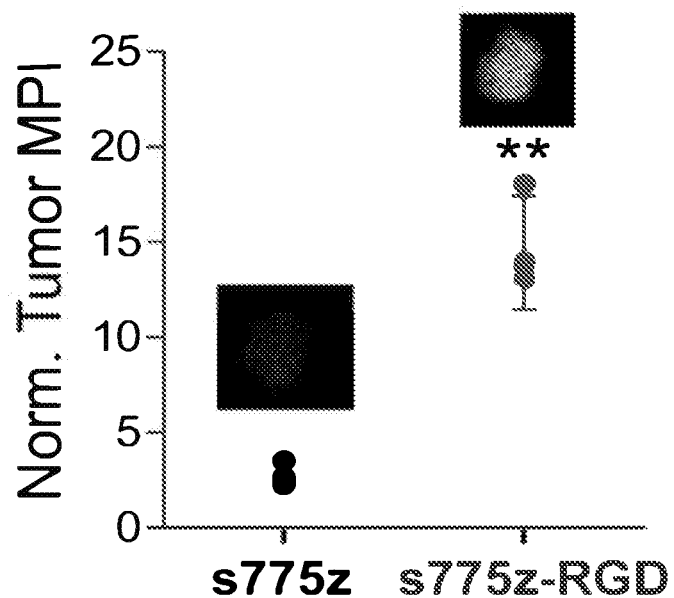

The high level of A549 cell uptake by cancer targeted s775z-RGD prompted us to conduct in vivo imaging studies using a subcutaneous mouse tumor model. Nude mice (N=8) bearing a subcutaneous tumor (A549 cells) in the right rear flank were randomly divided into two cohorts and given a retro-orbital injection of either s775z or s775z-RGD (10 nmol). Each mouse was imaged periodically over 3 hours (FIGS. 5c and 21) and the change in tumor fluorescence MPI and Tumor-to-Background ratio was plotted (FIGS. 5d and 22). The live animal images were consistent with the standard pharmacokinetic model for tumor partitioning of small untargeted and targeted probes. The mice dosed with s775z showed transient uptake into the subcutaneous tumor followed by washout of the untargeted dye. In contrast, the images of mice dosed with the targeted s775z-RGD showed much slower washout from the tumor leading to a significantly higher Tumor-to-Background ratio at the 2 hour and 3 hour time points (FIGS. 5d and 21-22). This difference in tumor imaging capability reflects the high affinity of the targeted s775z-RGD probe for the overexpressed integrin receptors on the surface of the cancer cells and endothelial cells that line the tumor vasculature. After the 3 hour time point, the mice were sacrificed, and a mock surgery was performed on the mouse cohort dosed with s775z-RGD (FIG. 23). Subsequently, all tumors and major organs were removed and the amount of dye in the different tissues was quantified by measuring the fluorescence MPI.

Shown in FIG. 5e is a plot of MPI for excised tumors, normalized to thigh muscle, and also a pair of representative NIR fluorescence images of the excised tumors. The complete set of tumor NIR fluorescence images is provided in FIG. 24 and a plot of normalized MPI for all excised tissues is shown in FIG. 25. The normalized tumor MPI for mice dosed with cancer targeted s775z-RGD (14.4±3.0) was much higher than the value for mice dosed with untargeted s775z (2.6±0.5), and reflects a combination of high affinity for the overexpressed integrin receptors in the tumor tissue and very low affinity for background muscle tissue. From the perspective of fluorescence guided cancer surgery, s775z-RGD achieved the highly desirable combination of rapid, near-exclusive renal clearance from the bloodstream, very high Tumor-to-Background ratio, and ultralow retention in background tissue. Thus, s775z-RGD has high potential for passage towards clinical translation.

Pharmaceutical Formulations

The compounds described herein can be used to prepare therapeutic pharmaceutical compositions, for example, by combining the compounds with a pharmaceutically acceptable diluent, excipient, or carrier. The compounds may be added to a carrier in the form of a salt or solvate. For example, in cases where compounds are sufficiently basic or acidic to form stable nontoxic acid or base salts, administration of the compounds as salts may be appropriate. Examples of pharmaceutically acceptable salts are organic acid addition salts formed with acids that form a physiologically acceptable anion, for example, tosylate, methanesulfonate, acetate, citrate, malonate, tartrate, succinate, benzoate, ascorbate, α-ketoglutarate, and β-glycerophosphate. Suitable inorganic salts may also be formed, including hydrochloride, halide, sulfate, nitrate, bicarbonate, and carbonate salts.

Pharmaceutically acceptable salts may be obtained using standard procedures well known in the art, for example by reacting a sufficiently basic compound such as an amine with a suitable acid to provide a physiologically acceptable ionic compound. Alkali metal (for example, sodium, potassium or lithium) or alkaline earth metal (for example, calcium) salts of carboxylic acids can also be prepared by analogous methods.

The compounds of the formulas described herein can be formulated as pharmaceutical compositions and administered to a mammalian host, such as a human patient, in a variety of forms. The forms can be specifically adapted to a chosen route of administration, e.g., oral or parenteral administration, by intravenous, intramuscular, topical or subcutaneous routes.

The active compound may be administered intravenously or intraperitoneally by infusion or injection. Solutions of the active compound or its salts can be prepared in water, optionally mixed with a nontoxic surfactant. Dispersions can be prepared in glycerol, liquid polyethylene glycols, triacetin, or mixtures thereof, or in a pharmaceutically acceptable oil. Under ordinary conditions of storage and use, preparations may contain a preservative to prevent the growth of microorganisms.

Pharmaceutical dosage forms suitable for injection or infusion can include sterile aqueous solutions, dispersions, or sterile powders comprising the active ingredient adapted for the extemporaneous preparation of sterile injectable or infusible solutions or dispersions, optionally encapsulated in liposomes. The ultimate dosage form should be sterile, fluid and stable under the conditions of manufacture and storage. The liquid carrier or vehicle can be a solvent or liquid dispersion medium comprising, for example, water, ethanol, a polyol (for example, glycerol, propylene glycol, liquid polyethylene glycols, and the like), vegetable oils, nontoxic glyceryl esters, and suitable mixtures thereof. The proper fluidity can be maintained, for example, by the formation of liposomes, by the maintenance of the required particle size in the case of dispersions, or by the use of surfactants. The prevention of the action of microorganisms can be brought about by various antibacterial and/or antifungal agents, for example, parabens, chlorobutanol, phenol, sorbic acid, thimerosal, and the like. In many cases, it will be preferable to include isotonic agents, for example, sugars, buffers, or sodium chloride. Prolonged absorption of the injectable compositions can be brought about by agents delaying absorption, for example, aluminum monostearate and/or gelatin.

Sterile injectable solutions can be prepared by incorporating the active compound in the required amount in the appropriate solvent with various other ingredients enumerated above, as required, optionally followed by filter sterilization. In the case of sterile powders for the preparation of sterile injectable solutions, methods of preparation can include vacuum drying and freeze drying techniques, which yield a powder of the active ingredient plus any additional desired ingredient present in the solution.

The following Examples are intended to illustrate the above invention and should not be construed as to narrow its scope. One skilled in the art will readily recognize that the Examples suggest many other ways in which the invention could be practiced. It should be understood that numerous variations and modifications may be made while remaining within the scope of the invention.

EXAMPLES

Example 1. Synthesis of Compounds

General. Reagents and solvents were purchased from Sigma-Aldrich, VWR, Oakwood, Thermo Fisher and TCI and used without further purification unless stated otherwise. Anhydrous tetrahydrofuran was distilled with metal sodium and benzophenone. Column chromatography was performed using Biotage SNAP Ultra columns. $^1$H, $^{13}$C and ROESY NMR spectra were recorded on a Bruker 500 NMR spectrometer. Chemical shifts are presented in ppm and referenced by residual solvent peak. High-resolution mass spectrometry (HRMS) was performed using a time-of-flight (TOF) analyzer with electrospray ionization (ESI). Absorption spectra were recorded on an Evolution 201 UV/vis spectrometer with Thermo Insight software. Fluorescence spectra were collected on a Horiba Fluoromax-4 fluorometer with FluoroEssence software. Analyte solutions were prepared in HPLC grade water (Sigma-Aldrich), phosphate buffered saline (Thermo Fisher), fetal bovine serum (Sigma-Aldrich) or buffer B (575 mM NaCl, 37.5 mM NaH$_2$PO$_4$ and 0.75 mM EDTA in water, pH 7.5). All absorption and fluorescence spectra were collected using quartz cuvettes (1 mL, 1 cm path length; for emission and excitation spectra, slit width=3 nm).

Synthetic Scheme for s775z

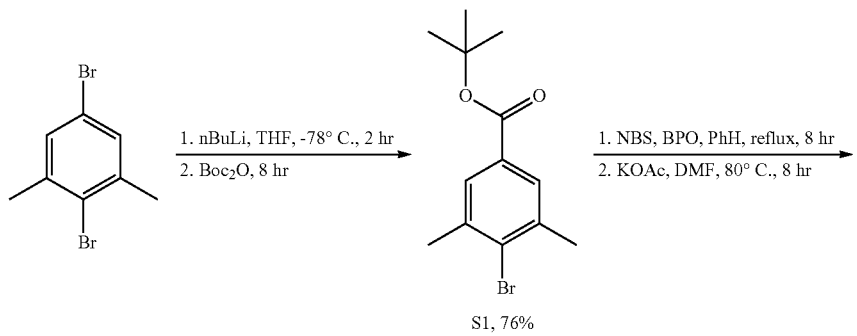

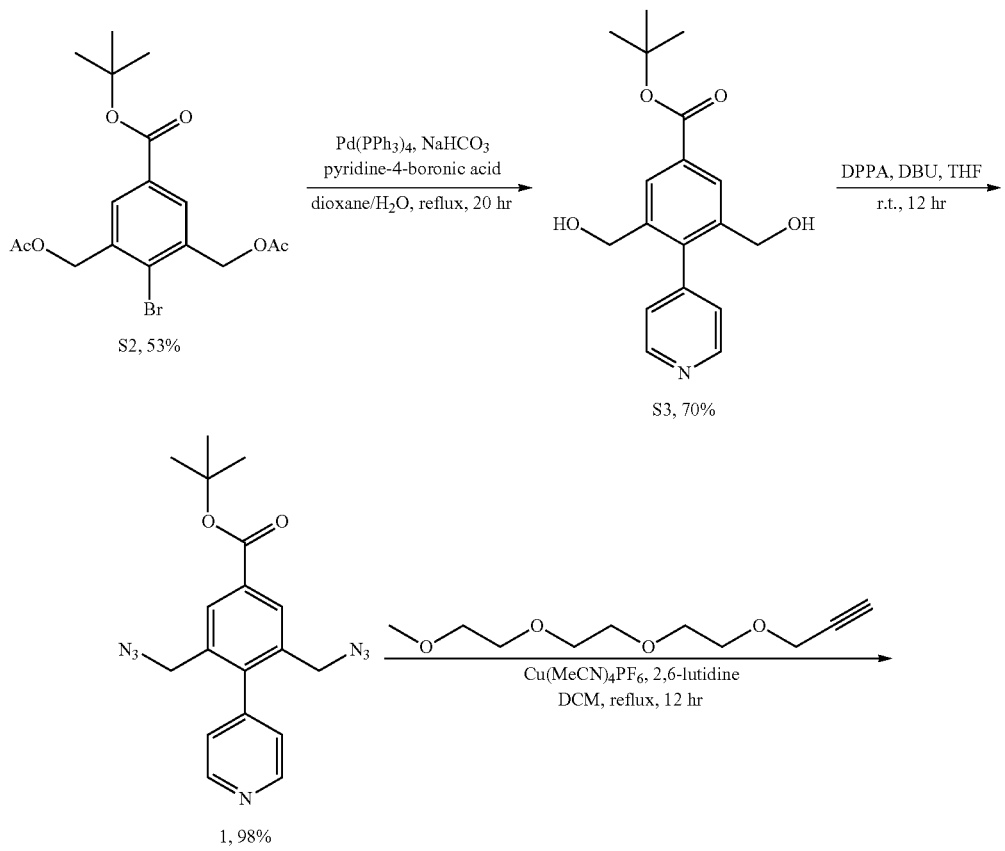

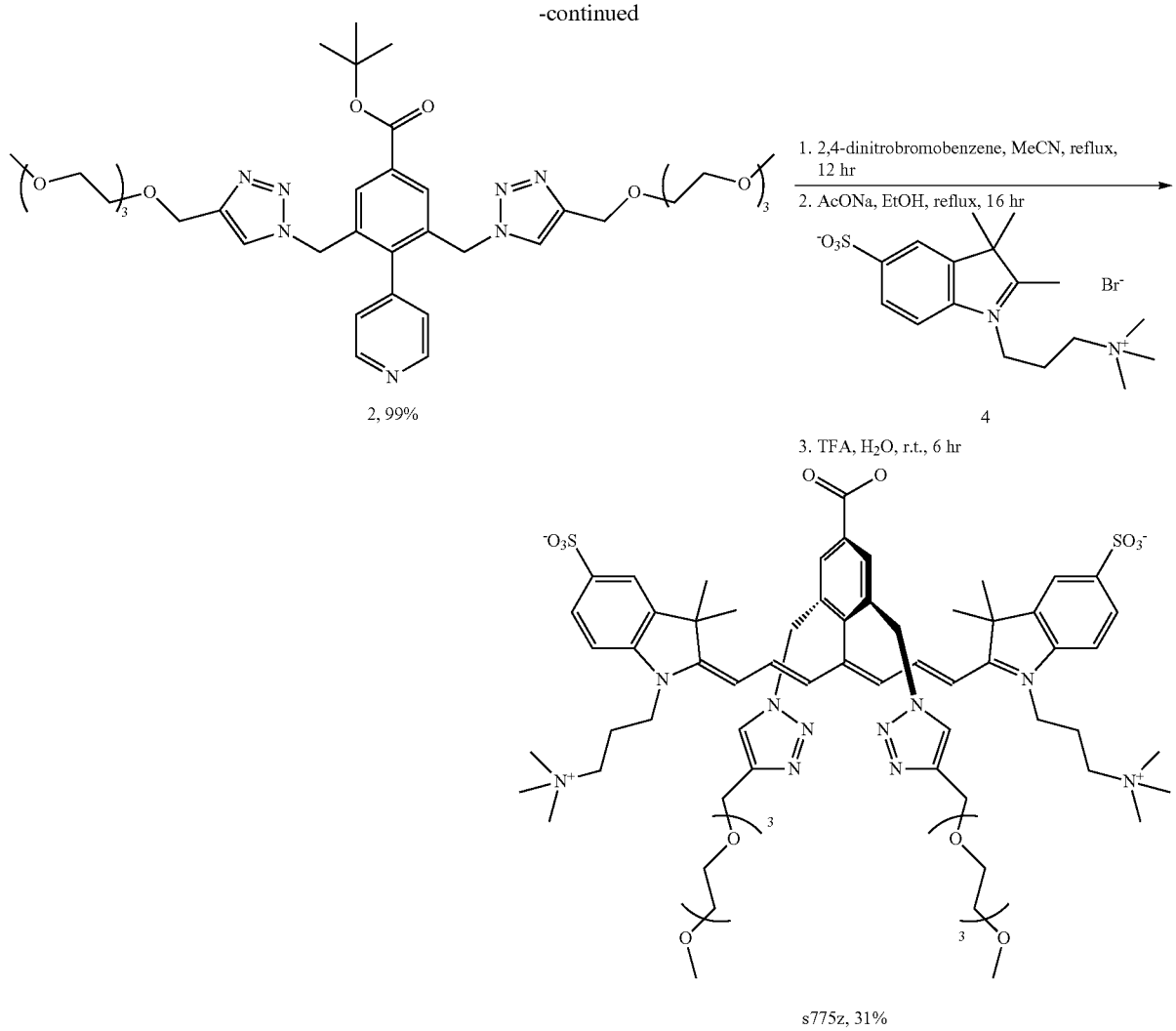

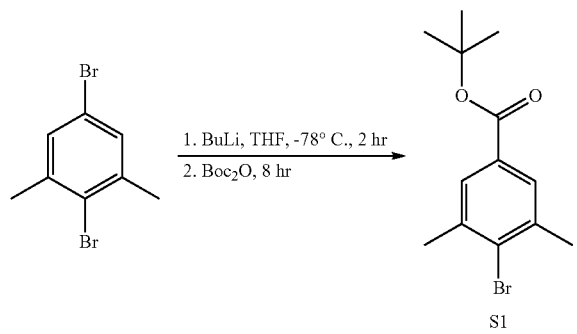

Compound S1. Compound 2,5-dibromo-m-xylene (5.00 g, 18.9 mmol, 1 eq) was dissolved in fresh distilled THF (50 mL). The clear yellow solution was chilled to −78° C. in a dry ice-acetone bath. Air was expelled and refilled with argon using vacuum line. n-Butyl lithium (1.6 M in hexane, 13.0 mL, 20.8 mmol, 1.1 eq) was added dropwise into the solution and gave a cloudy brown mixture. The mixture was stirred at the same temperature for 2 hr. Di-tert-butyl dicarbonate (4.96 g, 22.7 mmol, 1.2 eq) in dry THF (10 mL) was added dropwise. The mixture was allowed to warm to r.t. and at this time it turned clear again. The mixture was stirred for 4 hr at r.t. then quenched with 5% aq. HCl (50 mL). The mixture was extracted with DCM (3×50 mL). The organic extracts were dried over anhydrous sodium sulfate, filtered. Solvent was removed under reduced pressure and the residue was purified by column chromatography (SiO$_2$, 0-5% EtOAc in hexane) to afford S1 as a white solid (4.1 g, 76%, R$_f$=0.6 in hexane/EtOAc=10/1). $^1$H NMR (500 MHz, CDCl$_3$, 25° C.) δ (ppm): 7.67 (s, 2H), 2.45 (s, 6H), 1.59 (s, 9H).

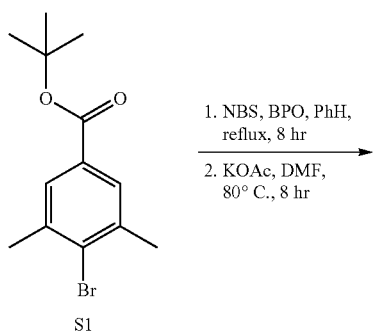

1. NBS, BPO, PhH, reflux, 8 hr
2. KOAc, DMF, 80° C., 8 hr

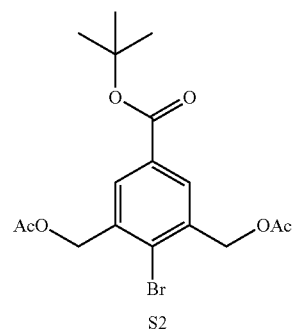

Compound S2. A mixture of S1 (1.00 g, 3.51 mmol, 1 eq), N-bromosuccinimide (1.37 g, 7.71 mmol, 2.2 eq) and benzoyl peroxide (42.5 mg, 175 μmol, 0.05 eq) in benzene (50 mL) was refluxed for 8 hr under argon atmosphere. Solvent was removed under reduced pressure. Hexane (100 mL) was added to the residue then the brown solid was removed by filtration. The filtrated was evaporated under reduced pressure to give the crude diBr intermediate as a brown oil. A mixture of the crude diBr intermediate and potassium acetate (2.06 g, 21.0 mmol, 6 eq) in anhydrous DMF (20 mL) was stirred at 80° C. for 8 hr. The mixture was diluted with water (100 mL) and extracted with DCM (3×100 mL). The organic extracts were dried over anhydrous sodium sulfate, then filtered. Solvent was removed under reduced pressure and the residue was purified by column chromatography ($SiO_2$, 0-15% EtOAc in hexane) to afford S2 as a white solid (740 mg, 53%, $R_f$=0.4 in hexane/EtOAc=4/1). $^1$H NMR (500 MHz, $CDCl_3$, 25° C.) δ (ppm): 7.96 (s, 2H), 5.24 (s, 4H), 2.18 (s, 6H), 1.60 (s, 9H). $^{13}$C NMR (126 MHz, $CDCl_3$, 25° C.) δ (ppm): 170.7, 164.7, 136.6, 131.5, 129.9, 128.7, 82.1, 65.9, 28.3, 21.1. HRMS (ESI-TOF) m/z: $[M+Na]^+$ calcd for $C_{17}H_{21}BrNaO_6^+$ 423.0414. found 423.0414. This reaction gave ~30% monoacetate byproduct.

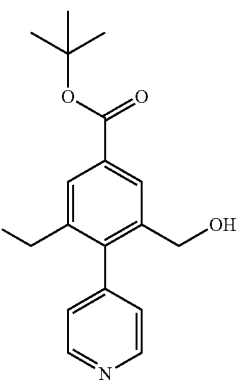

Compound S3. A mixture of S2 (200 mg, 498 μmol, 1 eq), pyridine-4-boronic acid (184 mg, 1.50 mmol, 3 eq) and $Pd(PPh_3)_4$ (28.8 mg, 24.9 μmol, 5 mol %) in 1,4-dioxane (6 mL) and sat. $NaHCO_3$ (3 mL) was refluxed for 20 hr. The mixture was diluted with sat. aq. NaCl (30 mL) and extracted with EtOAc (3×30 mL). The organic extracts were dried over anhydrous sodium sulfate, filtered. Solvent was removed under reduced pressure and the residue was purified by column chromatography ($SiO_2$, 0-8% MeOH in DCM) to afford S3 as a brown solid (100 mg, 70%, $R_f$=0.5 in DCM/MeOH=10/1). $^1$H NMR (500 MHz, DMSO-$d_6$, 25° C.) δ (ppm): 8.64 (d, J=3.5 Hz, 2H), 8.01 (s, 2H), 7.22 (d, J=3.5 Hz, 2H), 5.23 (t, J=4.9 Hz, 2H), 4.11 (d, J=4.9 Hz, 4H), 1.56 (s, 9H). $^{13}$C NMR (126 MHz, DMSO-$d_6$, 25° C.) δ (ppm): 165.8, 150.4, 145.9, 140.4, 140.0, 131.5, 126.7, 124.6, 81.4, 61.1, 28.5. HRMS (ESI-TOF) m/z: $[M+H]^+$ calcd for $C_{18}H_{22}NO_4^+$ 316.1543. found 316.1541.

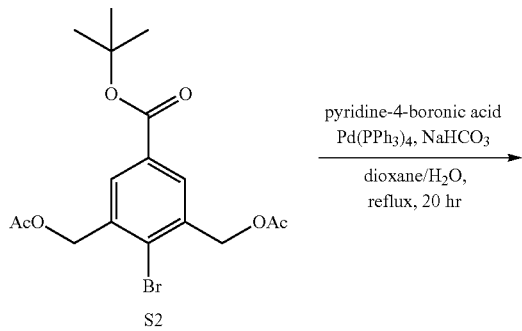

pyridine-4-boronic acid
$Pd(PPh_3)_4$, $NaHCO_3$ dioxane/$H_2O$,
reflux, 20 hr

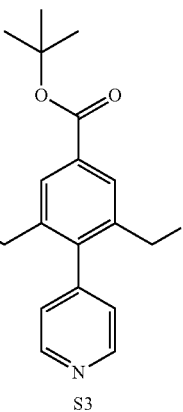

DPPA, DBU, THF
r.t., 12 hr

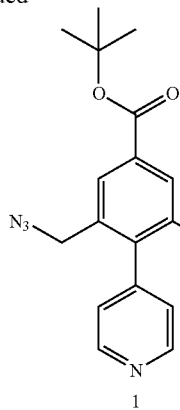

Compound 1. To a solution of S3 (300 mg, 951 μmol, 1 eq) in THF (10 mL) was added diphenylphosphoryl azide (0.614 mL, 2.85 mmol, 3 eq) and 1,8-diazabicyclo[5.4.0]undec-7-ene (0.426 mL, 2.85 mmol, 3 eq). The mixture was stirred at room temperature for 12 hr. Solvent was removed and the residue was purified by flash column chromatography (SiO$_2$, 10-40% EtOAc in hexane) to afford 1 as a yellow solid (340 mg, 98%, R$_f$=0.4 in hexane/EtOAc=1/1). $^1$H NMR (500 MHz, CDCl$_3$, 25° C.) δ (ppm): 8.82 (d, J=5.5 Hz, 2H), 8.08 (s, 2H), 7.44 (d, J=5.5 Hz, 2H), 4.11 (s, 4H), 1.64 (s, 9H). $^{13}$C NMR (126 MHz, CDCl$_3$, 25° C.) δ (ppm): 164.6, 150.5, 145.1, 142.8, 134.4, 133.1, 130.5, 124.2, 82.3, 52.5, 28.4. HRMS (ESI-TOF) m/z: [M+H]$^+$ calcd for C$_{18}$H$_{20}$N$_7$O$_2$$^+$ 366.1673. found 366.1667.

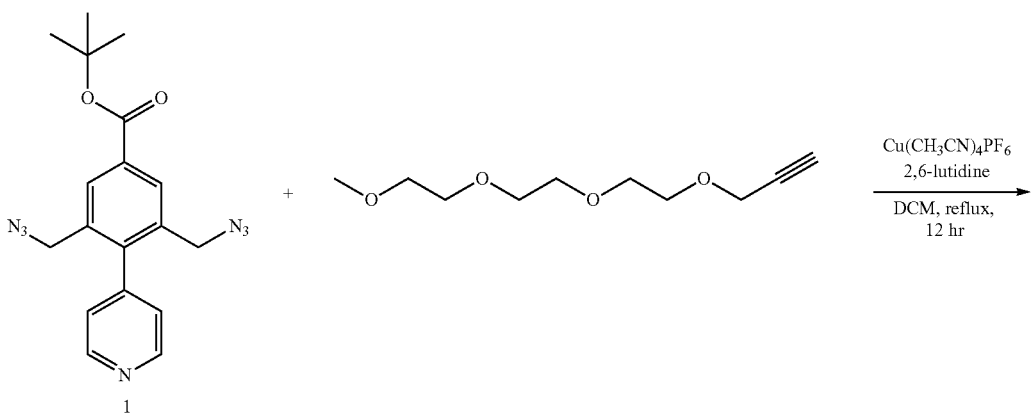

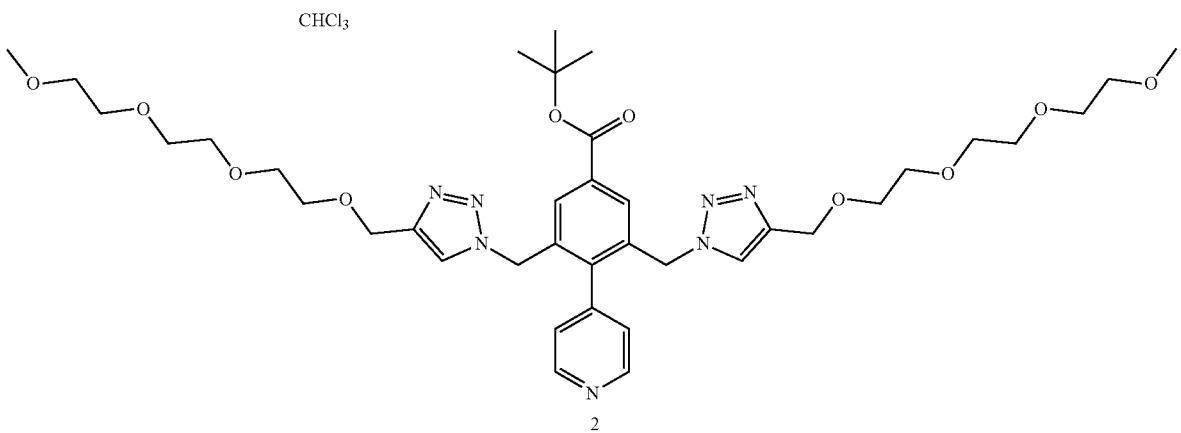

Compound 2. A mixture of 1 (150 mg, 411 µmol, 1 eq), triethylene glycol methyl propargyl ether (249 mg, 1.23 mmol, 3 eq), Cu(MeCN)$_4$PF$_6$ (7.65 mg, 20.5 µmol, 0.05 eq) and one drop of 2,6-lutidine in DCM (10 mL) was refluxed under argon atmosphere overnight. Solvent was removed and the residue was purified by flash column chromatography (SiO$_2$, 0-8% MeOH in DCM) to afford 2 as a brown oil (316 mg, 99%, R$_f$=0.4 in DCM/MeOH=10/1). $^1$H NMR (500 MHz, DMSO-d$_6$, 25° C.) δ (ppm): 8.60 (s, 2H), 7.79 (d, J=1.9 Hz, 2H), 7.72 (d, J=1.9 Hz, 2H), 7.08 (s, 2H), 5.33 (s, 4H), 4.45 (s, 4H), 3.50-3.39 (m, 24H), 3.20 (s, 6H), 1.50 (s, 9H). $^{13}$C NMR (126 MHz, DMSO-d$_6$, 25° C.) δ (ppm): 164.5, 150.5, 150.4, 144.7, 143.0, 135.2, 132.4, 130.9, 129.9, 125.1, 82.1, 71.9, 70.5, 70.4, 70.3, 70.2, 69.5, 64.0, 58.7, 51.3, 28.3. HRMS (ESI-TOF) m/z: [M+H]$^+$ calcd for C$_{38}$H$_{56}$N$_7$O$_{10}$$^+$ 770.4083. found 770.4086.

excess 2,4-dinitrobromobenzene. The brown oil was collected and dried to afford the Zincke salt. A solution of the Zincke salt, 4 (~80 wt %, 163 mg, 390 µmol, 3 eq) and AcONa (63.9 mg, 779 µmol, 6 eq) in ethanol (20 mL) was refluxed for 16 hr in the dark under argon atmosphere. EtOH was removed under reduced pressure, the residue was suspended in acetone (20 mL), sonicated and filtered to remove nonpolar impurities. The filter cake was further purified by reverse phase column chromatography (C18, 0-35% MeOH contains 0.5% TFA in H$_2$O) to afford the tBu protected dye. The protected dye was dissolved in a mixture of water (0.1 mL) and TFA (1.9 mL), the solution was stirred at r.t. for 6 hr in the dark. TFA and water were removed under reduced pressure, the residue was washed with acetone and dried to afford s775z as a dark green solid (55 mg, 31%). $^1$H NMR (500 MHz, D$_2$O, 25° C.) δ (ppm): 8.62 (s, 2H), 8.11 (s, 2H),

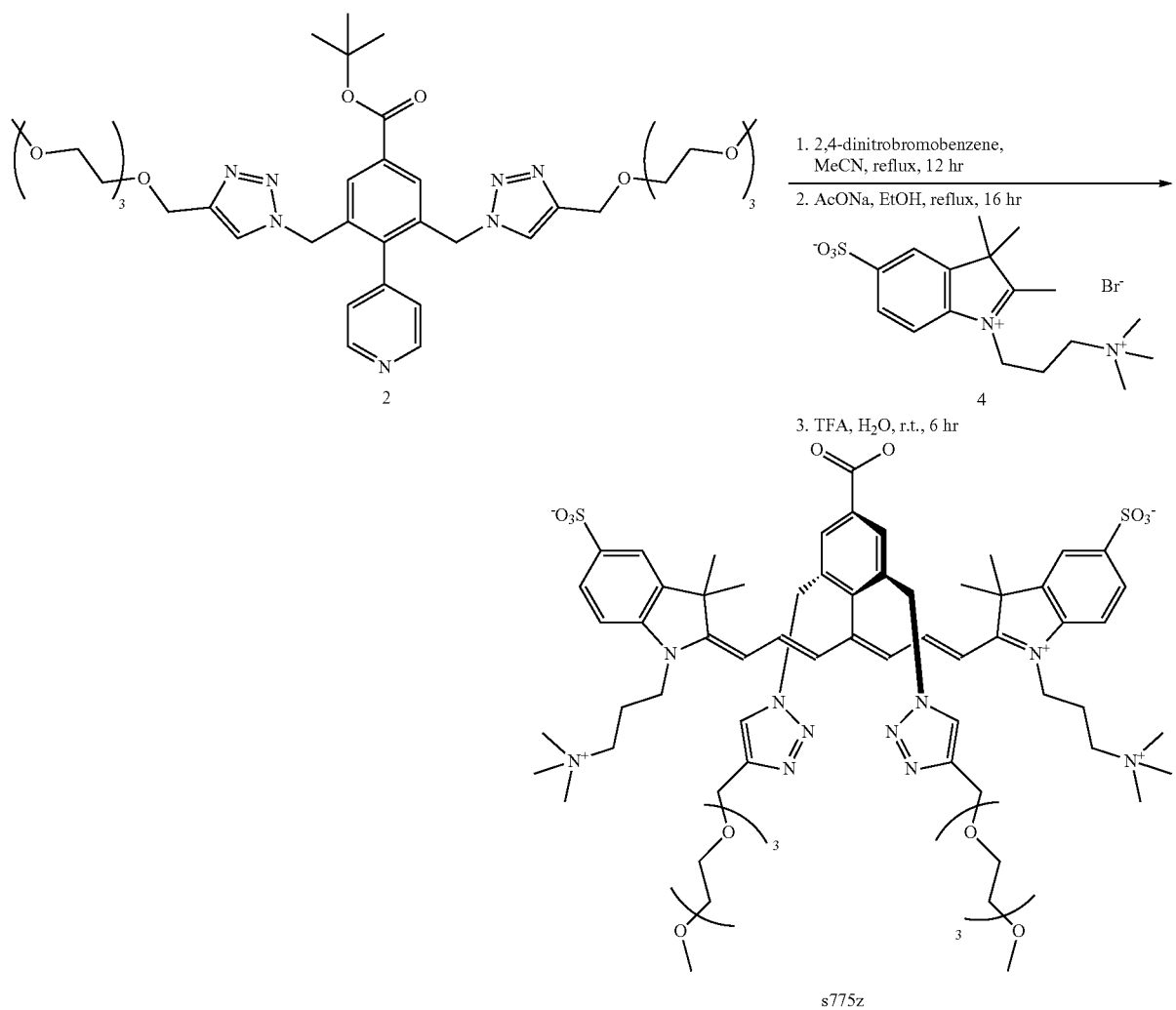

A mixture of 2 (100 mg, 130 µmol, 1 eq) and 2,4-dinitrobromobenzene (128 mg, 520 mol, 4 eq) in MeCN (10 mL) was refluxed for 12 hr under argon atmosphere. Solvent was removed under reduced pressure, and the residue was transferred into a 20 mL centrifuge tube. Diethyl ether (15 mL) was added and the mixture was sonicated for 1 min and then centrifuged at 3600 rpm for 5 min. The supernatant was discarded, and this step was repeated twice to remove the 7.85 (d, J=8.0 Hz, 2H), 7.78 (s, 2H), 7.38 (d, J=8.0 Hz, 2H), 6.81 (d, J=13.5 Hz, 2H), 6.73 (dd, J=13.5, 13.5 Hz, 2H), 6.34 (d, J=13.5 Hz, 2H), 5.61 (s, 4H), 4.46 (s, 4H), 4.21 (br s, 4H), 3.60-3.36 (m, 28H), 3.33 (s, 6H), 3.18 (s, 18H), 2.32 (br s, 4H), 1.14 (s, 12H). $^{13}$C NMR (126 MHz, D$_2$O, 25° C.) δ (ppm): 173.2, 168.0, 147.8, 143.9, 143.6, 141.6, 141.4, 140.2, 134.3, 133.0, 132.4, 126.9, 125.8, 120.0, 117.5, 115.2, 112.8, 111.0, 71.1, 69.6, 69.5, 69.4, 69.1, 63.2, 62.9, 58.1, 53.2, 51.2, 48.8, 41.0, 27.3, 21.0 (including one overlapped aliphatic peak). HRMS (ESI-TOF) m/z: [M+ 2H]$^{2+}$ calcd for $C_{68}H_{98}N_{10}O_{16}S_2^{2+}$ 687.3296. found 687.3292.

Example 2. Bioconjugation

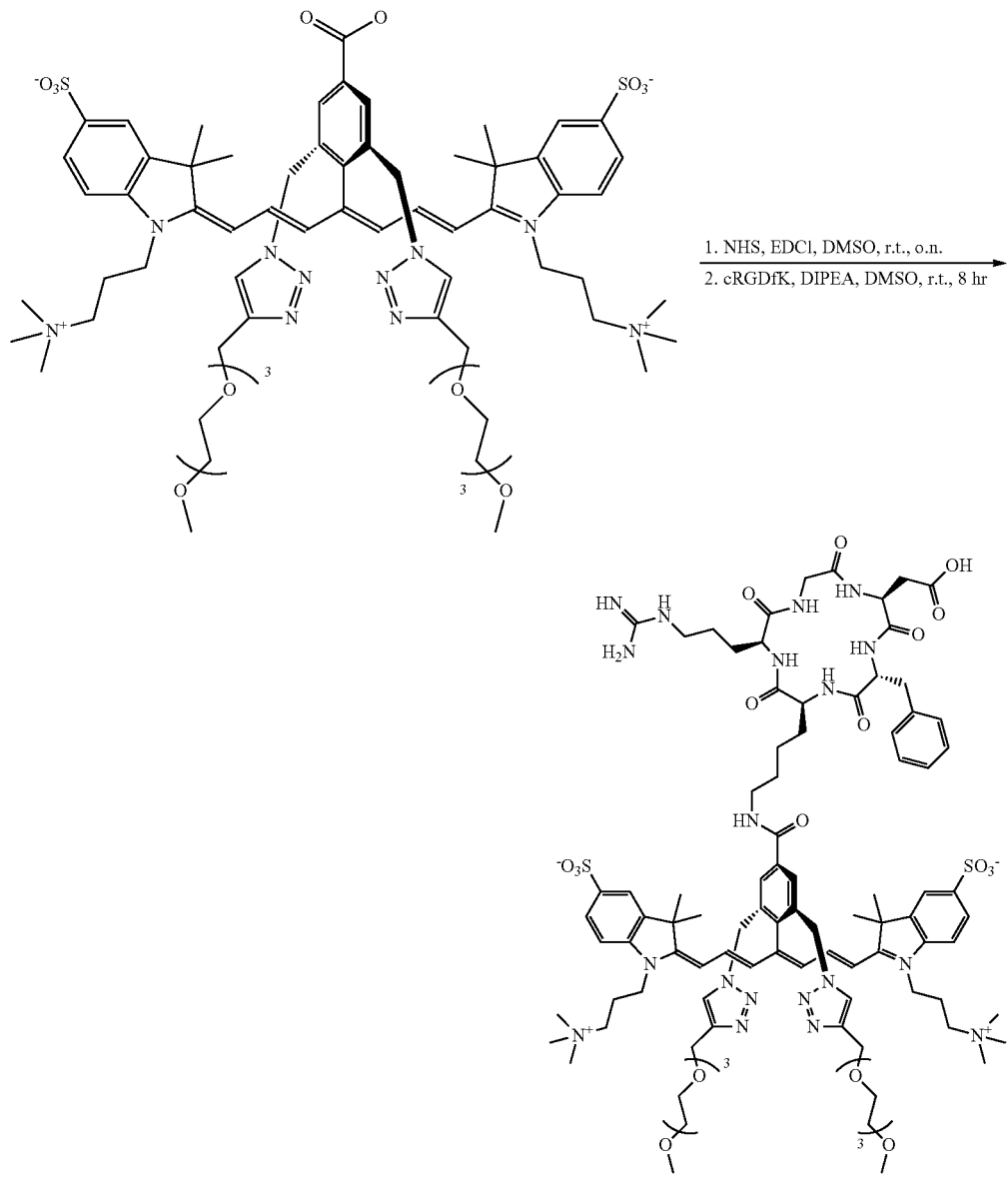

s775z-RGD: A mixture of the s775z (10.0 mg, 8.35 μmol, 1 eq), N-hydroxysuccinimide (2.88 mg, 25.1 μmol, 3 eq) and N-(3-dimethylaminopropyl)-N'-ethylcarbodiimide hydrochloride (4.80 mg, 25.1 μmol, 3 eq) in DMSO (1 mL) in a 20 mL centrifuge tube was shaken at r.t. overnight. Ethyl acetate (15 mL) was added to the tube and mixture was sonicated for 1 min and then centrifuged at 3600 rpm for 5 min. The supernatant was discarded and the green solid was washed with ethyl acetate (2×15 mL) and diethyl ether (1×15 mL); then dried to afford s775z NHS ester which was used without further purification and could be stored at −30° C. for a month. A mixture of crude s775z NHS ester (8.35 μmol, 1 eq), cRGDfK (10.1 mg, 16.7 μmol, 2 eq) and DIPEA (6.90 μL, 41.8 μmol, 5 eq) in DMSO (0.5 mL) was stirred at room temperature for 8 hr. The mixture was directly purified by reverse phase column chromatography (C18, 0-35% MeOH contains 0.5% TFA in H$_2$O) to afford s775z-RGD as green solid (8 mg, 54%). The structure and high purity were confirmed by $^1$H NMR, mass spectrometry and HPLC analysis. $^1$H NMR (500 MHz, D$_2$O, 25° C.) δ (ppm): 8.40 (s, 2H), 7.95 (s, 2H), 6.87 (d, J=8.5 Hz, 2H), 7.49 (s, 2H), 7.21 (d, J=8.5 Hz, 2H), 7.06-6.99 (m, 5H), 6.72 (d, J=13.0 Hz, 2H), 6.59 (dd, J=13.0, 13.0 Hz, 2H), 6.22 (d, J=13.0 Hz, 2H), 5.48 (s, 4H), 4.30-4.26 (m, 6H), 4.11-4.06 (m, 6H), 3.71 (d, J=9.0 Hz, 1H), 3.41-3.23 (m, 31H), 3.17 (s, 6H), 3.02-2.93 (m, 20H), 2.84-2.79 (m, 1H), 2.75-2.70 (m, 1H), 2.75-2.52 (m, 1H), 2.17 (m, 5H), 1.74 (br s, 1H), 1.59 (br s, 1H), 1.53 (br s, 1H), 1.40 (m, 6H), 0.89-0.77 (m, 16H). HRMS (ESI-TOF) m/z: [M]$^+$ calcd for $C_{95}H_{136}N_{19}O_{22}S_2^+$ 1958.9543. found [M]$^+$ 1958.9588.

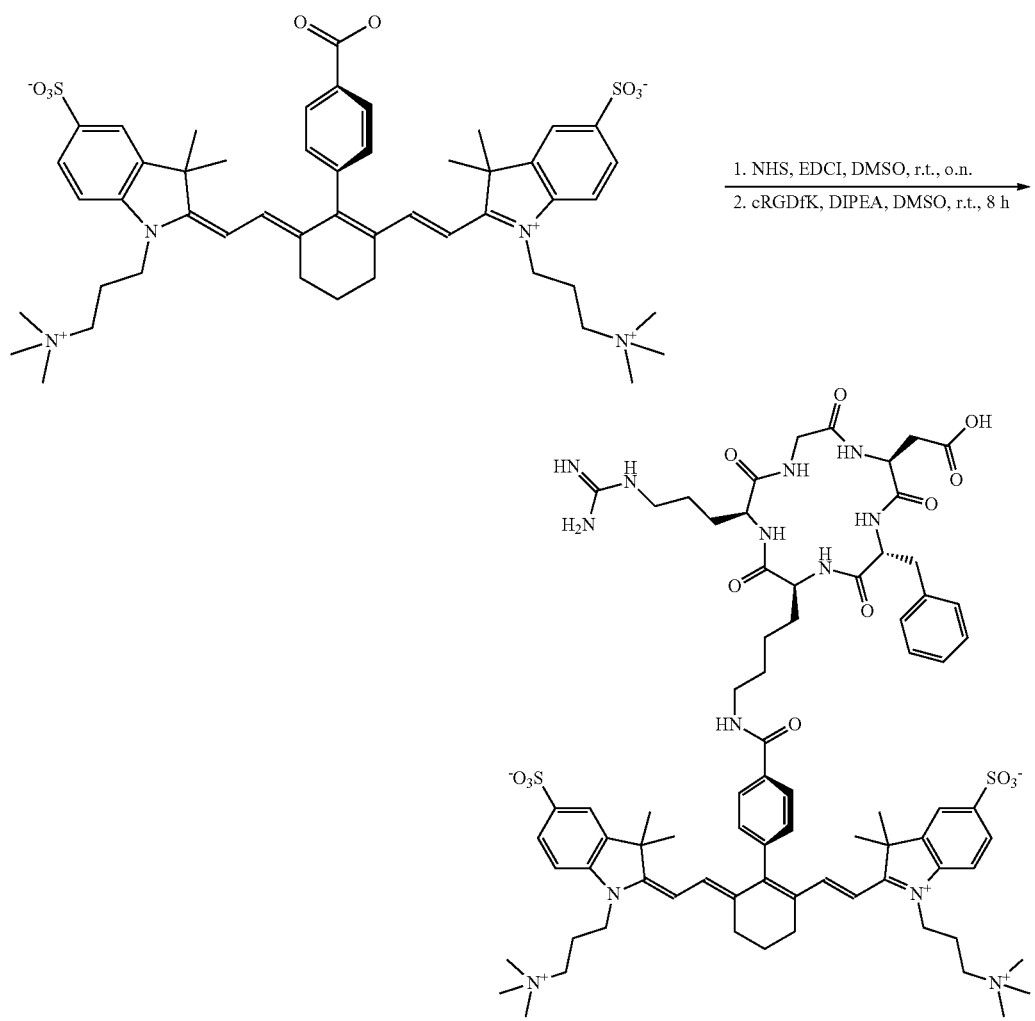

Compound 756z-RGD was synthesized by using the same amide bond coupling procedure described above. Reverse phase column chromatography: C18, 0-50% MeOH contains 0.5% TFA in H$_2$O. The structure and high purity were confirmed by $^1$H NMR, mass spectrometry and HPLC analysis. HRMS (ESI-TOF) m/z: [M]$^+$ calcd for C$_{76}$H$_{103}$N$_{13}$O$_{14}$S$_2^+$ 1485.7183. found [M]$^+$ 1485.7187. Many of the NMR peaks were broad because of self-aggregation in water but diagnostics peaks were present.

Example 3. Photophysical and Other Properties

TABLE 2

Spectral properties of 756z and s775z and their RGD conjugates.

| Dye | Solvent[a] | $\lambda^{abs}_{max}$ (nm)[b] | $\lambda^{em}_{max}$ (nm) | SS (nm)[c] | ε (M$^{-1}$cm$^{-1}$) | R$^2$ |
|---|---|---|---|---|---|---|
| 756z | H$_2$O | 681 (a)/ 756 (m) | 773 | 17 | 56,000 | 0.970[d] |
| | PBS | 681 (a)/ 756 (m) | 773 | 17 | 99,000 | 0.942[d] |
| | 2 μM BSA | 681 (a)/ 755 (m) | 773 | 18 | 107,000 | 0.986[d] |
| | 100% FBS | 682 (a)/ 758 (m) | 774 | 16 | 118,000 | 0.978[d] |
| s775z | H$_2$O | 775 | 795 | 20 | 201,000 | 0.999 |
| | PBS | 775 | 794 | 19 | 201,000 | 0.999 |
| | 2 μM BSA | 775 | 795 | 20 | 204,000 | 0.999 |
| | 100% FBS | 776 | 795 | 19 | 200,000 | 0.999 |
| 756z-RGD | PBS | 682 (a)/ 757 (m) | 773 | 16 | 147,000 | 0.998 |
| s775Z-RGD | PBS | 776 | 795 | 19 | 188,000 | 0.999 |

[a]PBS = Phosphate buffered saline (pH 7.4); 2 μM BSA = 2 μM solution of bovine serum albumin in pH 7.4 PBS; FBS = fetal bovine serum. Dye concentration range is 0-5 μM. All measurements were done at room temperature.
[b]a = aggregate; m = monomer.
[c]SS = Stokes shift.
[d]Nonlinear relationship with concentration, caused by self-aggregation.

Quantum yield measurements used UL766 ($\Phi_f$=9.5% in pH 7.4 PBS) as a reference standard. The concentrations of UL766 and other cyanine dyes were adjusted to the absorption value of 0.08 at 730 nm. The fluorescence spectrum of each solution was obtained with excitation at 730 nm, and the integrated area was used in the quantum yield calculation by the following equation:

$$\Phi_{sample} = \Phi_{ref} \times \frac{\eta_{sample}^2 I_{sample} A_{sample}}{\eta_{ref}^2 I_{ref} A_{ref}}$$

where η is the refractive index of the solvent, I is the integrated fluorescence intensity, and A is the absorbance at a chosen wavelength. The estimated error for this method is ±10%.

TABLE 3

Fluorescence brightness of various heptamethine dyes in pH 7.4 PBS.[a]

| Dye | ε ($M^{-1}cm^{-1}$) | Quantum yield (%) | Fluorescence brightness[c] |
|---|---|---|---|
| s775z | 201,000 | 9.0[b] | 18,000 |
| 756z | 99,000 | 9.7[b] | 9,600 |
| s775z-RGD | 188,000 | 8.1[b] | 15,000 |
| 756z-RGD | 147,000 | 10.7[b] | 16,000 |
| UL766[d] | 229,000 | 9.5 | 22,000 |
| ICG | 71,000 | 2.3[b] | 1,600 |
| ZW800-1[d] | 246,000 | 13.5 | 33,000 |
| CW800[d] | 242,000 | 9.0 | 22,000 |

[a]All measurements were done at room temperature.
[b]Relative to UL766 in pH 7.4 PBS, error is ±10%.
[c]Fluorescence brightness = ε × quantum yield, error is ±15%.
[d]Reported data.

Albumin Binding Measurements. Two separate sets of titration experiments were performed. The first set of titration experiments measured quenching of bovine serum albumin (BSA) tryptophan fluorescence as dye was added incrementally. A fluorescence spectrum (ex: 280 nm, slit width: 2 nm) was acquired after each dye aliquot was added (4 μL of a 1 mM stock solution of s775z or 756z). After each aliquot addition, the solution was mixed and allowed to equilibrate for 5 min before spectral acquisition. The data is shown in FIG. 13(a)-(d) and indicate weak dye/BSA affinity.

The second set of titration experiments measured the fluorescence intensity for samples of 756z and s775z at different concentrations in the presence and absence of BSA (2 μM). The data in Figure S14(e)-(f) shows that the presence of the BSA had no effect on the dye fluorescence, thus indicating weak dye/BSA affinity.

Photostability Measurements. Lamp Irradiation: A solution of dye (1 μM) in PBS buffer, pH 7.4, was placed in a 1×1×4 $cm^3$ cuvette that was exposed to air and irradiated at a distance of 3 cm by a 150 W Xenon lamp with a 620 nm long-pass filter. An absorbance spectrum was recorded every 10 min. The normalized maximum absorbance of dye was plotted against time and fitted to a non-linear regression, one-phase exponential decay. The competitive irradiation experiment used TLC analysis to track changes in a mixed solution of s775z and UL766 (0.1 mM each) in PBS buffer, pH 7.4. A 1.5 mL vial containing the solution was irradiated at a distance of 3 cm by a 150 W Xenon lamp with a 620 nm long-pass filter.

TABLE 4

Rate constant and half-life of the first-order decay of heptamethine dyes in pH 7.4 PBS under a 150 W Xenon lamp irradiation at 23° C.

| Dye | k ($s^{-1}$) | $t_{1/2}$ (s) |
|---|---|---|
| ICG | $8.7 \times 10^{-4}$ | $8.0 \times 10^2$ |
| UL766 | $5.3 \times 10^{-4}$ | $1.3 \times 10^3$ |
| 756z | $3.7 \times 10^{-4}$ | $1.9 \times 10^3$ |
| s775z | $5.0 \times 10^{-5}$ | $1.4 \times 10^4$ |

In Vivo Station Irradiation. Imaging phantoms were created by immobilizing 100 μL drops on a non-reflective black surface, and two sets of phantoms (each N=3) composed of s775z or UL766 (10 μM) in PBS buffer, pH 7.4, were located inside an in vivo imaging station (Ami HT Spectral Imaging). An initial fluorescence intensity image of the phantoms was acquired (ex: 745 nm, em: 850 nm, exposure: 5 sec, percent power: 50%, F-stop: 2, binning: small, FOV: 10). Then, the phantoms were simultaneously irradiated inside the imaging station for four intervals of 15 min (ex: 745 nm, em: 850 nm, percent power: 100%, F-stop: 2, binning: small; FOV: 10). After each 15 min interval, a fluorescence intensity image of the phantoms was acquired and the mean pixel intensity (MPI) of each individual phantom was determined using ImageJ2 software.

Example 4. Synthesis and Characterization of s775z-IgG and 756z-IgG

Antibody Conjugation. Goat IgG (Sigma-Aldrich, 15256) was dissolved in 150 mM NaCl to give a 10 mg/mL solution and was further diluted to 1 mg/mL using buffer A (150 mM $Na_2CO_3$, pH 9.3). A 10 μL aliquot of dye NHS ester (756z or s775z) in DMSO was added to 200 μL of goat IgG (1 mg/mL) to give a stoichiometry of reactants (antibody: dye NHS ester) of 1:10, 1:15, 1:30, or 1:50 (the final DOL for the samples of s775z-IgG was 0.6, 0.9, 1.7, 2.3). The reaction was incubated at room temperature with mixing by light vortex every 10 min. After 30 min, the reaction was filtered using a PD-10 desalting column (GE Healthcare Life Sciences) pre-equilibrated with buffer B (575 mM NaCl, 37.5 mM $NaH_2PO_4$, 0.75 mM EDTA, pH 7.5). The eluent was collected and concentrated using an Amicon® ultra-4 centrifugal filter unit. Each antibody conjugate was washed several times with buffer B and concentrated. To get DOL of 4.3 or 10.7 for samples of s775z-IgG the labeling reaction used a stoichiometry of reactants (antibody: s775z NHS ester) of 1:100 or 1:500. These reactions were incubated at room temperature with mixing by light vortex every 15 min. After 60 min, the s775z-IgG conjugates were filtered twice using the PD-10 desalting column and concentrated using the same procedure as described above.

Antibody Conjugate Absorbance. Absorbance spectra of goat IgG antibody bioconjugates were collected in buffer B (575 mM NaCl, 37.5 mM $NaH_2PO_4$ and 0.75 mM EDTA in water, pH 7.5) using Implen NanoPhotometer NP80. Spectra were normalized to absorbance at 280 nm. The degree of labeling (DOL) was calculated using the maximum method with the following equation where $A_{max}$ is the maximum absorbance due to monomer heptamethine dye, $A_{280}$ is the absorbance at 280 nm, $\epsilon_{antibody}$ is 210,000 $M^{-1}$ $cm^{-1}$, $C_{280}$ is 0.11 and takes into account the absorbance contribution from covalently bound heptamethine dye at 280 nm, $\epsilon_{max}$ is 111,000 $M^{-1}$ $cm^{-1}$ for the monomer peak of 756z, and $\epsilon_{max}$ is 204,000 $M^{-1}$ $cm^{-1}$ for the monomer peak of s775z:

$$DOL = \frac{A_{max}\epsilon_{antibody}}{(A_{280} - A_{max}C_{280})\epsilon_{max}}$$

The same values of DOL were obtained when the alternative peak integration method was used to analyze the data.

Antibody Conjugate Fluorescence. Fluorescence emission spectra of dye labelled goat IgG were collected in buffer B (575 mM NaCl, 37.5 mM $NaH_2PO_4$ and 0.75 mM EDTA in water, pH 7.5) using Horiba Fluoromax-4 Fluorometer with FluorEssence software (ex: 745 nm, slit width: 4 nm). The fluorescence emission spectra were divided by the fluorescence emission intensity at 355 nm (ex: 280 nm, slit width: 2 nm) to obtain corrected spectra that accounts for variations in antibody concentration.

Storage Stability of Antibody Conjugates. Absorbance spectra of 756z-IgG (DOL 2.1) and s775z-IgG (DOL 2.3) were collected in buffer B using Implen NanoPhotometer NP80. Spectra were acquired at 0, 2, 4, and 7 days after bioconjugation and were normalized to the absorbance at 280 nm. The antibody conjugates were stored at 4° C. between data collection.

Example 5. Cell Experiments

Cell viability. CHO-K1 cells (Chinese hamster ovary, ATCC© CCL-61™) and A549 cells (human lung adenocarcinoma, ATCC© CCL-185™) were cultured and maintained in F-12K medium (supplemented with 10% fetal bovine serum, 1% penicillin streptomycin) at 37° C. and 5% $CO_2$ in a humidified incubator. For cell viability studies, CHO-K1 or A549 cells were seeded into 96-microwell plates and grown to 70% confluency. The medium was then removed and replaced with either s775z or ICG at various concentrations (N=3) in F12-K medium for 24 hr at 37° C. and 5% $CO_2$ in a humidified incubator. After 24 hr, the dye was removed and replaced with F-12K medium containing [3-(4,5-dimethylthiazol-2-yl)-2,5-diphenyltetrazolium bromide] (MTT, 1.1 mM). The samples were incubated at 37° C. and 5% $CO_2$ for 2 hr and an SDS-HCl detergent solution was then added. The samples were incubated overnight, and the absorbance of each well was measured at 570 nm, where the readings were normalized relative to untreated cells. All measurements were done in triplicate.

Cell Microscopy. For fluorescence microscopy, A549 cells were seeded and grown to 70% confluency on an 8-well chambered coverglass (Lab-Tek, Nunc, USA). The media was removed, and the cells were separately incubated with 10 µM dye (756z, 756z-RGD, s775z, or s775z-RGD) in media for 1 hr at 37° C. For blocking, 100 µM of cRGDfK was added to the cells, 10 min prior to dye treatment and remained present during NIR dye incubation. After dye incubation, the cells were washed several times with PBS, fixed with 4% cold paraformaldehyde for 20 min at room temperature and washed again with PBS. The cells were then co-stained with 3 µM Hoechst 33342 for 10 min, washed with PBS, and imaged on a Zeiss Axiovert 100 TV epifluorescence microscope equipped with a custom filter (ex: 445/40, em: 494/20) and ICG filter (ex: 769/41, em: 832/37). For each micrograph, a background subtraction with a rolling ball radius of 20 pixels was applied using ImageJ2 software. Next, a triangle threshold was employed and used to calculate the average mean pixel intensity (MPI) where overall averages and SEM were calculated and plotted in GraphPad Prism. A total of 6 micrographs were evaluated per condition and each experiment was conducted in triplicate.

Example 6. In-Vivo Studies

Mouse Biodistribution. All animal experiments were conducted under protocols that were approved by the Notre Dame Institutional Animal Care and Use Committee. Female SKH1 hairless mice (N=4) were divided into two cohorts and received a retro-orbital injection of ICG or s775z (50 µL, 10 nmol). Five min prior to injection, each mouse was anesthetized with 2-3% isoflurane with an oxygen flow rate of 2 L $min^{-1}$ and imaged using an in vivo imaging station (Ami HT Spectral Imaging) (ex: 745 nm, em: 850 nm, exposure: 3 sec, percent power: 50%, F-stop: 2, binning: small, FOV: 20). The mice were then injected with dye and imaged at 0, 1, and 2 hr. At 2 hr, the mice were anesthetized, sacrificed via cervical dislocation, and blood was collected from the heart. The lower cavity of the mice was then exposed and imaged. Next, all major organs were removed and imaged including the liver (without gallbladder), heart, lungs, spleen, kidneys, skin, muscle, and intestines. The images were pseduocolored "fire," and an arbitrary maximum fluorescence value was chosen. Biodistribution analysis was performed by importing images of the excised organs from each mouse into ImageJ2. The amount of dye was then quantified by manually drawing a region of interest around each organ. The MPI of each organ was measured and divided by the MPI for thigh muscle from the same animal.

Mouse Tumor Imaging. All animal experiments were conducted under protocols that were approved by the Notre Dame Institutional Animal Care and Use Committee. Female Foxn1 nude mice (N=8) were inoculated with A549 cells ($1\times10^6$) in Corning Matrigel matrix on the right rear flank. Approximately 4 weeks later, the mice were divided into two cohorts and received a retro-orbital injection of either s775z or s775z-RGD (10 nmol in 50 µL saline). Five min prior to injection, each mouse was anesthetized with 2-3% isoflurane with an oxygen flow rate of 2 L $min^{-1}$ and imaged using an in vivo imaging station (Ami HT Spectral Imaging) (ex: 745 nm, em: 850 nm, exposure: 3 sec, percent power: 50%, F-stop: 2, binning: small, FOV: 20). The mice were then injected with dye and imaged at 0, 0.5, 1, 2, and 3 hr. At 3 hr, the mice were anesthetized and sacrificed via cervical dislocation, and blood was collected from the heart. To simulate a surgery, the mice were imaged prior to surgery, the fluorescent tumor was fully removed, and the mice were imaged again. Next, all major organs were removed and imaged including the liver, heart, lungs, spleen, kidneys, skin, and muscle. For image processing, the whole body and tumor images were pseudocolored "fire," and an arbitrary maximum fluorescence value was chosen. Biodistribution analysis was performed by importing NIR fluorescence images of the excised organs from each mouse into ImageJ2 and the amount of dye in each organ was quantified by manually drawing a region of interest around each organ and determining the fluorescence MPI. The value was divided by the MPI for the thigh muscle from the same animal to give a normalized MPI.

Statistical Analysis. For cell microscopy and in vivo imaging, an unpaired t test using GraphPad Prism software was applied. Statistical significance between experimental conditions was defined as a p-value less than 0.05, and p-values were assigned in the following manner: * $p<0.05$,  $p<0.01$, * $p<0.001$.

While specific embodiments have been described above with reference to the disclosed embodiments and examples, such embodiments are only illustrative and do not limit the scope of the invention. Changes and modifications can be made in accordance with ordinary skill in the art without departing from the invention in its broader aspects as defined in the following claims.

All publications, patents, and patent documents are incorporated by reference herein, as though individually incorporated by reference. No limitations inconsistent with this disclosure are to be understood therefrom. The invention has been described with reference to various specific and preferred embodiments and techniques. However, it should be understood that many variations and modifications may be made while remaining within the spirit and scope of the invention.

What is claimed is:

1. A compound of Formula I:

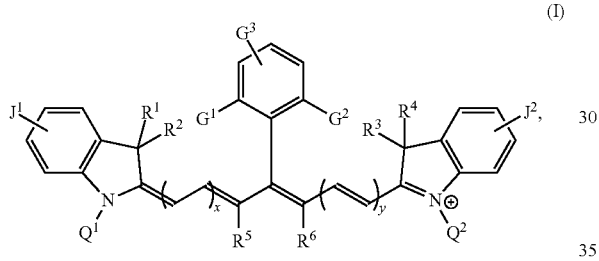

or a salt thereof;
wherein
G$^1$ and G$^2$ are each independently -(C$_1$-C$_4$)alkyl-(Z)—R$^W$;
each Z is independently 5- or 6-membered heterocycle;
each R$^W$ is independently —X$^1$(C$_1$-C$_4$)alkyl-(O(C$_2$-C$_4$)alkyl)$_m$-O(C$_1$-C$_4$)alkyl, or H;
each X$^1$ is independently absent, O, S, or NH;
each m is independently 0-500;
G$^3$ is —(C═O)R$^A$ wherein R$^A$ is OR$^B$, NR$^B$R$^C$, H, or halo;
R$^B$ and R$^C$ are each independently H, N-succinimidyl, drug, or biologic;
J1 and J2 are each independently SO$_3$H or CO$_2$H;
Q$^1$ and Q$^2$ are each independently —(C$_2$-C$_6$)alkyl-X$^2$;
each X$^2$ is independently N$^+$(R$^D$)$_3$, N(R$^D$)$_2$, CO$_2$H, SO$_3$H, or —O(C$_1$-C$_6$)alkyl;
each R$^D$ is independently-(C$_1$-C$_6$)alkyl;
R$^1$, R$^2$, R$^3$ and R$^4$ are each independently —(C$_1$-C$_4$)alkyl or H;
R$^5$ and R$^6$ are each independently H or —(C$_1$-C$_4$)alkyl; or
R$^5$ and R$^5$ taken together form a 5- or 6-membered carbocycle; and
x and y are each independently 0-3;

wherein the moieties (C$_2$-C$_4$)alkyl or (C$_2$-C$_6$)alkyl are optionally branched, and charged moieties present in the compound are counterbalanced with counterions.

2. The compound of claim 1 wherein the compound is s775z:

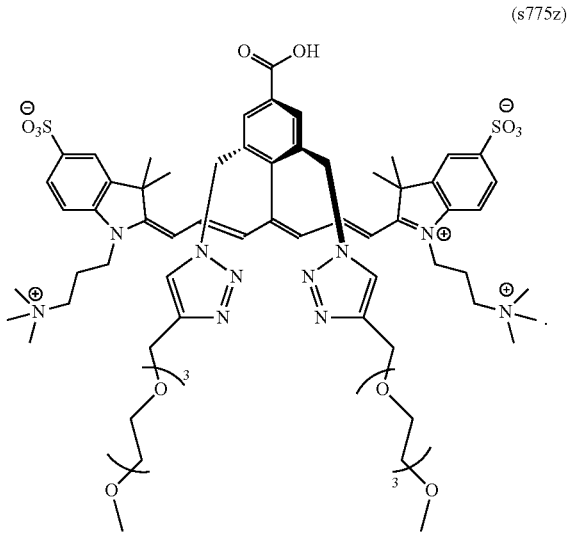

3. The compound of claim 1 wherein Z is imidazole, triazole, or tetrazole.

4. The compound of claim 1 wherein G$^1$ and G$^2$ are

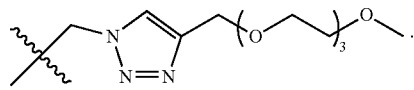

5. The compound of claim 1 wherein G$^3$ is CO$_2$H.

6. The compound of claim 1 wherein G$^3$ is —(C═O)NHR$^C$.

7. The compound of claim 6 wherein R$^C$ is an arginylglycylaspartic acid or peptide, or immunoglobulin.

8. The compound of claim 1 wherein J$^1$ and J$^2$ are SO$_3$H.

9. The compound of claim 1 wherein Q$^1$ and Q$^2$ are —(CH$_2$)$_3$N$^+$(CH$_3$)$_3$.

10. The compound of claim 1 wherein R$^1$, R$^2$, R$^3$ and R$^4$ are methyl.

11. The compound of claim 1 wherein R$^W$ is —CH$_2$(OCH$_2$CH$_2$)$_3$—O(C$_1$-C$_4$)alkyl.

12. The compound of claim 1 wherein R$^5$ and R$^6$ are H.

13. The compound of claim 1 wherein x and y are 1.

14. The compound of claim 1 wherein the compound is represented by Formula II, III, or IV:

(II)

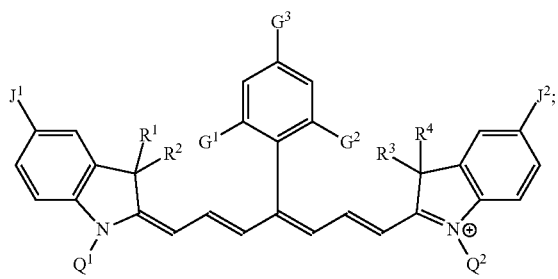

(III)

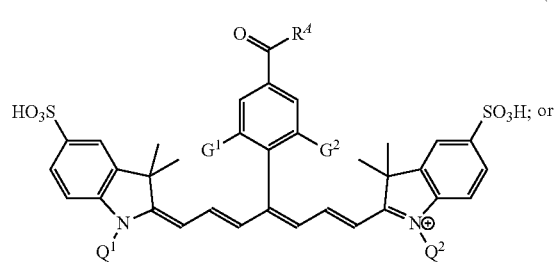
or (IV)

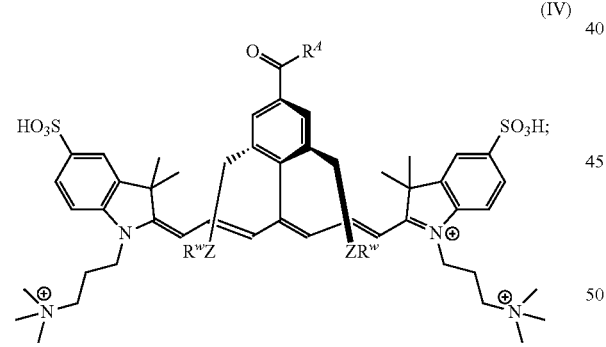

wherein $R^W$ is —$(C_1\text{-}C_4)$alkyl-$(O(C_2\text{-}C_4)\text{alkyl})_m$-$O(C_1\text{-}C_4)$alkyl, and m is 1-6.

15. A method for imaging a targeted biological organism comprising:
  a) conjugating a compound of claim 1 to a drug or biologic to form a bioconjugate wherein the bioconjugate has selective affinity for a targeted biological organism or biomolecule;
  b) contacting the bioconjugate and the biological organism or biomolecule;
  c) exciting the bioconjugate a suitable wavelength for inducing a fluorescence signal or photoacoustic signal; and
  d) imaging the excited bioconjugate fluorescence signal or photoacoustic signal emanating from within the biological organism;

wherein the targeted biological organism is thereby imaged.

16. The method of claim 15 wherein the bioconjugate is a bioconjugate of the compound s775z and an arginylglycylaspartic acid or immunoglobulin.

17. The method of claim 15 wherein the biological organism is cancer tissue.

18. A compound of Formula V:

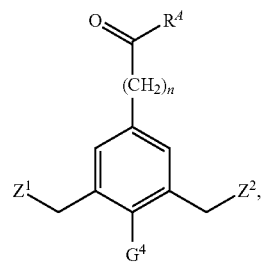

or a salt thereof,
wherein
$G^4$ is pyridyl, pyridiniumyl, or

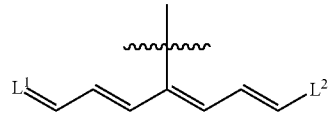

wherein $L^1$ and $L^2$ are each independently a substituted 2-indolyl group or substituted 2-indolium group, wherein the 2-indolyl or 2-indolium is optionally fused to a benzo ring;

$R^A$ is $OR^B$, $NR^BR^C$, H, or halo;

$R^B$ and $R^C$ are each independently H, N-succinimidyl, —$(C_1\text{-}C_6)$alkyl, drug, or biologic;

$Z^1$ and $Z^2$ are each independently halo, $N_3$, or a triazole substituted with polyethylene glycol wherein each triazole is optionally alkyl quaternized; and n is 0-3;

wherein charged moieties when present in the compound are counterbalanced with counterions.

19. The compound of claim 18 wherein the compound is:
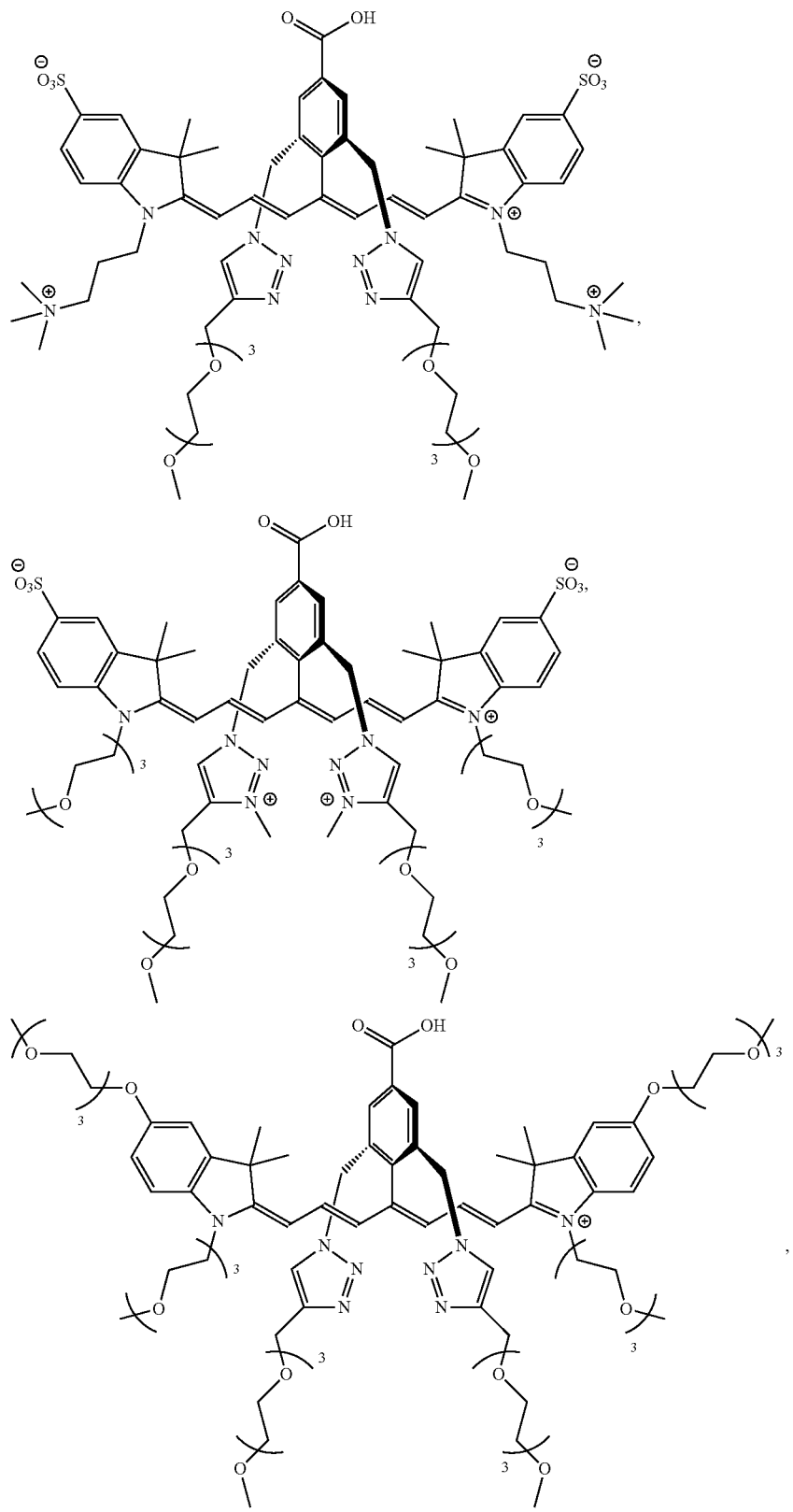

-continued
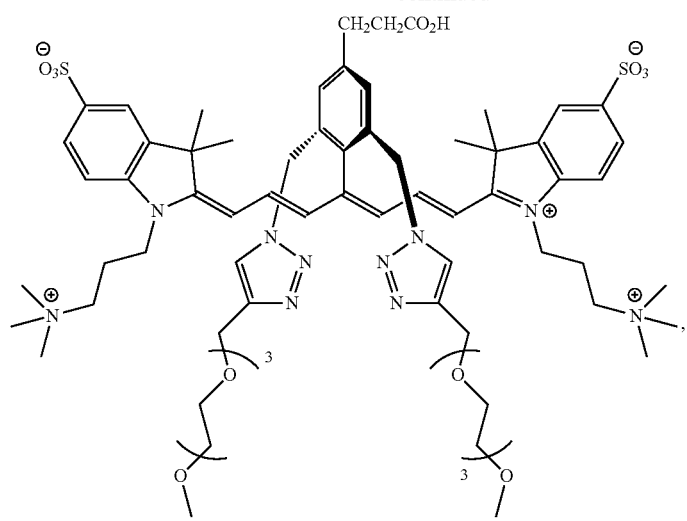
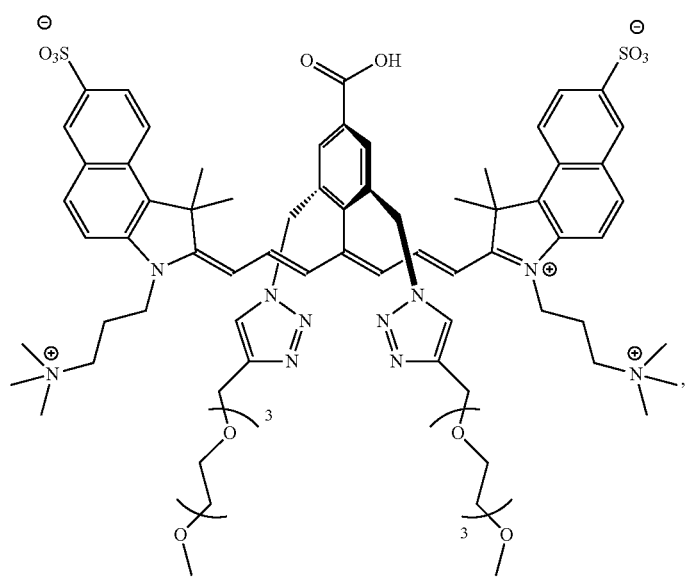
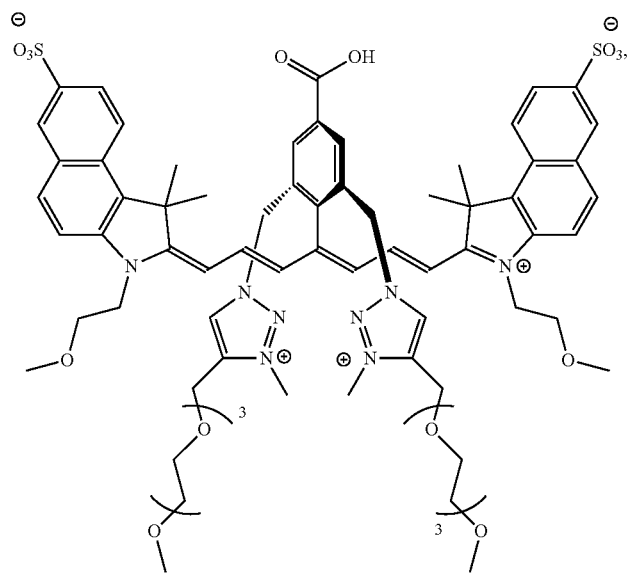

-continued
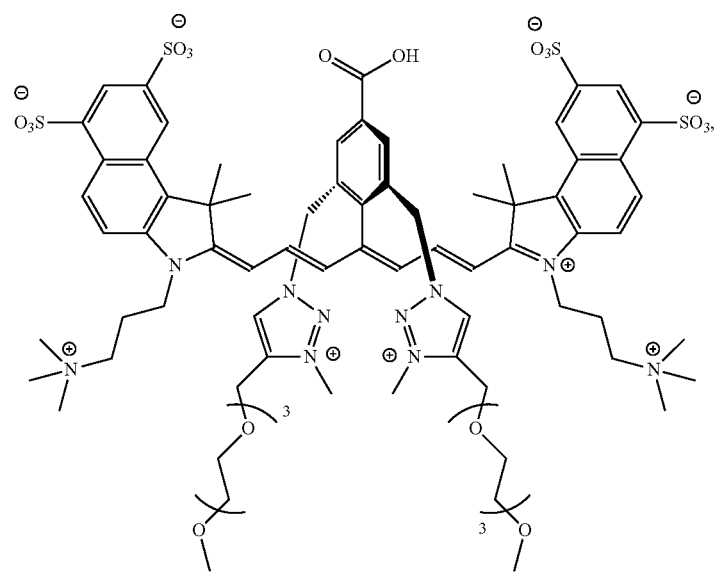
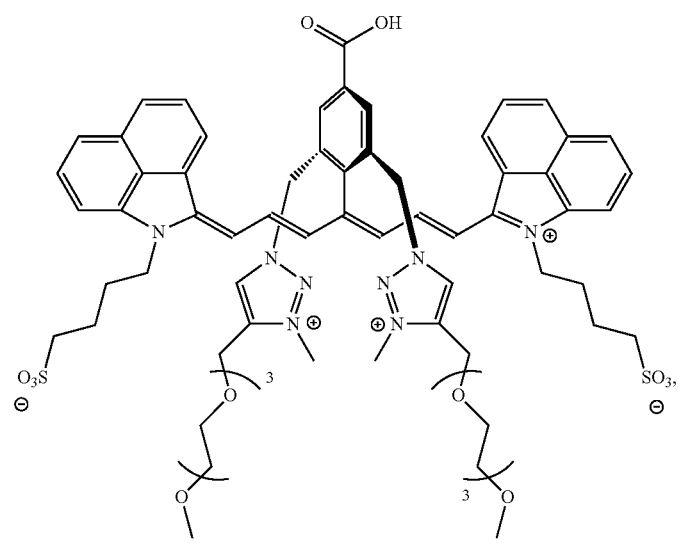
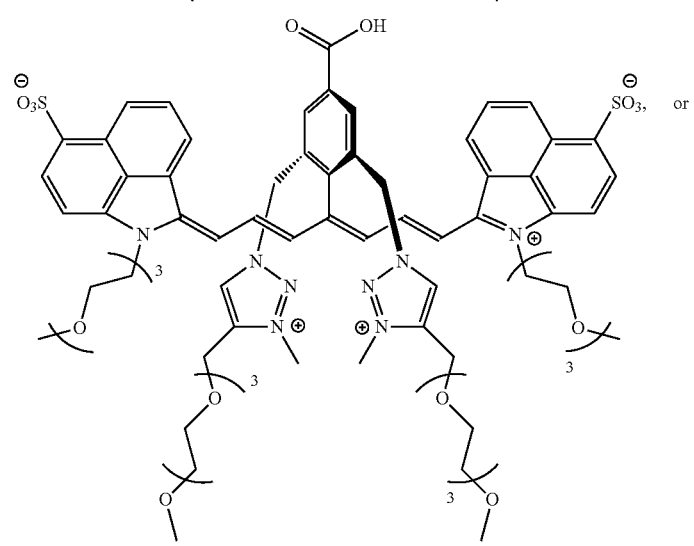 or

-continued

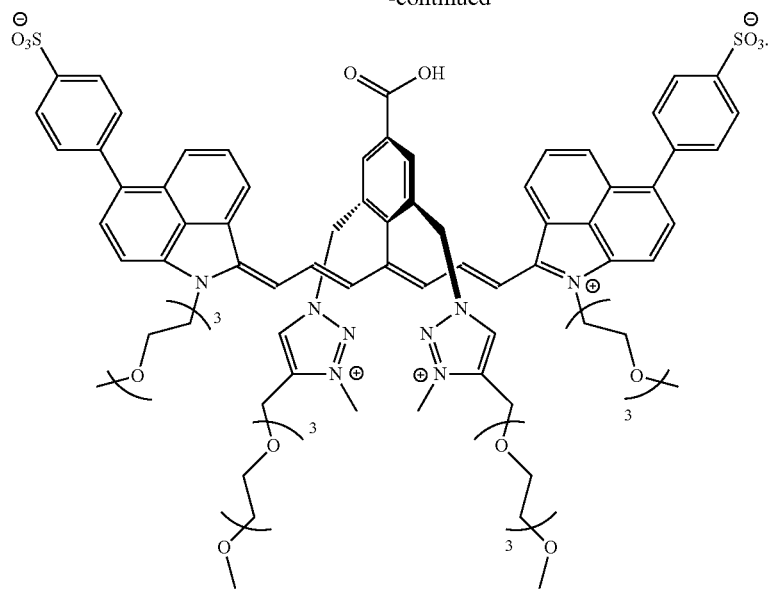

20. A method for synthesizing a sterically shielded heptamethine cyanine compound of Formula VI:

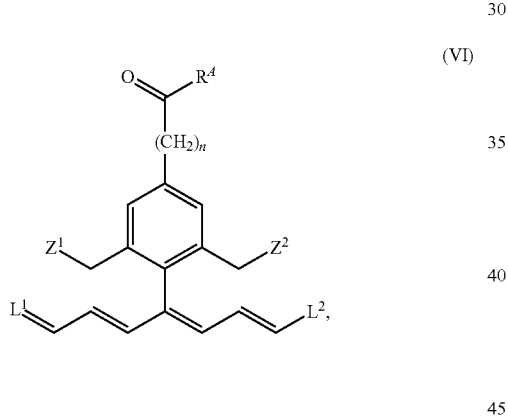

(VI)

or a salt thereof;
wherein
$L^1$ and $L^2$ are each independently a substituted 2-indolyl or substituted 2-indolinyl group, wherein the 2-indolyl or 2-indolinyl is optionally fused to a benzo ring;
$R^A$ is OH, $OCH_3$, $OC(CH_3)_3$, or halo;
$Z^1$ and $Z^2$ are each independently a triazole substituted with polyethylene glycol wherein each triazole is optionally alkyl quaternized; and
n is 0-3;
wherein charged moieties present in the compound are counterbalanced with counterions; the method comprising:
a) contacting a pyridinium compound of Formula VIIa and an indolium compound of Formula VIIb under suitable Zincke reaction conditions to form the cyanine compound:

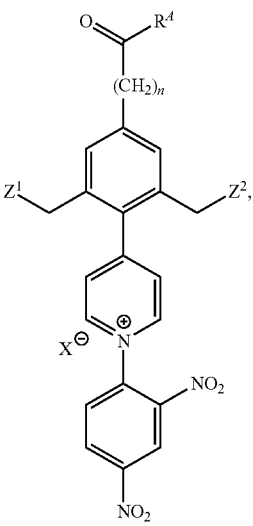

(VIIa)

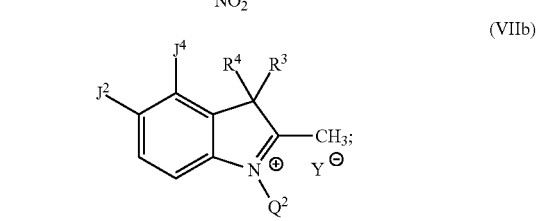

(VIIb)

wherein
$R^A$, $Z^1$, $Z^2$ and n are as defined above;
$X^-$ and $Y^-$ are each independently a counterion;
$J^2$ is $SO_3H$, $CO_2H$, phenyl-$SO_3H$, polyethylene glycol, or H;
$J^4$ is H; or
$J^4$ and $J^2$ taken together form a fused benzo ring; or
$J^4$, $R^3$ and $R^4$ taken together form a fused benzo ring;
$Q^2$ is —$(C_2-C_6)$alkyl-$X^2$ or polyethylene glycol;
$X^2$ is $N^+(R^D)_3$, $N(R^D)_2$, $CO_2H$, $SO_3H$, or —$O(C_1-C_6)$alkyl;

each $R^D$ is independently —$(C_1$-$C_6)$alkyl; and $R^3$ and $R^4$ are each independently —$(C_1$-$C_4)$alkyl or H, when $R^3$ and $R^4$ do not form a fused benzo ring together with $J^4$;

wherein each fused benzo ring when present is substituted optionally with one or more $SO_3H$; and b) quenching the reaction;

wherein the sterically shielded heptamethine cyanine compound is thereby formed.

* * * * *

UNITED STATES PATENT AND TRADEMARK OFFICE
CERTIFICATE OF CORRECTION

PATENT NO. : 12,466,814 B2
APPLICATION NO. : 17/996420
DATED : November 11, 2025
INVENTOR(S) : Bradley D. Smith and Donghao Li Page 1 of 1

It is certified that error appears in the above-identified patent and that said Letters Patent is hereby corrected as shown below:

In the Specification

At Column 19, Line 2, please delete "2-indolium" and insert -- 2-indolenium -- therefor.

At Column 26, Line 31, please delete "indolium" and insert -- indolenium -- therefor.

At Column 27, Line 20, please delete "indolium" and insert -- indolenium -- therefor.

At Column 28, Line 1, please delete "indolium" and insert -- indolenium -- therefor.

At Column 30, Line 5, please delete "indolium" and insert -- indolenium-- therefor.

In the Claims

In Claim 18, at Column 58, Line 54, please delete "2-indolium" and insert -- 2-indolenium -- therefor.

In Claim 18, at Column 58, Line 55, please delete "2-indolium" and insert -- 2-indolenium -- therefor.

In Claim 20, at Column 65, Line 65, please delete "indolium" and insert -- indolenium -- therefor.

Signed and Sealed this
Twenty-third Day of December, 2025

John A. Squires
*Director of the United States Patent and Trademark Office*